US010862093B2

(12) United States Patent
Hatta et al.

(10) Patent No.: US 10,862,093 B2
(45) Date of Patent: Dec. 8, 2020

(54) SEPARATOR, BATTERY, BATTERY PACK, ELECTRONIC APPARATUS, ELECTRIC VEHICLE, POWER STORAGE DEVICE, AND ELECTRIC POWER SYSTEM

(71) Applicant: Sony Corporation, Tokyo (JP)

(72) Inventors: Kazuhito Hatta, Fukushima (JP); Toshitsugu Ono, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 889 days.

(21) Appl. No.: 14/777,715

(22) PCT Filed: Feb. 21, 2014

(86) PCT No.: PCT/JP2014/000909
§ 371 (c)(1),
(2) Date: Sep. 16, 2015

(87) PCT Pub. No.: WO2014/147958
PCT Pub. Date: Sep. 25, 2014

(65) Prior Publication Data
US 2016/0285064 A1 Sep. 29, 2016

(30) Foreign Application Priority Data

Mar. 19, 2013 (JP) ................. 2013-057331

(51) Int. Cl.
H01M 10/0525 (2010.01)
H01M 2/16 (2006.01)
H01M 2/18 (2006.01)
B60L 50/10 (2019.01)
B60L 50/64 (2019.01)
H01M 10/44 (2006.01)
H02J 7/00 (2006.01)

(52) U.S. Cl.
CPC ............. H01M 2/18 (2013.01); B60L 50/10 (2019.02); B60L 50/64 (2019.02); H01M 2/166 (2013.01); H01M 2/1673 (2013.01); H01M 2/1686 (2013.01); H01M 10/44 (2013.01); H02J 7/0068 (2013.01); H01M 10/0525 (2013.01); H01M 2220/20 (2013.01); Y02E 60/10 (2013.01)

(58) Field of Classification Search
CPC ...... H01M 2/18; H01M 2/166; H01M 2/1673; H01M 10/44; H01M 2/1686; H01M 2220/20; H01M 10/0525; B60L 50/10; B60L 50/50; B60L 53/00; H02J 7/0068; Y02E 60/122
See application file for complete search history.

(56) References Cited

U.S. PATENT DOCUMENTS 9,065,121 B2 * 6/2015 Kajita ................ H01M 2/1653

2003/0118896 A1 6/2003 Yamaguchi et al.
2008/0241697 A1 * 10/2008 Imachi ................ H01M 2/1673
429/246
2010/0323230 A1 * 12/2010 Lee ....................... H01M 2/166
429/143
2011/0135991 A1 6/2011 Sato
2013/0059192 A1 * 3/2013 Kajita ................ H01M 2/1653
429/143

FOREIGN PATENT DOCUMENTS

| JP | 08-329990 | 12/1996 |
|---|---|---|
| JP | 2000-331666 | 11/2000 |
| JP | 2002-110216 | 4/2002 |
| JP | 2003-157888 | 5/2003 |
| JP | 2004-171896 | 6/2004 |
| JP | 2006-287176 | 10/2006 |
| JP | 2007-018861 | 1/2007 |
| JP | 2008-204753 | 9/2008 |
| JP | 2009-211949 | 9/2009 |
| JP | 2009-283273 | 12/2009 |
| JP | 2010-033968 | 2/2010 |
| JP | 2011-023162 | 2/2011 |
| JP | 2011-113915 | 6/2011 |
| JP | 2012-043752 | 3/2012 |
| JP | 2012-114075 A | 6/2012 |
| JP | 2013-054972 | 3/2013 |
| JP | 2002-319386 | 10/2020 |

OTHER PUBLICATIONS

Nagayama et al., Machine translation of JP-2007018861-A, Jan. 25, 2007, obtained from espacenet.com (Year: 2007).*
Office Action issued in JP Application 2013057331, dated Mar. 15, 2016, 7 pages.
Japanese Office Action dated Aug. 9, 2016 in corresponding Japanese application No. 2013-057331 (2 pages).
International Search Report issued in connection with International Patent Application No. PCT/JP2014/000909, dated Apr. 22, 2014. (2 pages).
Japanese Office Action dated Nov. 1, 2016 in corresponding Japanese application No. 2013-057331 (3 pages).
Extended European Search Report dated Oct. 14, 2016 in corresponding European application No. 14768836.0 (10 pages).
Korean Office Action dated Jan. 31, 2020 in corresponding Korean Application No. 10-2015-7024688.
Chinese Office Action dated Dec. 31, 2019 in corresponding Chinese Application No. 201710952016.6.

* cited by examiner

Primary Examiner — Muhammad S Siddiquee
(74) Attorney, Agent, or Firm — K&L Gates LLP

(57) ABSTRACT

Provided is a separator including: a substrate; and a surface layer formed on at least one surface of the substrate, and having a higher porosity than that of the substrate. It is preferable that the surface layer includes: a first layer having convexities and concavities existing as cavities; and a second layer formed between the first layer and the separator, and the second layer has a higher porosity than that of the substrate, and the first layer has a higher porosity than that of the second layer. In this case, it is preferable that the porosity of the substrate is from 25% to 40%, the porosity of the first layer is from 60% to 90%, and the porosity of the second layer is from 40% to 65%.

18 Claims, 14 Drawing Sheets

FIG. 4
A
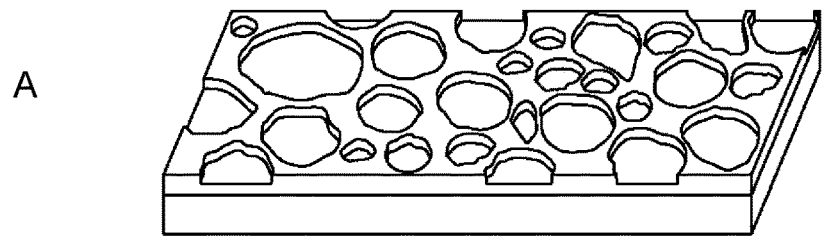
B
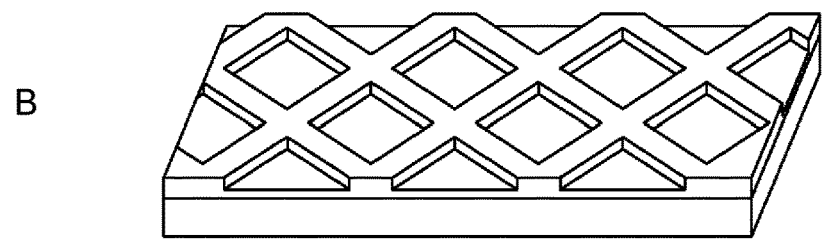
C
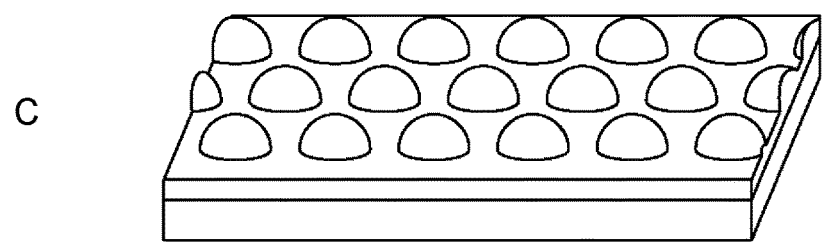
D
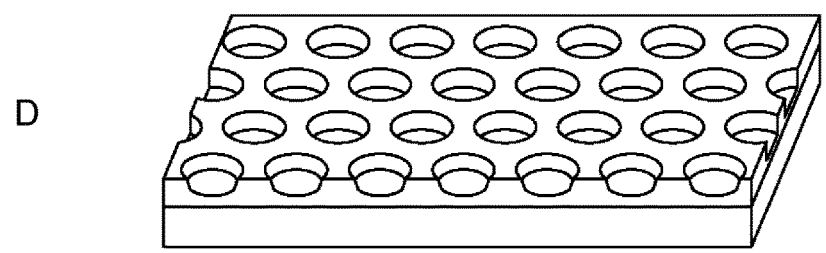
E
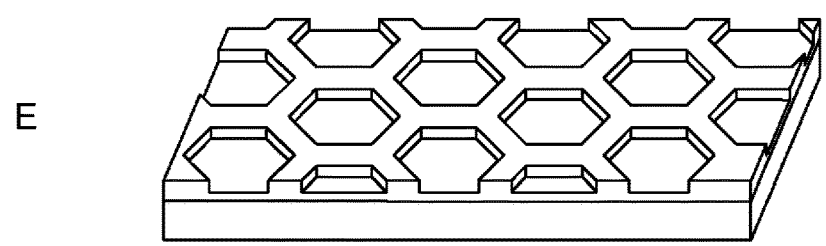

SEPARATOR, BATTERY, BATTERY PACK, ELECTRONIC APPARATUS, ELECTRIC VEHICLE, POWER STORAGE DEVICE, AND ELECTRIC POWER SYSTEM

CROSS REFERENCES TO RELATED APPLICATIONS

The present application is a national stage of International Application No. PCT/JP2014/000909 filed on Feb. 21, 2014 and claims priority to Japanese Patent Application No. 2013-057331 filed on Mar. 19, 2013, the disclosure of which is incorporated herein by reference.

BACKGROUND

The present technology relates to a separator. The present technology also relates to a battery having a separator between electrodes, and a battery pack, an electronic apparatus, an electric vehicle, a power storage device, and an electric power system using such battery.

In recent years, along with the popularization of portable electronic information apparatuses such as mobile telephones, video cameras, laptop computers and the like, improvement of performance, size reduction, and weight reduction of these apparatuses have been promoted. For the power supplies of these apparatuses, disposable primary batteries or secondary batteries that can be repeatedly used are used; however, from the viewpoint of being capable of effectively achieving a comprehensive balance between enhancement of performance, size reduction, weight reduction, economic efficiency and the like, the demand for non-aqueous electrolyte batteries, particularly the demand for lithium ion secondary batteries, is increasing. Furthermore, further enhancement of performance, size reduction, and the like are underway in connection with these apparatuses, and there is also a further demand for increasing the energy density for non-aqueous electrolyte batteries such as lithium ion secondary batteries.

Thus, for the purpose of an extensive increase in the capacity of lithium ion secondary batteries, it has been suggested to use, for example, a metallic material that is alloyed with lithium at the time of charging as a negative electrode active material as described in Patent Document 1 given below, instead of the carbon-based negative electrode active materials that have been traditionally used. Specifically, silicon, tin, and compounds thereof have been suggested to be used as the metal-based negative electrode active material. For example, it is known that tin (Sn) has a high theoretical capacity (about 994 mAh/g) that highly surpasses the theoretical capacity of graphite (about 372 mAh/g) as a negative electrode active material for lithium ion secondary batteries.

On the other hand, when silicon, tin, a compound of silicon or tin, or the like is used as the negative electrode active material, the negative electrode markedly swells at the time of charging and weighs down the surface of a separator formed from a porous film. Therefore, there is a problem that the outermost surface of the separator is compressed by conspicuous expansion of the negative electrode, and pores are collapsed. Also, when a negative electrode active material formed of silicon, tin, a compound of silicon or tin, or the like is used, there is also a problem that by-products are generated at the time of a charging-discharging reaction, and the by-products penetrate into the collapsed pores of the separator and cause clogging. As the pores of the separator are collapsed and cause clogging, the function of allowing lithium ions and the like to pass through at the time of charging and discharging is impeded, and this leads to deterioration of battery characteristics such as charging-discharging cycle characteristics.

In this regard, as can be seen in Patent Document 1 described below, there has been suggested a monolayer separator in which the porosity of the separator surface on the negative electrode side is made larger than the porosity of other areas (interior of the separator). It has been suggested to design the separator such that, by using this separator, the compressed separator surface and the separator interior may have equivalent porosity when the separator is compressed due to expansion of the negative electrode. Furthermore, as another example of Patent Document 1, it has been suggested to use a separator that is conventionally used, and a separator having a higher porosity than that of the aforementioned separator, in a stacked form, while the separator having a higher porosity is disposed on the negative electrode side.

Furthermore, Patent Document 2 and Patent Document 3 described below suggest batteries in which separators and electrodes are wound so as to have gaps therebetween. Furthermore, in Patent Document 4 indicated below, it is described that a layer having a higher porosity than a separator made of polyethylene is separately provided by forming a layer containing alumina on the negative electrode surface.

CITATION LIST

Patent Document

Patent Document 1: Japanese Patent Application Laid-Open No. 2009-211949
Patent Document 2: Japanese Patent Application Laid-Open No. 2003-157888
Patent Document 3: Japanese Patent Application Laid-Open No. 2002-110216
Patent Document 4: Japanese Patent Application Laid-Open No. 2008-204753

SUMMARY

Problems to be Solved by the Invention

The configuration disclosed in Patent Document 1 can be suitably used when a conventional carbon-based negative electrode active material is used. However, it is difficult to form a layer having a porosity that has been increased to a large extent, on the surface of a monolayer separator, and in a combination of the monolayer separator with a negative electrode active material which causes conspicuous expansion, such as a metal material that alloys with lithium, the porosity after compression has a value less than a predetermined value. Furthermore, when separators having different porosities are laminated, there is a problem that a separator having a higher porosity has low strength and is susceptible to collapse at the time of compression, and there is also a problem that the winding process becomes complicated because the number of separators is doubled when the separators and electrodes are wound.

Furthermore, in the configurations of Patent Document 2 and Patent Document 3, there is a problem that the adhesiveness between a separator and an electrode decreases by inserting a spacer between the separator and the electrode, or having a gap formed by inserting and then taking out a spacer, and the electrodes buckle in the gap area. Expansion of electrodes occurs not only in the thickness direction, but occurs in all directions. Therefore, for example, in a battery which uses a wound electrode assembly, the electrodes expand in the winding direction as well. When a gap is formed between a separator and an electrode, this gap provides a refuge for the electrode that has expanded in the winding direction, and thereby buckling of the electrode occurs.

Furthermore, in the configuration of Patent Document 4, a state is attained in which the outermost surface of the layer containing alumina may collapse at the time of expansion of the negative electrode, and a low-porosity film containing alumina is formed. The layer containing alumina maintains a porosity that does not obstruct the exchange of ions between the positive electrode and the negative electrode, as an average value for the entire layer; however, in reality, only the outermost surface area collapses to a large extent, and the battery reaction is obstructed. This leads to a conspicuous decrease in battery characteristics. In order to have the collapse of pores in the separator to an extent that does not obstruct the battery reaction even if the separator is compressed at the time of expansion of the negative electrode, it is necessary to adjust the porosity to 60% or higher when a porous layer containing inorganic particles is formed. However, the method for forming a porous layer containing inorganic particles, which has a porosity of more than 60%, has not yet been established.

Furthermore, even if the porosity of the porous layer containing inorganic particles could be adjusted to a value larger than 60%, simply increasing the porosity results in poor mechanical strength, and as expected, the outermost surface layer is compressed, which leads to collapse of the pores. When the pores are collapsed, there is also a problem that by-products penetrate into the collapsed pores of the separator and causes clogging again. As clogging of the pores proceeds, battery characteristics such as cycle characteristics are deteriorated.

The present technology has been conceived in view of such problems of the related art, and an object thereof is to provide a separator which suppresses collapse of the pores at the separator surface resulting from expansion of electrodes, and suppresses deterioration of the battery characteristics, and a battery using this separator. Another object of the present technology is to provide a battery pack, an electronic apparatus, an electric vehicle, a power storage device, and an electric power system, all of which use the battery described above.

Solutions to Problems

In order to solve the above-described problem, a separator according to the present technology includes: a substrate; and a surface layer formed on at least one surface of the substrate, and having a higher porosity than that of the substrate.

A battery according to the present technology includes: an electrode assembly having a positive electrode and a negative electrode arranged to face each other with a separator being interposed therebetween; and an electrolyte, and the separator includes: a substrate; and a surface layer formed on at least one surface of the substrate and has a higher porosity than that of the substrate.

Furthermore, a battery according to the present technology includes: an electrode assembly having a positive electrode and a negative electrode arranged to face each other with a separator being interposed therebetween; a electrolyte; a separator; and a layer having a higher porosity than that of the separator, the layer being disposed between the separator and at least one of the positive electrode and the negative electrode that are arranged to face each other with the separator interposed therebetween.

Furthermore, a battery pack, an electronic apparatus, an electric vehicle, a power storage device, and an electric power system according to the present technology include the above-described battery.

In the present technology, conspicuous collapse of the pores of the separator caused by expansion of electrodes is suppressed by providing a surface layer or a layer having a predetermined porosity.

Effect of the Invention

According to the present technology, even in a case in which an electrode which undergoes significant expansion that is accompanied by charging is used, deterioration of cycle characteristics caused by clogging of pores of a separator can be suppressed.

Additional features and advantages are described herein, and will be apparent from the following Detailed Description and the figures.

BRIEF DESCRIPTION OF THE FIGURES

FIG. 4 is a perspective view diagram illustrating the concavo-convex shapes of the separator related to the first embodiment of the present technology.

DETAILED DESCRIPTION

Hereinafter, the best modes for carrying out the present technology (hereinafter, referred to as embodiments) will be explained. Moreover, the explanation will be given as follows.

1. First embodiment (example of the separator of the present technology)
2. Second embodiment (example of a cylindrical battery employing the separator of the present technology)
3. Third embodiment (example of a square battery employing the separator of the present technology)
4. Fourth embodiment (example of a laminate film type battery employing the separator of the present technology)
5. Fifth embodiment (example of a battery pack of laminate film type batteries employing the separator of the present technology)
6. Sixth embodiment (example of a battery pack using batteries)
7. Seventh embodiment (example of a power storage system using a battery)

1. First Embodiment

The separator related to the first embodiment has a surface layer in which two layers having different porosities are laminated, formed on at least one surface of a substrate. The separator of the present technology will be explained in detail below.

(1-1) Structure of Separator

Figure 1:
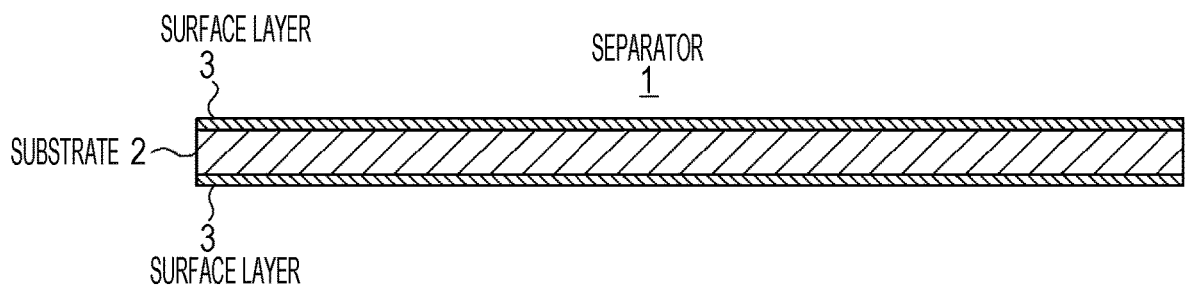
FIG. 1 is a cross-sectional diagram illustrating the configuration of a separator related to a first embodiment of the present technology.

A separator 1 related to the first embodiment includes, as illustrated in FIG. 1, a substrate 2 formed from a porous film; and a surface layer 3 formed on at least one surface of the substrate 2. The separator 1 separates a positive electrode and a negative electrode in the battery, prevents a short circuit of electric current caused by the contact between the two electrodes, and is impregnated with a non-aqueous electrolyte. The surface layer 3 of the separator 1 is intended to prevent occurrence of collapse of pores to an extent that obstructs a charging-discharging reaction even at the time of expansion of the electrode resulting from charging.

The separator 1 of the present technology exhibits a particularly remarkable effect when the separator is applied to a battery in which a metal-based material or a metal alloy-based material is used as the negative electrode active material. In a negative electrode in which a metal-based material or a metal alloy-based material is used as the negative electrode active material, considerable expansion occurs at time of charging. In a case in which the separator 1 of the present technology is applied to a battery which uses a metal-based material or a metal alloy-based material as a negative electrode active material, the separator 1 prevents pores at the surface of the separator 1 on the side facing the negative electrode from collapsing more than necessary, and exhibits a remarkable effect of suppressing deterioration of the charging-discharging cycle characteristics. Moreover, FIG. 1 shows an example of the separator 1 in which a surface layer 3 is formed on both surfaces of a substrate 2. The separator 1 may also be a separator in which the surface layer 3 is formed on any one surface of the substrate 2.

[Substrate]

The substrate 2 is a porous film constructed from an insulating film having high ion permeability and having predetermined mechanical strength. When the separator 1 is applied to a non-aqueous electrolyte battery, the non-aqueous liquid electrolyte is retained in the pores of the substrate 2. The substrate 2, as a principal part of the separator 1, has predetermined mechanical strength, and is required to have characteristics such as high resistance to non-aqueous liquid electrolytes, low reactivity, and being hardly expandable. Furthermore, in a case in which the substrate 2 is used in an electrode assembly having a wound structure, the substrate is also required to have flexibility.

Regarding the resin material that constitutes such a substrate 2, it is preferable to use, for example, a polyolefin resin such as polypropylene or polyethylene, an acrylic resin, a styrene resin, a polyester resin, or a nylon resin. Particularly, polyethylene such as low density polyethylene, high density polyethylene, or linear polyethylene; or low molecular weight waxes thereof, or polyolefin resins such as polypropylene are suitably used because these resins have appropriate melting temperatures and are easily available. Furthermore, it is also acceptable to use a structure obtained by laminating porous films of two or more kinds of these resins, or a porous film formed by melt kneading two or more kinds of the resin material. When a porous film formed from a polyolefin resin is included, optimum separability between the positive electrode and the negative electrode is obtained, and further decrease of internal short circuits can be achieved.

The thickness of the substrate 2 can be arbitrarily set as long as the thickness is a thickness at which the substrate can maintain necessary strength or more. It is preferable that the substrate 2 is set to have a thickness which promotes insulation between the positive electrode and the negative electrode and prevents a short circuit or the like, has ion permeability for suitably carrying out a battery reaction involving the separator 1, and can increase as far as possible the volumetric efficiency of the active material layer that contributes to the battery reaction in the battery. Specifically, the thickness of the substrate 2 is preferably from 7 μm to 20 μm.

The porosity of the substrate 2 is preferably from 25% to 40%, in order to obtain the ion permeability described above. The porosity may vary depending on the current value at the time of actual use of the battery and on the characteristics and thickness of the porous structure of the substrate 2; however, if the porosity is smaller than the range described above, the movement of ions in the non-aqueous liquid electrolyte in relation to charge and discharge is hampered. For this reason, the load characteristics are deteriorated, and also, it becomes difficult to extract a sufficient capacity at the time of large current discharge. Furthermore, if the porosity increases to a value outside the range described above, the strength of the separator decreases. Particularly, in a separator 1 provided with a surface layer 3 on the surface as in the case of the present technology, it is common to design the thickness of the substrate 2 to be as thin as the thickness of the surface layer 3, and make the thickness of the separator 1 as a whole to be equivalent to that of a single layer separator. For this reason, the strength of the separator 1 is highly dependent on the strength of the substrate 2, and the substrate 2 is required to have strength of a certain level or higher.

[Surface Layer]

The surface layer 3 is a porous layer formed on at least one surface of the substrate 2, which absorbs the expansion of the negative electrode resulting from charging when a portion of the surface layer 3 collapses, and also, prevents collapse of the pores over the entire surface even at the time of expansion of the negative electrode. When the separator 1 is applied to a non-aqueous electrolyte battery, the non-aqueous liquid electrolyte is retained in the pores of the surface layer 3.

Figure 2:
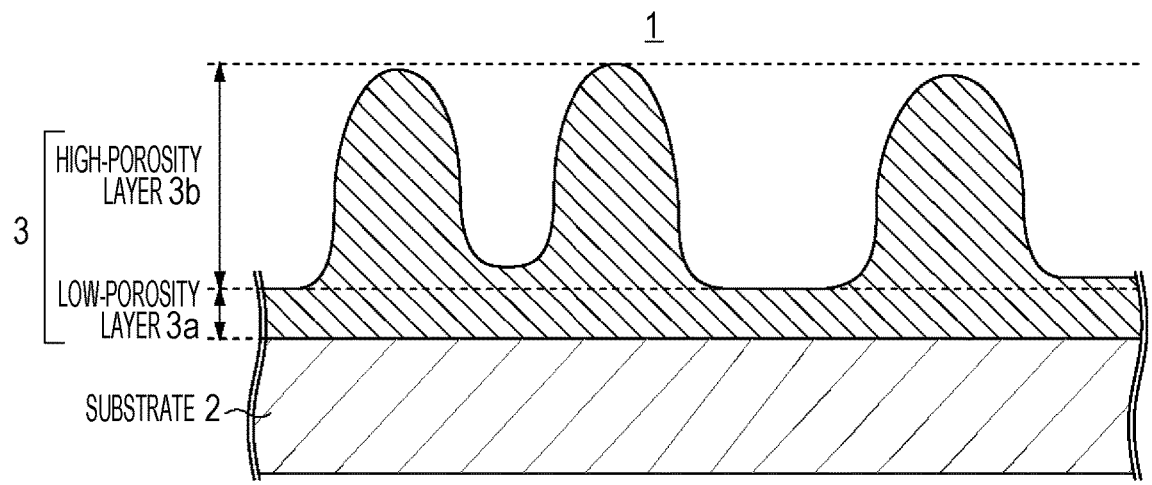
FIG. 2 is a cross-sectional diagram illustrating the configuration of the separator related to a first embodiment of the present technology in more detail.

In order to have such a function, the surface layer 3 of the present technology is a porous layer which contains a resin material, and particles such as solid particles, such as at least any kind of inorganic particles and organic particles, while the particles are present therein in a dispersed manner, the surface layer 3 having a laminated structure in which two layers having different porosities are laminated. FIG. 2 shows a magnification of a cross-section of the separator 1 of the present technology illustrated in FIG. 1. Specifically, as illustrated in FIG. 2, the separator 1 is composed of a first layer formed on the outermost surface of the separator 1 and has surface concavo-convex shapes; and a second layer formed between a substrate 2 and the first layer. The concavo-convex shapes of the first layer are formed as a result of uneven distribution of particles and the resin material.

The first layer is a high-porosity layer 3b having a higher porosity than the second layer. The second layer is a low-porosity layer 3a having a lower porosity than the first layer. Furthermore, the low-porosity layer 3a and the high-porosity layer 3b that constitute the surface layer 3 have higher porosities than the substrate 2 in order not to hamper the ion passage function of the substrate 2. Furthermore, the high-porosity layer 3b has a function of absorbing the expansion of the negative electrode cause by charging, and in order to sufficiently exhibit this function, the high-porosity layer 3b is configured to be thicker than the low-porosity layer 3a.

Figure 3:
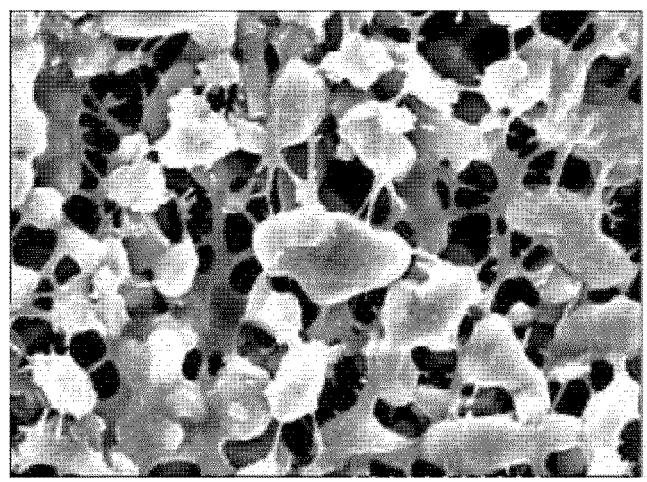
FIG. 3 is a secondary electron image obtained by a scanning electron microscope (SEM), which illustrates the configuration of a surface layer of the separator related to the first embodiment of the present technology.

The low-porosity layer 3a and the high-porosity layer 3b that constitute the surface layer 3 have a large number of minute pores formed over the entire layers, in order to have an ion permeation function, a non-aqueous liquid electrolyte retention function, and the like as the separator 1. The low-porosity layer and the high-porosity layer may have the three-dimensional network structure illustrated in FIG. 3. Moreover, FIG. 3 is a secondary electron image obtained by a scanning electron microscope (SEM), which illustrates the structure of the surface layer 3. It is preferable that the surface layer 3 has a three-dimensional network structure in which the resin material that constitutes the surface layer 3 is fibrillated, and fibrils are mutually continuously connected. The particles can maintain a dispersed state without being connected to one another, by being supported on a resin material having this three-dimensional network structure.

<High-Porosity Layer>

As illustrated in FIG. 2, the high-porosity layer 3b that is regarded as the outermost surface of the separator 1 is produced into cross-sectional concavo-convex shapes, and is configured such that tips of plural convexities are brought into contact with the positive electrode or the negative electrode. The high-porosity layer 3b refers to a part which includes convexities constructed from a resin material and particles such as solid particles, such as at least any kind of inorganic particles and organic particles; and concavities existing as cavities. Furthermore, as illustrated in FIG. 2, the high-porosity layer 3b according to the present technology refers to a region extending from the lowest part among the plural concavities to the highest part among the plural convexities in the thickness direction. Moreover, it is not necessary for the respective heights of the plural convexities thus formed to be all the same, and the heights may be different from one another.

The high-porosity layer 3b accomplishes its functions as a part of the separator 1, in which the tips of plural convexities are brought into at least one of the positive electrode and the negative electrode, and an appropriate distance is maintained between at least one of the positive electrode and the negative electrode and the substrate 2. The surface layer 3 including the high-porosity layer 3b may be formed on any one of the positive electrode-facing side or the negative electrode-facing side of the substrate 2.

Moreover, the shape of concavities of the high-porosity layer 3b illustrated in FIG. 2 is only an example, and the concavo-convex shape of the high-porosity layer 3b may be any arbitrary shape as long as it is a shape having the functions of the present technology. Examples of the concavo-convex shape include shapes such as, for example, a mottled (crater) pattern illustrated in FIG. 4A; a lattice (waffle) pattern illustrated in FIG. 4B; a dotted (pillar) pattern illustrated in FIG. 4C; a pinhole pattern illustrated in FIG. 4D, and a hexagonal lattice (honeycomb) pattern illustrated in FIG. 4E.

Specifically, when the load applied to entirety of convexities is dispersed in the low-porosity layer 3a, a cushion effect occurs, and the convexities effectively absorb the expansion of the negative electrode. Even if the surface layer 3 is provided only on the positive electrode-facing side surface of the separator 1, the substrate 2 is pressed against the positive electrode side as a result of expansion of the negative electrode, and the pressure can be absorbed by the high-porosity layer 3b provided on the positive electrode-facing side surface.

It is preferable that the surface layer 3 composed of the low-porosity layer 3a and the high-porosity layer 3b is provided on both surfaces of the substrate 2. It is because an expansion absorbing effect can be obtained from both surfaces of the substrate 2.

Furthermore, in a case in which the surface layer 3 is provided on at least one side of the substrate 2, it is preferable that the surface layer 3 is provided on the negative electrode-facing side surface. When the surface layer 3 is provided so as to face the negative electrode that undergoes expansion as a result of charging, the convexities of the high-porosity layer 3b are in contact with the negative electrode. Also, it is because when the negative electrode has expanded, entirety of the convexities that is in contact with the negative electrode can directly absorb the expansion of the negative electrode. Moreover, when the surface layer 3 is provided only on the negative electrode-facing side surface, the positive electrode-facing side surface may be left such that the substrate 2 is exposed without having the surface layer 3 formed thereon. At this time, it is preferable that the surface layer 3 is provided to be thicker than the thickness of the surface layer 3 per surface in the case in which the surface layer 3 is provided on both surfaces of the substrate 2. Furthermore, it is more preferable that the surface layer 3 is provided to have a thickness equivalent to the total thickness of the two surfaces in the case of providing the surface layer 3 on both surfaces of the substrate 2.

Furthermore, in a case in which the surface layer 3 is provided only on the negative electrode-facing side surface, a layer which has a flat shape on the surface, has a porosity equivalent to that of the low-porosity layer 3a that will be described below, and has optimum heat resistance and oxidation resistance, may be provided on the positive electrode-facing side surface. When the full charge voltage of the battery is set to be a voltage higher than the conventional cases (for example, 4.25 V or higher) or the like, the vicinity of the positive electrode may be in an oxidizing atmosphere at the time of full charge. For this reason, there is a risk that the positive electrode-facing side surface may be oxidized and deteriorated. In order to prevent this, a layer containing a resin material which has particularly optimum properties in connection with heat resistance and oxidation resistance may be formed.

Moreover, at the time of negative electrode expansion, the tip portions of the convexities may be compressed and cause collapse of the pores. However, since the high-porosity layer 3b of the present technology does not have a flat shape on the surface, the entire surface of the high-porosity layer 3b is uniformly compressed, and collapse of the pores does not occur. Furthermore, the high-porosity layer 3b of the present technology is configured to have a porous structure in which particles are supported on the resin material, and therefore has optimum strength. Therefore, even if the tips of the convexities are compressed, the pores in areas other than the tips of the convexities or in the bottom areas of the concavities are not easily collapsed, and decrease of the ion permeation performance caused by expansion of the negative electrode can be suppressed.

Moreover, when pressure is applied to the surface layer 3, the load applied to the high-porosity layer 3b is dispersed in the low-porosity layer 3a that will be described below. The low-porosity layer 3a has higher strength than the high-porosity layer 3b, and the load can be dispersed without having the occurrence of collapse caused by the load applied from the high-porosity layer 3b. As a result, the substrate 2 having weak strength is prevented from being partially collapsed by the load applied from the high-porosity layer 3b. The role of the surface layer 3 formed from particles and a resin material also lies in preventing the occurrence of collapse of the substrate 2.

Furthermore, even if non-uniformity has occurred in the ion permeability of the high-porosity layer 3b, when regions capable of permeating ions remain in parts of the high-porosity layer 3b, the ions that could pass through the high-porosity layer 3b can uniformly exist within the surface of the substrate 2 through diffusion. It is because there are no clogged areas in the low-porosity layer 3a and the substrate 2. As a result, the problem of non-permeation of ions or non-uniformity of permeation that causes deterioration of cycle characteristics can be solved.

The thickness of the high-porosity layer 3b is preferably larger than or equal to a half of the thickness of the surface layer 3. That is, in a case in which the surface layer 3 is composed of a low-porosity layer 3a and a high-porosity layer 3b, it is preferable that the thickness of the high-porosity layer 3b is equal to or thicker than the thickness of the low-porosity layer 3a. It is because when the thickness of the high-porosity layer 3b is small, the effect of absorbing the expansion of the electrode decreases, collapse of the high-porosity layer 3b becomes significant, and this leads to deterioration of battery characteristics.

Moreover, the thickness of the high-porosity layer 3b described above is a value obtainable at the time of forming the separator 1. Along with charging and discharging of the battery, the low-porosity layer 3a and the high-porosity layer 3b are compressed, and a decrease in thickness occurs. Particularly, the high-porosity layer 3b is compressed to a large extent compared with the low-porosity layer 3a. For this reason, the thickness ratio of the high-porosity layer 3b to the surface layer 3 becomes smaller as charging and discharging proceeds. In the separator 1 of the present technology, setting of the thickness at the time of forming the separator 1 is performed for the purpose of maintaining a porosity that does not obstruct the battery reaction when charging and discharging proceeds (25% or higher). It is preferable that the thickness of the high-porosity layer 3b that constitutes the separator 1 of the present technology is formed to be equal to or thicker than the thickness of the low-porosity layer 3a, as described above. Although the thickness may vary depending on the kind of the negative electrode active material, the thickness of the high-porosity layer 3b may become smaller than that of the low-porosity layer 3a as charging and discharging proceeds.

The convexities of the high-porosity layer 3b and the low-porosity layer 3a may be formed in an integral form, and the constitution including a resin material and particles, and the porosity thereof may be approximately equivalent. The high-porosity layer 3b includes convexities having the similar porosity as that of the low-porosity layer 3a, and concavities formed from pores, and the porosity of the high-porosity layer 3b is a porosity calculated from the convexities and the concavities as a whole. For this reason, when the convexities of the high-porosity layer 3b and the low-porosity layer 3a are formed in an integral form, the porosity of the high-porosity layer 3b becomes higher than the porosity of the low-porosity layer 3a.

Porosity is defined as a proportion of the sum of the pore section and the pores of the convexities with respect to the whole high-porosity layer 3b. More specifically, the porosity can be calculated by the following formula (1):

$$\text{Porosity [\%]} = \{1 - (\text{volume density of the high-porosity layer } 3b)/(\text{average specific gravity of the solid content of the high-porosity layer } 3b)\} \times 100 \quad (1)$$

Furthermore, the average specific gravity of the solid content of the high-porosity layer 3b can be calculated by the following formula (2):

$$\text{Average specific gravity of solid content [g/cm}^3\text{]} = (\text{mass } W1 + \text{mass } W2 + \ldots + \text{mass } Wn)/\{(\text{mass } W1/\text{true density } d1) + (\text{mass } W2/\text{true density } d2) + \ldots + (\text{mass } Wn/\text{true density } dn)\} \quad (2)$$

Moreover, in formula (2), mass W1 to mass Wn, and true density d1 to true density dn represent the masses (Wi [g], i=1, 2, . . . , n) and the true densities (di [g/cm³], i=1, 2, . . . , n) of i kinds of materials (i=1, 2, . . . , n) composed of any one of the resin material or particles that constitute the solid content of the high-porosity layer 3b.

That is, in a case in which the high-porosity layer 3b of the present technology is composed of one kind of resin material and one kind of particles, the average specific gravity of the solid content in the high-porosity layer 3b can be calculated by the following formula (3):

$$\begin{aligned}\text{Average specific gravity of solid content [g/cm}^3\text{]}=\\ \text{(mass of resin material+mass of particles)/\{}\\ \text{(mass of resin material/true density of resin}\\ \text{material)+(mass of particles/true density of particles)\}}\end{aligned} \quad (3)$$

The porosity calculated by such a method is calculated as the porosity of the high-porosity layer $3b$ as a whole, including the pores inside the convexities of the high-porosity layer $3b$ as well as the cavities of the concavities. It is preferable that the porosity of the high-porosity layer $3b$ calculated as such is set to a value of from 60% to 90%, more preferably set to a value of from 80% to 90%, and even more preferably set to a value of from 85% to 90%. Furthermore, it is preferable that the porosity of the convexities of the high-porosity layer $3b$ is set to be equivalent to that of the low-porosity layer $3a$, or set to a value of from 40% to 65%. When the porosity of the convexities of the high-porosity layer $3b$ is in this range, the convexities can function as pillars that support the negative electrode so as to prevent buckling of the negative electrode at the time of expansion of the electrode. Also, when an excessive compressive force is applied, the convexities are deformed and accomplish the function of relieving the significant compression received by the low-porosity layer and the substrate, as particles migrate to the concavities. At this time, the porosity of the high-porosity layer $3b$ as a whole becoming less than 25% can be prevented.

Moreover, the porosity described above is in a value range preferable during the formation of the separator 1. As a result of charging and discharging of the battery, the high-porosity layer $3b$ is significantly compressed, and a decrease in porosity occurs. According to the present technology, it is intended to maintain a porosity that does not obstruct the battery reaction when charging and discharging proceeds (25% or higher), and thereby, the porosity of the high-porosity layer $3b$ at the time of forming the separator 1 is set. The porosity of the high-porosity layer $3b$ that constitutes the separator 1 of the present technology is preferably set to a value of from 60% to 90%, as described above. Although the ratio may vary depending on the kind of the negative electrode active material, the inorganic material and the resin material constituting the high-porosity layer $3b$, and the like, the high-porosity layer $3b$ having a porosity in this range is compressed such that the porosity decreases to a value ranging from 40% to 86%, preferably to a value ranging from about 52% to 86%, and more preferably to a value ranging from 80% to 86%, by initial charging of the battery. Furthermore, when a high-porosity layer $3b$ having a porosity in this range is subjected to 500 cycles of charging and discharging of the battery, the high-porosity layer $3b$ is compressed such that the porosity is decreased to a value ranging from about 25% to 83%, preferably from 40% to 83%, and more preferably from 51% to 83%.

Examples of the resin material that constitutes the convexities of the high-porosity layer $3b$ include fluorine-containing resins such as polyvinylidene fluoride and polytetrafluoroethylene; fluorine-containing rubbers such as a vinylidene fluoride-tetrafluoroethylene copolymer and an ethylene-tetrafluoroethylene copolymer; rubbers such as a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, an acrylonitrile-acrylic acid ester copolymer, an ethylene-propylene rubber, polyvinyl alcohol, and polyvinyl acetate; cellulose derivatives such as ethyl cellulose, methyl cellulose, hydroxyethyl cellulose, and carboxymethyl cellulose; and resins with at least one of the melting point and the glass transition temperature being 180° C. or higher, such as polyphenylene ether, polysulfone, polyether sulfone, polyphenylene sulfide, polyetherimide, polyimide, polyamide such as all-aromatic polyamide (aramid), polyamideimide, polyacrylonitrile, polyvinyl alcohol, polyether, an acrylic acid resin, and polyester.

These resin materials may be used singly, or two or more kinds thereof may be used in mixture. Among them, it is preferable that the resin material includes polyvinylidene fluoride or aramid.

The convexities of the high-porosity layer $3b$ are composed of particles such as solid particles, such as at least any kind of inorganic particles and organic particles. Specific examples of inorganic particles include metal oxides, metal oxide hydrides, metal hydroxides, metal nitrides, metal carbides, and metal sulfides, which are electrically insulating inorganic particles. Regarding the metal oxides or metal oxide hydrides, aluminum oxide (alumina, $Al_2O_3$), boehmite ($Al_2O_3 \cdot H_2O$ or AlOOH), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), zinc oxide (ZnO), and the like can be suitably used. Regarding the metal nitrides, silicon nitride ($Si_3N_4$), aluminum nitride (AlN), boron nitride (BN), titanium nitride (TiN), and the like can be suitably used. Regarding the metal carbides, silicon carbide (SiC), boron carbide ($B_4C$), and the like can be suitably used. Regarding the metal sulfides, barium sulfate ($BaSO_4$) and the like can be suitably used. Regarding the metal hydroxides, aluminum hydroxide (Al(OH)$_3$) and the like can be used. Furthermore, minerals including porous aluminosilicates such as zeolites ($M_{2/n}O \cdot Al_2O_3 \cdot xSiO_2 \cdot yH_2O$, wherein M represents a metal element; $x \geq 2$; and $y \geq 0$); lamellar silicates such as talc ($Mg_3Si_4O_{10}(OH)_2$); barium titanate ($BaTiO_3$), and strontium titanate ($SrTiO_3$) may also be used. Furthermore, lithium compounds such as $Li_2O_4$, $Li_3PO_4$, and LiF may also be used. Carbon materials such as graphite, carbon nanotube, and diamond may also be used. Among them, it is preferable to use alumina, boehmite, talc, titania (particularly, one having a rutile structure), silica, or magnesia; and it is more preferable to use alumina or boehmite.

These inorganic particles may be used singly, or two or more kinds thereof may be used in mixture. Inorganic particles have oxidation resistance as well, and when the convexities of the high-porosity layer $3b$ are provided on the positive electrode side surface, the convexities have strong resistance even to the oxidative environment in the vicinity of the positive electrode at the time of charging. The shape of the inorganic particles is not particularly limited, and a spherical shape, a fibrous shape, and a random shape can all be used; however, it is particularly preferable to use spherical inorganic particles.

Examples of the material that constitutes organic particles include fluorine-containing resins such as polyvinylidene fluoride and polytetrafluoroethylene; fluorine-containing rubbers such as a vinylidene fluoride-tetrafluoroethylene copolymer and an ethylene-tetrafluoroethylene copolymer; rubbers such as a styrene-butadiene copolymer or a hydride thereof, an acrylonitrile-butadiene copolymer or a hydride thereof, an acrylonitrile-butadiene-styrene copolymer or a hydride thereof, a methacrylic acid ester-acrylic acid ester copolymer, a styrene-acrylic acid ester copolymer, an acrylonitrile-acrylic acid ester copolymer, an ethylene-propylene rubber, polyvinyl alcohol, and polyvinyl acetate; cellulose derivatives such as ethyl cellulose, methyl cellulose, hydroxyethyl cellulose, and carboxymethyl cellulose; and resins having high heat resistance with at least one of the melting point and the glass transition temperature being 180° C. or higher, such as polyphenylene ether, polysulfone, polyether sulfone, polyphenylene sulfide, polyetherimide, polyimide, polyamide such as all-aromatic polyamide (aramid), polyamideimide, polyacrylonitrileo, polyvinyl alcohol, polyether, an acrylic acid resin, and polyester. These materials may be used singly, or may be used in combination of two or more kinds thereof. The shape of the organic particles is not particularly limited, and a spherical shape, a fibrous shape, and a random shape can all be used; however, it is particularly preferable to use spherical organic particles.

In regard to the particles, it is preferable to adjust the average particle size of the primary particles to several micrometers (μm) or less, from the viewpoints of the influence on the strength of the separator and smoothness of the coated surface. Specifically, the average particle size of the primary particles is preferably 1.0 μm or less, and more preferably from 0.3 μm to 0.8 μm. Furthermore, with regard to primary particles having an average particle size of from 0.3 μm to 0.8 μm, primary particles having an average particle size of from 1.0 μm to 10 μm or a group of particles with no primary particles dispersed therein, or primary particles having an average particle size of from 0.01 μm to 0.10 μm may also be used in combination. When particles having a significantly different average particle size are incorporated, the difference in elevation of the concavo-convex shape of the surface of the surface layer 3 can be easily made large. Such average particle size of primary particles can be measured by a method of analyzing photographs obtained by electron microscope using a particle size analyzer.

When the average particle size of primary particles of the particles exceeds 1.0 μm, the separator may become brittle, and the coated surface may also become rough. Furthermore, in the case of forming the surface layer 3 containing particles on a substrate 2 by coating, if the primary particles of the particles are too large, there may be areas where a coating liquid containing the particles is not coated, and there is a risk that the coated surface may become rough. On the other hand, as described above, in a case in which primary particles having an average particle size of from 0.3 μm to 0.8 μm are used as a mixture with particles having a large average particle size, the difference in elevation of the concavo-convex shape can be made large, and the problem that the coated surface becomes rough can be used rather advantageously.

Regarding the particles, it is preferable that the mixing ratio with the resin material as a mass ratio is in the range of particles:resin material=70:30 to 98:2. That is, in regard to the high-porosity layer 3b, the content of the particles is preferably from 70% by mass to 98% by mass relative to the total mass of the particles and the resin material in the high-porosity layer 3b. Furthermore, in regard to the high-porosity layer 3b, the content of the particles is more preferably from 75% by mass to 95% by mass, and even more preferably from 80% by mass to 90% by mass, relative to the total mass of the particles and the resin material in the high-porosity layer 3b. If the content of the particles is smaller than the range described above, strength of the convexities of the high-porosity layer 3b decreases. Furthermore, if the content of the particles is larger than the range described above, the amount of the resin material supporting the particles becomes small, and it is difficult to form the convexities of the high-porosity layer 3b.

Furthermore, in a case in which a gel-like electrolyte (gel electrolyte) is used as the non-aqueous electrolyte, since the gel electrolyte also has strength to a certain extent, the gel electrolyte has a role of reinforcing the surface layer 3. Therefore, in the case of having a gel electrolyte, the content of the particles is not limited to the range described above, and when the resin material of the high-porosity layer 3b and the resin material of the gel electrolyte are of the same kind, the content of the particles may be 50% by mass or more, and preferably from 60% by mass to 95% by mass, relative to the total mass including the resin material of the gel electrolyte.

<Low-Porosity Layer>

The low-porosity layer 3a is a porous layer formed between the substrate 2 and the high-porosity layer 3b, and contains a resin material and particles. The low-porosity layer 3a is formed over the entire surface of at least one surface of the substrate 2, or in a region excluding a portion of the surface, and has a function of dispersing and supporting the load applied to the convexities of the high-porosity layer 3b formed on the surface of the low-porosity layer 3a. That is, the low-porosity layer 3a has much higher strength than the high-porosity layer 3b, and functions as a cushion layer that is disposed between the substrate 2 and the high-porosity layer 3b and supports the high-porosity layer 3b without undergoing collapse, in a case in which the electrode expands and thereby a load is applied to the high-porosity layer 3b. As a result, an excessive load is applied to the convexities of the high-porosity layer 3b only, and the occurrence of collapse in the pores of the convexities of the high-porosity layer 3b is suppressed.

Furthermore, since the load to the high-porosity layer 3b is dispersed to the low-porosity layer 3a without causing the occurrence of collapse of the low-porosity layer 3a, partial collapse of the substrate 2 with low strength caused by the load applied by the high-porosity layer 3b is prevented. The role of the surface layer 3 composed of particles and a resin material also lies in preventing the occurrence of collapse in the substrate 2.

Moreover, the low-porosity layer 3a according to the present technology is meant to include from the surface that is in contact with the surface of the substrate 2, to the lowest part among the plural concavities of the high-porosity layer 3b in the thickness direction.

Regarding the resin material and particles such as solid particles, such as at least any kind of inorganic particles and organic particles, that constitute the low-porosity layer 3a, similar materials as the resin material and particles that constitute the convexities of the high-porosity layer 3b can be used.

The porosity of the low-porosity layer 3a can be calculated by a method similar to that used for the porosity of the high-porosity layer 3b. The porosity of the low-porosity layer 3a is preferably set to a value of from 40% to 65%. Moreover, the porosity of the low-porosity layer 3a is adjusted to be higher than the porosity of the substrate 2, and to be lower than the porosity of the high-porosity layer 3b. When the porosity of the low-porosity layer 3a is in the range described above, strength of the low-porosity layer 3a is maintained, and the function of dispersing load in a case in which pressure has been applied to the high-porosity layer 3b can be sufficiently obtained. Even in a case in which collapse of the pores of the low-porosity layer 3a occurs, the porosity of the collapsed area of the low-porosity layer 3a is prevented from being decreased to an extent that obstructs the battery reaction, and a porosity higher than or equal to a predetermined value can be maintained.

The porosity described above is in a value range preferable during the formation of the separator 1. As a result of charging and discharging of the battery, similarly to the high-porosity layer 3b, the low-porosity layer 3a is also compressed, and thus a decrease in porosity occurs. According to the present technology, it is intended to maintain a porosity that does not obstruct the battery reaction when charging and discharging proceeds (25% or higher), and thereby, the porosity of the low-porosity layer 3a at the time of forming the separator 1 is set. The porosity of the low-porosity layer 3a that constitutes the separator 1 of the present technology is preferably set to a value of from 40% to 65%, as described above. Although the ratio may vary depending on the kind of the negative electrode active material, the low-porosity layer 3a having a porosity in this range is compressed such that the porosity is decreased to a range from about 40% to 60% by initial charging of the battery, and even after 500 cycles, the low-porosity layer 3a is similarly compressed so as to have a porosity in the range from about 40% to 60%.

Figure 5:
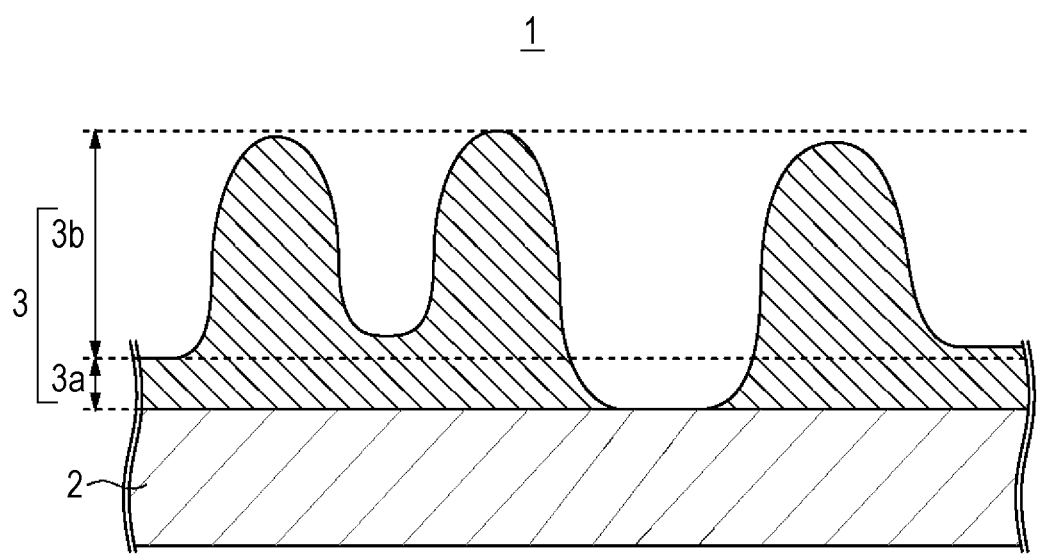
FIG. 5 is a cross-sectional diagram illustrating another configuration of the separator related to the first embodiment of the present technology in more detail.

Furthermore, as illustrated in FIG. 5, a separator 1 in which the surface layer 3 is not formed and a portion of the substrate 2 is exposed, has the low-porosity layer 3a formed in a region excluding a portion of the surface of the substrate 2, and is thus intended to be included in the present technology. A separator 1 having a portion of the substrate 2 exposed is such that, for example, at least one of the plural concavities of the high-porosity layer 3b has a shape in which the lowest part of the concavity reaches the surface of the substrate 2. In this case, the low-porosity layer 3a is meant to include from the surface that is in contact with the surface of the substrate 2, to the lowest part among the plural concavities of the high-porosity layer 3b, in the thickness direction, except the exposed part of the substrate 2.

(1-2) Other Examples of Structure of Separator

As another example of the separator of the present technology, a configuration in which a substrate and a high-porosity layer are laminated, without having a low-porosity layer provided therein, may be mentioned. In a case in which the convexities of the high-porosity layer have certain strength, expansion of the negative electrode can be effectively absorbed without providing a low-porosity layer.

Furthermore, a separator in which a high-porosity layer having a uniform thickness is provided on the surface of a substrate, may be mentioned. When this separator is applied to a battery, although the separator may be slightly inferior to the separator 1 described in section (1-1), a constant capacity retention ratio can be maintained even if charging and discharging cycles proceed.

(1-3) Method for Producing Separator

Hereinafter, a method for producing a separator 1 provided with a surface layer 3 will be explained below.

(1-3-1) First Method for Producing Separator

First Production Method Based on Phase Separation

First, a resin solution for forming a surface layer 3 is prepared. A resin material and particles that constitute the surface layer 3 are mixed at a predetermined mass ratio, the mixture is added to a dispersing solvent such as N-methyl-2-pyrrolidone, the resin material is dissolved therein, and thus a resin solution is obtained.

Regarding the dispersing solvent used in the resin solution, any solvent capable of dissolving the resin material of the present technology can all be used. Examples of the dispersing solvent that can be used include, in addition to N-methyl-2-pyrrolidone, dimethylacetamide, dimethylformamide, dimethyl sulfoxide, toluene, and acetonitrile. However, from the viewpoints of dissolvability and high dispersibility, it is preferable to use N-methyl-2-pyrrolidone.

Next, a low-porosity layer 3a is formed on the surface of the substrate 2. The resin solution is applied uniformly on at least one surface of the substrate 2. Examples of the method for coating the resin solution include a method of coating using a bar coater or the like; and a method of applying the resin solution on the surface of a roller or the like, and transferring the resin solution to the surface of the substrate 2.

Subsequently, the substrate 2 having the resin solution applied thereon is immersed in a water bath so as to cause phase separation of the resin solution, and the low-porosity layer 3a is formed. The resin solution applied on the surface of the substrate 2 is brought into contact with water or the like, which is a poor solvent for the resin material dissolved in the resin solution and is a good solvent for the dispersing solvent that dissolves the resin material, and the resin solution is finally dried by blowing hot air. Thereby, the low-porosity layer 3a formed from a resin material having a three-dimensional network structure supporting particles is formed on the surface of a substrate 2, can be obtained.

When such a method is used, the low-porosity layer 3a is formed by a rapid poor solvent-induced phase separation phenomenon, and the low-porosity layer 3a has a structure in which the skeleton formed by the resin material is connected in a fine three-dimensional network form. That is, when a resin solution containing a dissolved resin material and also containing particles is brought into contact with a solvent such as water, which is a poor solvent for the resin material and is a good solvent for the dispersing solvent that dissolves the resin material, solvent exchange occurs. Accordingly, rapid (with a high speed) phase separation accompanied by spinodal decomposition occurs, and the resin material acquires a unique three-dimensional network structure.

The low-porosity layer 3a produced as such forms a unique porous structure as a result of utilization of a rapid poor solvent-induced phase separation phenomenon accompanied by spinodal decomposition, which is caused by a poor solvent. Furthermore, the surface layer 3 enables optimum non-aqueous liquid electrolyte impregnability and ion conductivity to be realized, due to this structure.

Subsequently, a high-porosity layer 3b is formed. The resin solution is applied on the surface of the low-porosity layer 3a. At this time, it is preferable to control the coating amount of the resin solution, and to control the thickness of the high-porosity layer 3b to be larger than the thickness of the low-porosity layer 3a. Examples of the method for coating the resin solution include a method of coating using a bar coater or the like; and a method of applying the resin solution on the surface of a roller or the like, and transferring the resin solution to the surface of the substrate 2. Subsequently, the substrate 2 coated with the resin solution is immersed in a water bath to cause phase separation of the resin solution, and thus a high-porosity layer 3b is formed. At this time, ultrasonic waves are applied to the bath. Thereby, the surface shape of the high-porosity layer 3b can be made into concavo-convex shapes. Furthermore, when the resin solution is subjected to phase separation, it is more preferable to apply ultrasonic waves to the bath because particles, or groups of particles that have formed secondary particles, can be brought to a uniformly dispersed state.

Moreover, the porosity of the high-porosity layer 3b can be regulated mainly by method (i) described below, and using at least one of method (ii) and method (iii) together with method (i). The method (i) is to regulate the porosity by means of the concavo-convex shapes of the high-porosity layer 3b. Furthermore, the method (ii) and method (iii) are intended to regulate the porosity of the convexities of the high-porosity layer 3b (in the case of forming the high-porosity layer 3b and the low-porosity layer 3a in an integrated manner, the porosity of the high-porosity layer 3b and the low-porosity layer 3a).

(i) Regulation of Ultrasonic Energy Upon Phase Separation of Resin Solution

At the time of forming the high-porosity layer 3b, the energy of ultrasonic waves applied to the bath is regulated. As the energy of ultrasonic waves is larger, the concavo-convex shapes of the surface of the high-porosity layer 3b that has been completed can be made rough, that is, the porosity of the high-porosity layer 3b can be made higher.

(ii) Regulation of Solid Content Concentration in Resin Solution

The resin solution is used after the concentration of the solid content (total amount of the particles and the resin material) in the resin solution is adjusted to a desired concentration. As the ratio of the solid content in the resin solution is higher, the porosities of the low-porosity layer 3a and the high-porosity layer 3b that have been completed can be made lower.

(iii) Regulation of Particle Mass Per Volume

The mass of particles per volume in the surface layer 3 is regulated. As the mass of the particles is larger, the porosities of the low-porosity layer 3a and the high-porosity layer 3b that have been completed can be made lower.

(1-3-2) Second Method for Producing Separator

Second Production Method Based on Phase Separation

A resin solution prepared in a similar manner as in the first method for producing the separator is uniformly applied on at least one surface of a substrate 2. Thereafter, concavo-convex shapes are transferred to the surface of the applied resin solution, using a metal plate having concavo-convex shapes on the surface or the like. The surface shape of the plate formed from a metal plate having concavo-convex shapes on the surface (hereinafter, conveniently referred to as a metal plate) can be made into the concavo-convex shapes corresponding to the various shapes shown in FIG. 4 as examples.

At this time, when the concavo-convex shapes are transferred by preparing the system such that the surface of the substrate 2 is not exposed as much as possible, the layer that forms the low-porosity layer 3a and the layer that forms the high-porosity layer 3b after phase separation can be formed simultaneously. Thereafter, the resin solution is subjected to phase separation in a similar manner as in the first method for producing the separator, and thereby the low-porosity layer 3a and the high-porosity layer 3b can be formed.

Furthermore, in regard to the method described above, the low-porosity layer 3a may be formed in a similar manner as in the first method for producing the separator. That is, a method in which the resin solution uniformly applied on a substrate 2 is subjected to phase separation to thereby form a low-porosity layer 3a; subsequently the resin solution is applied again on the low-porosity layer 3a; concavo-convex shapes are transferred to the surface of the applied resin solution using a metal plate having concavo-convex shapes on the surface or the like; and then the resin solution is subjected to phase separation, may also be used.

Furthermore, the high-porosity layer 3b may also be produced using a method of applying a resin solution on the surface of a roller having concavo-convex shapes on the surface or the like, thereby transferring the resin solution to the surface of the substrate 2 or the low-porosity layer 3a, and subsequently subjecting the resin solution to phase separation. The surface shape of the roller for resin solution transfer having concavo-convex shapes on the surface, or the like, can be made into the concavo-convex shapes corresponding to the various shapes shown in FIG. 4 as examples. Furthermore, the respective thicknesses of the low-porosity layer 3a and the high-porosity layer 3b can be controlled by means of the depth of the concavo-convex shapes of the roller for transfer.

In the second production method, the thicknesses of the low-porosity layer 3a and the high-porosity layer 3b can be regulated by controlling the concavo-convex shapes of the metal plate, roller or the like having concavo-convex shapes on the surface.

As discussed above, in a case in which concavo-convex shapes are formed on the surface of the high-porosity layer 3b by transfer or the like, the porosity for the convexities of the high-porosity layer 3b can also be regulated according to the following method (iv), in addition to the methods (i) to (iii).

(iv) Proportion of Convexities in High-Porosity Layer

In the case of using a method of applying a resin solution on the surface of a roller having concavo-convex shapes on the surface or the like, and transferring the resin solution for forming the high-porosity layer 3b, as the area proportion of the convexities of the high-porosity layer 3b decreases, the porosity of the high-porosity layer 3b can be increased. The area proportion of the convexities of the high-porosity layer 3b can be regulated by changing the concavo-convex shapes on the surface of the roller or the like. That is, as the area proportion of the concavities on the surface of the roller or the like, which corresponds to the convexities of the high-porosity layer 3b decrease the area proportion of the convexities of the high-porosity layer 3b can be decreased, and the high-porosity layer 3b can be formed so as to have a high porosity. Furthermore, as the height of the convexities (difference in elevation between the convexities and the concavities) of the high-porosity layer 3b is larger, the porosity of the high-porosity layer 3b can be made higher. The height of the convexities can be regulated by the concavo-convex shapes on the surface of the roller or the like and by the viscosity of the resin solution. That is, as the difference in elevation between the concavities on the surface of the roller or the like, which correspond to the convexities of the high-porosity layer 3b, and the convexities on the surface of the roller or the like, which correspond to the concavities of the high-porosity layer 3b, is larger, the height of the convexities of the high-porosity layer 3b can be made higher, and thus the high-porosity layer 3b can be formed so as to have a high porosity. The viscosity of the resin solution can be regulated by means of the solid content ratio in the resin solution.

(1-3-3) Third Method for Producing Separator

Production Method Based on Drying at High Temperature

A resin solution is obtained by mixing a resin material and particles that constitute the surface layer 3 at a predetermined mass ratio, adding the mixture to a dispersing solvent such as 2-butanone (methyl ethyl ketone; MEK) or N-methyl-2-pyrrolidone (NMP), and dissolving the mixture. Subsequently, this resin solution is applied on at least one surface of a substrate 2.

Subsequently, the substrate 2 having the resin solution applied thereon is dried by, for example, a method such as passing the substrate through a drying furnace so as to volatilize the dispersing solvent, and thus a low-porosity layer 3a and a high-porosity layer 3b are formed. At this time, it is preferable to set the temperature at the time of drying to be sufficiently high for the dispersing solvent, so that the dispersing solvent is volatilized and bubbles are generated in the resin solution. In a third production method, when bubbles are generated in the resin solution during the drying step, bubbles are generated rapidly in the resin solution, and the low-porosity layer 3a and the high-porosity layer 3b thus formed has a porous structure and has a configuration in which particles are supported and dispersed in a resin material. Furthermore, the surface part of the surface layer 3 acquires concavo-convex shapes in a mottled pattern due to the generated bubbles, and thus the low-porosity layer 3a and the high-porosity layer 3b having concavo-convex shapes are formed.

In a case in which the surface layer 3 is formed using such a method, it is preferable to use a porous aluminosilicate such as zeolite as the particles. It is because gas is generated from the pores of the particles during the drying step, and a porous structure can be formed more effectively.

The boiling point of 2-butanone, which is an example of the dispersing solvent, is 80° C. Therefore, in the case of using 2-butanone as the dispersing solvent, when the drying temperature is set to about 100° C., 2-butanone is volatilized, and bubbles are generated in the resin solution. If the drying temperature is about 100° C., the substrate 2 is not damaged when the surface layer 3 (the low-porosity layer 3a and the high-porosity layer 3b) is formed on the surface of the substrate 2, and therefore, it is preferable. When the resin solution that uses 2-butanone as a dispersing solvent is dried, bubbles thus generated gather and form large bubbles, and convexities and concavities are produced. However, since the resin solution thinly covers the surface of the substrate 2 again, a low-porosity layer 3a is formed. Furthermore, the small bubbles generated in the resin solution realize the three-dimensional network structure of the resin material.

If the drying temperature is excessively high, there is a risk that exposure of the substrate 2 may occur, or the porosity of the low-porosity layer 3a may exceed 65%, and thereby the low-porosity layer 3a may have insufficient strength. Furthermore, if the drying temperature is excessively low, the generation of bubbles is reduced, and the porosity of the high-porosity layer 3b cannot be adjusted to more than 60%. In order to have a porosity of the high-porosity layer 3b of 60% or higher, it is necessary to perform the drying treatment at a temperature higher to some extent than the boiling point of the dispersing solvent, and to actively vaporize the dispersing solvent to generate bubbles.

The boiling point of N-methyl-2-pyrrolidone, which is an example of the dispersing solvent, is about 200° C. Therefore, in the case of using N-methyl-2-pyrrolidone as the dispersing solvent, it is necessary to adjust the drying temperature to a high temperature exceeding 200° C. Therefore, in a case in which the surface layer 3 is formed using N-methyl-2-pyrrolidone as the dispersing solvent, it is essential that the substrate 2 is constructed from a resin material having a higher melting point or thermal decomposition temperature than the boiling point of the dispersing solvent. Furthermore, as will be described below, in a case in which the surface layer 3 of the present technology is formed on the surface of at least one of the positive electrode and the negative electrode, since the positive electrode and the negative electrode have high heat resistance, N-methyl-2-pyrrolidone may be used as the dispersing solvent.

Furthermore, in the case of forming the low-porosity layer 3a, a material other than the material that generates bubbles at the time of drying at a high temperature, such as zeolite, may be used for the particles. After a resin solution containing a resin material and particles is applied and dried to form a low-porosity layer 3a having a uniform surface, a high-porosity layer 3b having concavo-convex shapes may be formed.

Moreover, the first production method to the third production method described above may be used in combination. For example, the low-porosity layer 3a may be formed to have a uniform surface by the third production method (production method based on drying at a high temperature), and then the high-porosity layer may be formed by the second production method of using a metal plate (second production method based on phase separation). In a case in which the low-porosity layer 3a having a uniform surface is formed using the third production method, the drying treatment is carried out at a low temperature. Thereby, a low-porosity layer 3a which has a reduced amount of bubble generation and has a large number of pores, but does not have concavo-convex shapes for the surface shape, can be formed.

(1-3-4) Modification Examples

The surface layer 3 of the present technology may be a layer which exists at the boundary of the substrate 2 and at least one of the positive electrode and the negative electrode, and it is not necessarily required to be a part (surface layer 3) of the separator 1. That is, as another example of the present technology, it may also be contemplated to form a surface layer composed of a low-porosity layer and a high-porosity layer on at least one of the positive electrode surface and the negative electrode surface, using a separator having a conventional configuration (configuration including a substrate 2 only). When a surface layer is formed on at least one of the positive electrode surface and the negative electrode surface, it is essential that the surface layer be formed on at least one of the positive electrode and the negative electrode that face each other, with one sheet of separator being interposed therebetween. Furthermore, when the surface layer of the present technology is formed on the positive electrode surface using the production method of the present technology, a low-porosity layer is formed on the positive electrode surface, while a high-porosity layer is formed on the low-porosity layer surface. The same also applies to the case in which the surface layer of the present technology is formed on the negative electrode surface.

In the case of such a configuration, the third production method can be applied as the method for forming a surface layer on an electrode surface.

Since the various materials that constitute the positive electrode current collector, the positive electrode active material layer, the negative electrode current collector, and the negative electrode current collector are materials having heat resistance for a temperature close to the boiling point of the dispersing solvent described above, the third production method is suitable.

Furthermore, for a battery which uses a gel electrolyte layer, which is a gel-like non-aqueous electrolyte, a predetermined amount of particles may be incorporated into the gel electrolyte layer so that the gel electrolyte layer also functions as a surface layer. The gel electrolyte layer contains a non-aqueous liquid electrolyte and a polymer compound for retaining the non-aqueous electrolyte. For this reason, when a precursor solution containing particles together with a non-aqueous liquid electrolyte and a polymer compound is applied and dried on the surface of the positive electrode and the negative electrode, or on the surface of the separator, a layer having cushion properties similar to the surface layer of the present technology can be formed between the positive electrode and the negative electrode, by forming the gel electrolyte layer so as to have a surface having concavo-convex shapes as in the case of the present technology. The concavo-convex shapes can be provided by, for example, heating and pressing the gel electrolyte layer with a heater formed from a metal plate, using a heater obtained by heating a metal plate having a shape corresponding to the desired concavo-convex shapes on the surface.

<Effect>

The separator of the first embodiment of the present technology solves the problem of the related art that it is difficult to form a porous layer containing particles having a porosity of more than 60%. Thus, even in a case in which the separator is compressed at the time of expansion of the negative electrode, it can be controlled such that the collapse of pores of the separator occurs to an extent that does not obstruct the battery reaction.

In the separator of the first embodiment, a surface layer having a high porosity can be formed by generating bubbles at the time of forming the surface layer, or by applying ultrasonic waves to the water bath at the time of phase separation. Here, when a flat surface layer having a porosity of 60% or higher is formed, there is a problem that the force that suppresses buckling of the negative electrode is weak, or a problem that a collapsed layer that cannot permeate ions is formed over the entire surface of the outermost surface part in the surface layer. In this regard, since the separator of the present technology has a surface layer composed of a first layer having surface concavo-convex shapes, and a second layer formed between the substrate 2 and the first layer, these problems do not occur.

In the surface layer of the separator of the first embodiment, the concavities are gradually filled in as the cycles progress; however, the concavities function satisfactorily as sites that permeate ions. Furthermore, the convexities formed on the surface layer of the separator of the first embodiment constitute pillar-shaped parts that suppress buckling of the negative electrode and also protect concavities. Such convexities cause uneven distribution of particles to some extent, and are formed to have sufficient strength by being formed to have a porosity of, for example, from 40% to 65%. Thus, the convexities function as pillar-shaped parts such as described above.

2. Second Embodiment

In the second embodiment, a cylindrical non-aqueous electrolyte battery which employs the separator according to the first embodiment is explained.

(2-1) Configuration of Non-Aqueous Electrolyte Battery
[Structure of Non-Aqueous Electrolyte Battery]

Figure 6:
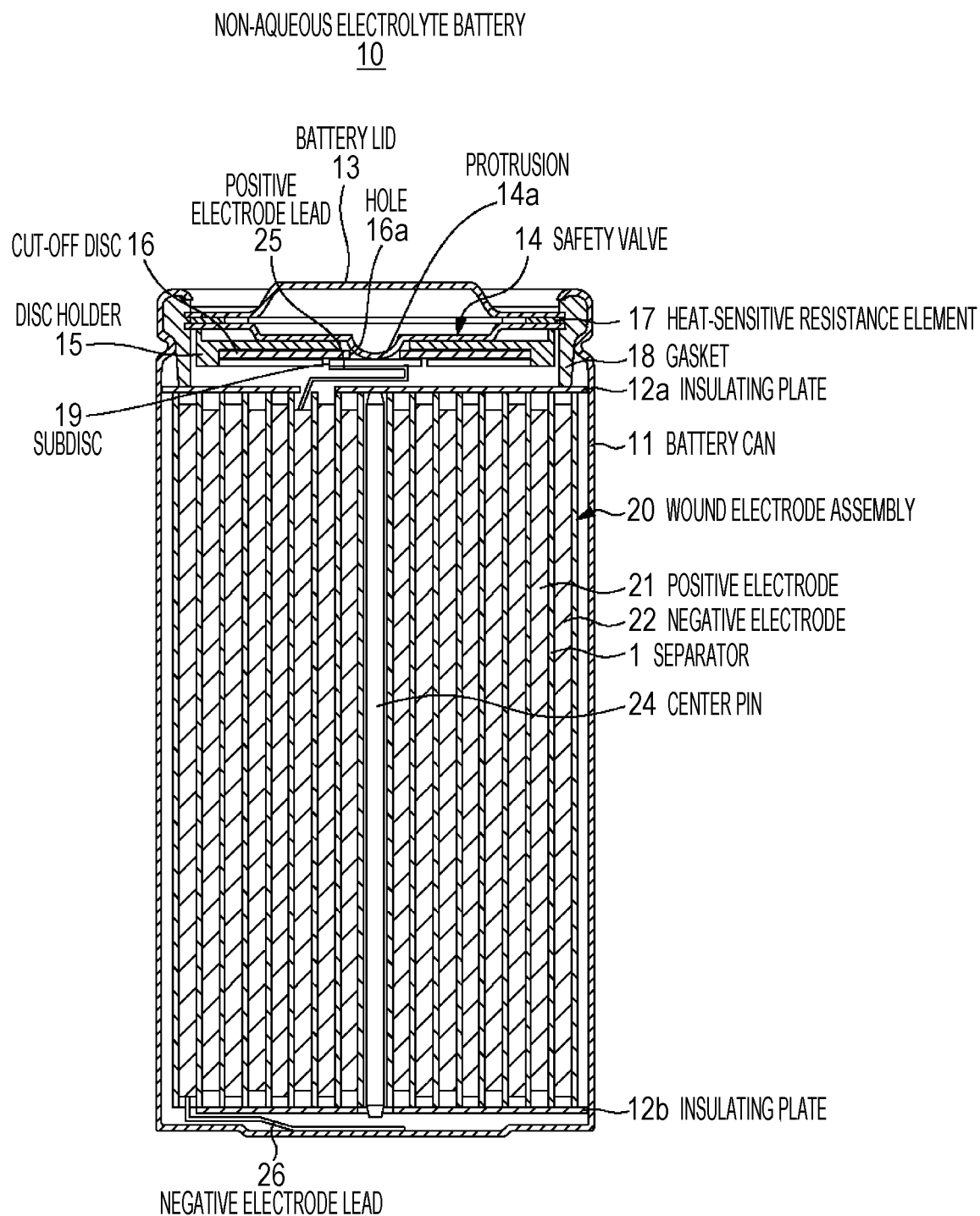
FIG. 6 is a cross-sectional diagram illustrating the configuration of a cylindrical non-aqueous electrolyte battery related to a second embodiment of the present technology.

FIG. 6 is a cross-sectional diagram illustrating an example of a non-aqueous electrolyte battery 10 according to the second embodiment. The non-aqueous electrolyte battery 10 is, for example, a non-aqueous electrolyte secondary battery capable of charging and discharging. This non-aqueous electrolyte battery 10 is a so-called cylindrical type battery, and has a wound electrode assembly 20 in which a band-shaped positive electrode 21 and a band-shaped negative electrode 22, with a separator 1 of the present technology being interposed therebetween, are wound together with a liquid non-aqueous electrolyte (hereinafter, appropriately referred to as a non-aqueous liquid electrolyte) that is not shown in the diagram, inside an nearly hollow cylinder-shaped battery can 11.

The battery can 11 is formed from, for example, nickel-plated iron, and has one end closed while having the other end opened. Inside the battery can 11, a pair of insulating plates 12a and 12b is respectively disposed perpendicularly to the winding circumferential surface, with the wound electrode assembly 20 interposed between the insulating plates.

Examples of the material for the battery can 11 include iron (Fe), nickel (Ni), stainless steel (SUS), aluminum (Al), and titanium (Ti). This battery can 11 may have been subjected to, for example, plating of nickel or the like, in order to prevent electrochemical corrosion caused by a non-aqueous liquid electrolyte during charging and discharging of the non-aqueous electrolyte battery 10. At the open end of the battery can 11, a battery lid 13 serving as a positive electrode lead plate, and a safety valve mechanism and a heat-sensitive resistance element (PTC element: Positive Temperature Coefficient element) 17 provided on the inner side of the battery lid 13, are mounted by caulking through a gasket 18 for insulation sealing.

The battery lid 13 is formed of, for example, the similar material as that of the battery can 11, and is provided with an opening for releasing the gas generated inside the battery. The safety valve mechanism has a safety valve 14, a disc holder 15, and a cut-off disc 16 superimposed in this order. A protrusion 14a of the safety valve 14 is connected to a positive electrode lead 25 led out from the wound electrode assembly 20 through a subdisc 19 that is disposed so as to cover a hole 16a provided at the center of the cut-off disc 16. As the safety valve 14 and the positive electrode lead 25 are connected through the subdisc 19, the positive electrode lead 25 is prevented from being drawn into the hole 16a at the time of reversal of the safety valve 14. Also, the safety valve mechanism is electrically connected to the battery lid 13 through a heat-sensitive resistance element 17.

The safety valve mechanism is such that when the internal pressure of the non-aqueous electrolyte battery 10 rises to a certain value or higher due to an internal short circuit in the battery or heating from the outside of the battery, the safety valve 14 is reversed, and the electrical connection between the protrusion 14a, the battery lid 13, and the wound electrode assembly 20 is cut off. That is, when the safety valve 14 is reversed, the positive electrode lead 25 is pressed by the cut-off disc 16, and the connection between the safety valve 14 and the positive electrode lead 25 is released. The disc holder 15 is formed of an insulating material, and when the safety valve 14 is reversed, the safety valve 14 and the cut-off disc 16 are insulated.

Furthermore, when more gas is generated inside the battery, and the internal pressure of the battery is further increased, a portion of the safety valve 14 is broken up, and thereby gas can be emitted to the side of the battery lid 13.

Furthermore, around the hole 16a of the cut-off disc 16, for example, plural gas venting holes (not shown in the diagram) are provided, and when gas is generated from the wound electrode assembly 20, it is configured such that gas can be effectively emitted to the side of the battery lid 13.

In regard to the heat-sensitive resistance element 17, when temperature rises, the resistance value is increased, the electric current is cut off by cutting the electrical connection between the battery lid 13 and the wound electrode assembly 20, and thus abnormal heat generation caused by an excessive current is prevented. A gasket 18 is formed of, for example, an insulating material and is coated with asphalt on the surface.

The wound electrode assembly 20 accommodated in the non-aqueous electrolyte battery 10 is wound around a center pin 24. The wound electrode assembly 20 is formed by laminating a positive electrode 21 and a negative electrode 22 in order, with a separator 1 being interposed therebetween, and winding the assembly in the longitudinal direction. In a case in which a material containing at least one of a metal element and a semimetal element as a constituent element is used as the negative electrode active material, it is preferable that the surface layer 3 composed of a low-porosity layer 3a and a high-porosity layer 3b of the separator 1 of the present technology is provided so as to face at least the negative electrode 22 side surface. In a negative electrode 22 which uses a negative electrode active material containing at least one of a metal element and a semimetal element as a constituent element, expansion and contraction that come with charging and discharging of the battery, occur to a particularly large extent. Therefore, it is preferable to provide the surface layer 3 of the separator 1 at least on the negative electrode 22 side surface, and to directly absorb the expansion of the negative electrode 22. In this case, it is preferable that the surface layer 3 composed of a low-porosity layer 3a and a high-porosity layer 3b is provided on the positive electrode 21 side surface of the separator 1. Furthermore, instead of the surface layer 3 of the present technology, a layer having optimum heat resistance and oxidation resistance may also be provided.

The positive electrode 21 is connected with a positive electrode lead 25, and the negative electrode 22 is connected with a negative electrode lead 26. The positive electrode lead 25 is electrically connected to the battery lid 13 by being welded to the safety valve 14, as described above, and the negative electrode lead 26 is electrically connected by being welded to the battery can 11.

Figure 7:
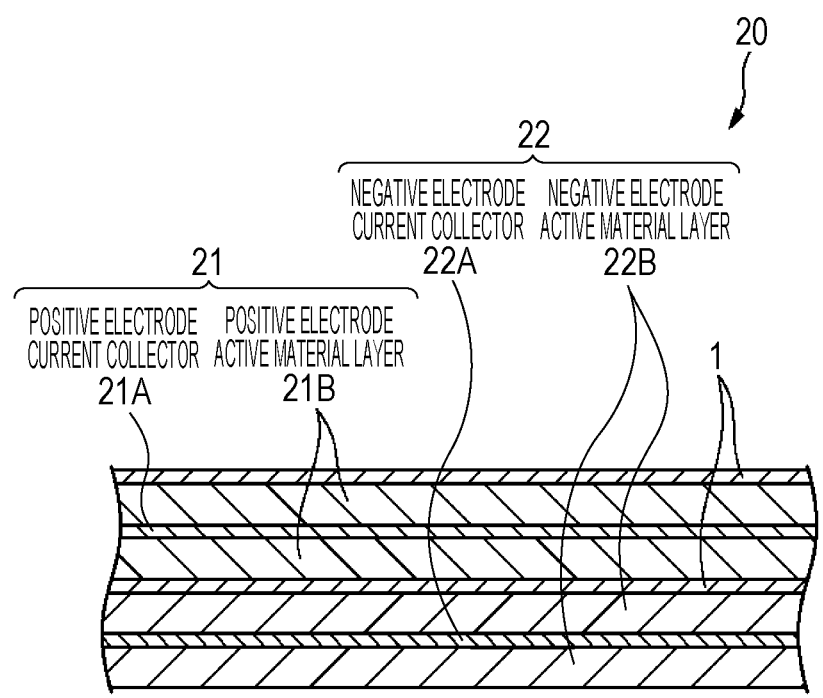
FIG. 7 is a cross-sectional diagram magnifying a portion of a wound electrode assembly that is accommodated in the cylindrical non-aqueous electrolyte battery illustrated in FIG. 6.

FIG. 7 is a magnified illustration of a portion of the wound electrode assembly 20 illustrated in FIG. 6. In the following, the positive electrode 21, the negative electrode 22, and the separator 1 will be explained in detail.

[Positive Electrode]

The positive electrode 21 is a positive electrode active material layer 21B containing a positive electrode active material formed on both surfaces of a positive electrode current collector 21A. Regarding the positive electrode current collector 21A, for example, a metal foil such as an aluminum (Al) foil, a nickel (Ni) foil, or a stainless steel (SUS) foil can be used.

The positive electrode active material layer 21B is configured to include, for example, a positive electrode active material, a conductive agent, and a binder. Regarding the positive electrode active material, any one kind or two or more kinds of positive electrode materials capable of lithium intercalation and deintercalation can be used, and the positive electrode active material may include other materials such as a binder and a conductive agent.

The positive electrode material capable of lithium intercalation and deintercalation is preferably, for example, a lithium-containing compound. It is because a high energy density is obtained. Examples of this lithium-containing compound include composite oxides containing lithium and transition metal elements, and phosphoric acid compounds containing lithium and transition metal elements. Among them, it is preferable that the lithium-containing compound contains at least one selected from the group consisting of cobalt (Co), nickel (Ni), manganese (Mn) and iron (Fe), as the transition metal element. It is because a higher voltage is obtained.

For the positive electrode material, for example, a lithium-containing compound represented by $Li_xM1O_2$ or $Li_yM2PO_4$ can be used. In the formulas, M1 and M2 represent one or more kinds of transition metal elements. The values of x and y may vary depending on the charge-discharge state of the battery, and the values are usually such that $0.05 \leq x \leq 1.10$ and $0.05 \leq y \leq 1.10$. Examples of the composite oxides containing lithium and transition metal elements include lithium-cobalt composite oxide ($Li_xCoO_2$), lithium-nickel composite oxide ($Li_xNiO_2$), lithium-nickel-cobalt composite oxide ($Li_xNi_{1-z}Co_zO_2$ ($0<z<1$), lithium-nickel-cobalt-manganese composite oxide ($Li_xNi_{(1-v-w)}Co_vMn_wO_2$ ($0<v+w<1$, $v>0$, $w>0$)), and lithium manganese composite oxide ($LiMn_2O_4$) or a lithium-manganese-nickel composite oxide ($LiMn_{2-t}Ni_tO_4$ ($0<t<2$)), both having a spinel type structure. Among them, composite oxides containing cobalt are preferred. It is because a high capacity is obtained, and also optimum cycle characteristics are obtained. Furthermore, examples of the phosphoric acid compounds containing lithium and transition metal elements include lithium-iron phosphate compound ($LiFePO_4$) and lithium-iron-manganese phosphate compound ($LiFe_{1-u}Mn_uPO_4$ ($0<u<1$)).

Specific examples of such a lithium composite oxide include lithium cobaltate ($LiCoO_2$), lithium nickelate ($LiNiO_2$), and lithium manganate ($LiMn_2O_4$). Furthermore, a solid solution in which a portion of a transition metal element is substituted with another element can also be used. For example, nickel-cobalt composite lithium oxide ($LiNi_{0.5}Co_{0.5}O_2$, $LiNi_{0.8}Co_{0.2}O_2$, or the like) is an example thereof. These lithium composite oxides are materials which can generate high voltages and have optimum energy densities.

Moreover, from the viewpoint that superior electrode chargeability and cycle characteristics are obtained, composite particles in which the surface of particles formed from any one of the lithium-containing compounds described above is coated with fine particles formed from any one of other lithium-containing compounds, may also be used.

In addition to this, examples of the positive electrode material capable of lithium intercalation and deintercalation include oxides such as vanadium oxide ($V_2O_5$), titanium dioxide ($TiO_2$), and manganese dioxide ($MnO_2$); disulfides such as iron disulfide ($FeS_2$), titanium disulfide ($TiS_2$), and molybdenum disulfide ($MoS_2$); chalcogenides (particularly, lamellar compounds and spinel type compounds) that do not contain lithium, such as niobium diselenide ($NbSe_2$); lithium-containing compounds containing lithium; sulfur; and conductive polymers such as polyaniline, polythiophene, polyacetylene, and polypyrrole. As a matter of fact, the positive electrode material capable of lithium intercalation and deintercalation may be any material other than those described above. Furthermore, the series of positive electrode materials described above may be used as mixtures of two or more kinds in arbitrary combinations.

Regarding the conductive agent, for example, a carbon material such as carbon black or graphite is used. Regarding the binder, for example, at least one selected from resin materials such as polyvinylidene fluoride (PVdF), polytetrafluoroethylene (PTFE), polyacrylonitrile (PAN), styrene-butadiene rubber (SBR), and carboxymethyl cellulose (CMC); and copolymers including these resin materials as main components, is used.

The positive electrode 21 has a positive electrode lead 25 that is connected to one end of the positive electrode current collector 21A by spot welding or ultrasonic welding. It is desirable that this positive electrode lead 25 is in the form of a metal foil or a mesh-shaped material; however, any material that is electrochemically and chemically stable and is capable of conduction may be used without any problem, even if the material is not a metal. Examples of the material for the positive electrode lead 25 include aluminum (Al) and nickel (Ni).

[Negative Electrode]

The negative electrode 22 has a structure in which, for example, a negative electrode active material layer 22B is provided on both surfaces of a negative electrode current collector 22A having a pair of surfaces that are opposite to each other. Moreover, although not shown in the diagram, it is still acceptable to provide the negative electrode active material layer 22B on only one surface of the negative electrode current collector 22A. The negative electrode current collector 22A is formed from, for example, a metal foil such as copper foil.

The negative electrode active material layer 22B is configured to include any one kind or two or more kinds of negative electrode materials capable of lithium intercalation and deintercalation as a negative electrode active material, and the negative electrode active material layer 22B may be configured to optionally include other materials such as a binder and a conductive agent similar to those of the positive electrode active material layer 21B.

Moreover, in this non-aqueous electrolyte battery 10, the electrochemical equivalent of the negative electrode material capable of lithium intercalation and deintercalation is larger than the electrochemical equivalent of the positive electrode 21, and theoretically, lithium metal is not supposed to be precipitated on the negative electrode 22 in the middle of charging.

Furthermore, this non-aqueous electrolyte battery 10 is designed such that the open circuit voltage (that is, the battery voltage) in a fully charged state is, for example, in the range from 2.80 V to 6.00 V. Particularly, when a material which forms a lithium alloy at near 0 V with respect to Li/Li$^+$ is used as the negative electrode active material, it is designed such that the open circuit voltage in a fully charged state is, for example, in the range from 4.20 V to 6.00 V. In this case, the open circuit voltage in a fully charged state is preferably set to from 4.25 V to 6.00 V. When the open circuit voltage in a fully charged state is set to 4.25 V or higher, even if the same positive electrode active material is used, the amount of lithium released per unit mass is larger compared with a battery having an open circuit voltage of 4.20 V. Therefore, the amounts of the positive electrode active material and the negative electrode active material are adjusted in accordance thereto. Thereby, a high energy density may be obtained.

Examples of the negative electrode material capable of lithium intercalation and deintercalation include carbon materials such as non-graphitizable carbon, easily graphitizable carbon, graphite, pyrolytic carbons, cokes, glassy carbons, organic polymer compound calcination products, carbon fibers, and activated carbon. Among these, examples of the cokes include pitch coke, needle coke, and petroleum coke. An organic polymer compound calcination product means a product obtained by carbonizing a polymer material such as a phenolic resin or a furan resin by calcination at an appropriate temperature, and some of the organic polymer compound calcination products are classified as non-graphitizable carbon or easily graphitizable carbon. These carbon materials are preferable because there is less change in the crystal structure occurring at the time of charging and discharging, a high charge-discharge capacity can be obtained, and satisfactory cycle characteristics can be obtained. Particularly, graphite is preferred because it has a high electrochemical equivalent and can give a high energy density. Furthermore, non-graphitizable carbon is preferred because optimum cycle characteristics are obtained. In addition, a material having a low charge-discharge potential, specifically a material having a charge-discharge potential close to that of lithium metal, is preferred because increase of the energy density of batteries can be easily realized.

Examples of other negative electrode materials that are capable of lithium intercalation and deintercalation and are capable of capacity increase include materials which are capable of lithium intercalation and deintercalation and contain at least one of metal elements and semimetal elements as a constituent element. It is because when such a material is used, a high energy density can be obtained. Particularly, when such a material is used together with a carbon material, it is more preferable because a high energy density can be obtained, and also, optimum cycle characteristics can be obtained. This negative electrode material may be a simple substance, an alloy or a compound of a metal element or a semimetal element, and may also be a material having one phase or two or more phases of these materials in at least a portion. Moreover, according to the present technology, alloys include alloys composed of two or more kinds of metal elements, as well as alloys containing one or more kinds of metal elements and one or more kinds of semimetal elements. Furthermore, alloys may also contain non-metal elements. The structure of an alloy may be a solid solution, a eutectic crystal (eutectic mixture), or an intermetallic compound, or two or more kinds thereof may co-exist in the structure.

Examples of the metal element or semimetal element that constitutes this negative electrode material include metal elements or semimetal elements that are capable of forming alloys with lithium. Specific examples thereof include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These may be in a crystalline state or may be in an amorphous state.

Examples of the negative electrode material include lithium titanate ($Li_4Ti_5O_{12}$). Furthermore, regarding the negative electrode material, a material containing a metal element or a semimetal element of Group 4B in the short period periodic table as a constituent element is preferred, and a more preferred one is a material containing at least one of silicon (Si) and tin (Sn) as a constituent element, while a particularly preferred one is a material containing at least silicon. It is because silicon (Si) and tin (Sn) have a high ability to intercalate and deintercalate lithium, and high energy densities can be obtained. Examples of the negative electrode material having at least one of silicon and tin include simple substance, an alloy or a compound of silicon, simple substance, an alloy or a compound of tin, and a material having one phase or two or more phases thereof in at least a portion thereof.

Examples of alloys of silicon include alloys containing, as a second constituent element in addition to silicon, at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of alloys of tin include alloys containing, as a second constituent element in addition to tin (Sn), at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the compound of tin (Sn) or the compound of silicon (Si) include compounds containing oxygen (O) or carbon (C), and these compounds may also contain the second constituent elements described above, in addition to tin (Sn) or silicon (Si).

Among them, regarding this negative electrode material, a SnCoC-containing material that contains cobalt (Co), tin (Sn) and carbon (C) as constituent elements, has a content of carbon of from 9.9% by mass to 29.7% by mass, and has a proportion of cobalt (Co) of from 30% by mass to 70% by mass with respect to the sum of tin (Sn) and cobalt (Co), is preferred. It is because high energy densities can be obtained, and optimum cycle characteristics can be obtained in such a composition range.

This SnCoC-containing material may further contain another constituent element, if necessary. Preferred examples of the other constituent element include silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), and bismuth (Bi), and the SnCoC-containing material may contain two or more kinds thereof. It is because the capacity or cycle characteristics can be further enhanced.

Moreover, it is preferable that this SnCoC-containing material has a phase containing tin (Sn), cobalt (Co) and carbon (C), and this phase has a structure with low crystallinity or an amorphous structure. Furthermore, it is preferable that in this SnCoC-containing material, at least a portion of carbon (C) as a constituent element is bonded to a metal element or semimetal element as another constituent element. It is because although a decrease of cycle characteristics is considered to be caused by aggregation or crystallization of tin (Sn) or the like, such aggregation or crystallization can be suppressed when carbon (C) is bonded to another element.

Regarding an analytic method of investigating the bonded state of elements, for example, X-ray photoelectron spectroscopy (XPS) may be used. In XPS, in the case of graphite, the peak of the is orbital (Cis) of carbon is observed at 284.5 eV when analyzed by an apparatus that has been subjected to energy calibration so as to obtain the peak of the 4f orbital of a gold atom (Au4f) at 84.0 eV. Furthermore, in the case of surface contamination carbon, the peak of C1s is observed at 284.8 eV. On the contrary, when the charge density of carbon element is increased, for example, when carbon is bonded to a metal element or a semimetal element, the peak of Cis is observed in a region lower than 284.5 eV. That is, in a case in which the peak of a synthetic wave of C1s obtainable from a SnCoC-containing material is observed in a region lower than 284.5 eV, at least a portion of the carbon contained in the SnCoC-containing material is bonded to a metal element or a semimetal element as another constituent element.

Moreover, in the XPS analysis, for example, the peak of C1s is used for the compensation of the energy axis of the spectrum. Since surface contamination carbon usually exists on the surface, the peak of C1s of the surface contamination carbon is set to 284.8 eV, and this is used as an energy reference. In the XPS analysis, since the waveform of the peak of C1s is obtained as a form including the peak of the surface contamination carbon and the peak of carbon in the SnCoC-containing material, for example, the peak of the surface contamination carbon and the peak of carbon in the SnCoC-containing material are separated by analyzing the waveform using a commercially available software. For the analysis of the waveform, the position of the main peak existing on the lowest bound energy side is designated as the energy reference (284.8 eV).

[Separator]

The separator 1 is similar to that of the first embodiment.

[Non-Aqueous Liquid Electrolyte]

The non-aqueous liquid electrolyte includes an electrolyte salt and a non-aqueous solvent that dissolves this electrolyte salt.

The electrolyte salt contains, for example, one kind or two or more kinds of light metal compounds such as a lithium salt. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Among them, at least one selected from the group consisting of lithium hexafluorophosphate, lithium tetrafluoroborate, lithium perchlorate, and lithium hexafluoroarsenate is preferred, and lithium hexafluorophosphate is more preferred.

Examples of the non-aqueous solvent include non-aqueous solvents, such as lactone-based solvents such as γ-butyrolactone, γ-valerolactone, δ-valerolactone, and ε-caprolactone; carbonic acid ester-based solvents such as ethylene carbonate, propylene carbonate, butylene carbonate, vinylene carbonate, dimethyl carbonate, ethyl methyl carbonate, and diethyl carbonate; ether-based solvents such as 1,2-dimethoxyethane, 1-ethoxy-2-methoxyethane, 1,2-diethoxyethane, tetrahydrofuran, and 2-methyltetrahydrofuran; nitrile-based solvents such as acetonitrile; sulfolane-based solvents; phosphoric acids and phosphoric acid ester solvents; and pyrrolidones. Regarding the non-aqueous solvents any one kind thereof may be used alone, or two or more kinds may be used in mixture.

Furthermore, it is preferable to use a cyclic carbonic acid ester and a chain-like carbonic acid ester in mixture as the non-aqueous solvent, and a solvent including a compound in which part or all of the hydrogen atoms of the cyclic carbonic acid ester or the chain-like carbonic acid ester have been fluorinated, is more preferred. Regarding this fluorinated compound, it is preferable to use fluoroethylene carbonate (4-fluoro-1,3-dioxolan-2-one; FEC) and difluoroethylene carbonate (4,5-difluoro-1,3-dioxolan-2-one; DFEC). It is because even in a case in which a negative electrode 22 containing a compound of silicon (Si), tin (Sn), germanium (Ge) or the like is used as the negative electrode active material, the charge-discharge cycle characteristics can be enhanced. Among them, it is preferable to use difluoroethylene carbonate as the non-aqueous solvent. It is because the cycle characteristics improving effect is optimum.

Furthermore, the non-aqueous liquid electrolyte may be in the form of a gel electrolyte by being retained in a polymer compound. The polymer compound that retains the non-aqueous liquid electrolyte may be any compound capable of absorbing a non-aqueous solvent and gelling, and examples thereof include fluorine-based polymer compounds such as polyvinylidene fluoride (PVdF) and a copolymer containing vinylidene fluoride (VdF) and hexafluoropropylene (HFP) in the repeating units; an ether-based polymer compound such as polyethylene oxide (PEO) and a crosslinked body containing polyethylene oxide (PEG); and polymer compounds including polyacrylonitrile (PAN), polypropylene oxide (PPO) and polymethyl methacrylate (PMMA) as repeating units. Regarding the polymer compounds, any one kind thereof may be used alone, or two or more kinds thereof may be used in mixture.

Particularly, a fluorine-based polymer compound is desirable from the viewpoint of oxidation-reduction stability, and among others, a copolymer containing vinylidene fluoride and hexafluoropropylene as components is preferred. Furthermore, this copolymer may include a monoester of an unsaturated dibasic acid such as maleic acid monomethyl ester (MMM), an ethylene halide such as ethylene trifluoride chloride (PCTFE), a cyclic carbonic acid ester of an unsaturated compound such as vinylene carbonate (VC), an epoxy group-containing acrylic vinyl monomer, or the like as a component. It is because superior characteristics can be obtained.

(2-2) Method for Producing Non-Aqueous Electrolyte Battery

[Method for Producing Positive Electrode]

A paste-like positive electrode mix slurry is produced by preparing a positive electrode mix by mixing a positive electrode active material, a conductive agent and a binder, and dispersing this positive electrode mix in a solvent such as N-methyl-2-pyrrolidone. Subsequently, this positive electrode mix slurry is applied on a positive electrode current collector 21A, the solvent is dried, and the assembly is compression molded using a roll pressing machine or the like to thereby form a positive electrode active material layer 21B. Thus, the positive electrode 21 is produced.

[Method for Producing Negative Electrode]

A paste-like negative electrode mix slurry is produced by preparing a negative electrode mix by mixing a negative electrode active material and a binder, and dispersing this negative electrode mix in a solvent such as N-methyl-2-pyrrolidone. Subsequently, this negative electrode mix slurry is applied on a negative electrode current collector 22A, the solvent is dried, and the assembly is compression molded using a roll pressing machine or the like to thereby form a negative electrode active material layer 22B. Thus, the negative electrode 22 is produced.

[Preparation of Non-Aqueous Liquid Electrolyte]

A non-aqueous liquid electrolyte is prepared by dissolving an electrolyte salt in a non-aqueous solvent.

[Assembling of Non-Aqueous Electrolyte Battery]

A positive electrode lead 25 is attached to the positive electrode current collector 21A by welding or the like, and also, a negative electrode lead 26 is attached to the negative electrode current collector 22A by welding or the like. Thereafter, the positive electrode 21 and the negative electrode 22 are wound, with the separator 1 of the present technology being interposed therebetween, and thus a wound electrode assembly 20 is obtained. Moreover, in a case in which a material containing at least one of a metal element and a semimetal element as a constituent element is used as the negative electrode active material, the surface layer 3 composed of a low-porosity layer 3a and a high-porosity layer 3b of the separator 1 of the present technology should be provided at least on the negative electrode 22 side surface.

Subsequently, the tip of the positive electrode lead 25 is welded to a safety valve mechanism, and the tip of the negative electrode lead 26 is welded to a battery can 11. Subsequently, the wound surface of the wound electrode assembly 20 is disposed between a pair of insulating plates 12 and 13, and the whole assembly is accommodated inside the battery can 11. After the wound electrode assembly 20 is accommodated inside the battery can 11, a non-aqueous liquid electrolyte is injected into the interior of the battery can 11, and the separator 1 is impregnated therewith. Thereafter, a battery lid 13, a safety valve mechanism composed of a safety valve 14 and the like, and a heat-sensitive resistance element 17 are fixed to the open end of the battery can 11 by caulking with a gasket 18. Thereby, the non-aqueous electrolyte battery 10 of the present technology illustrated in FIG. 6 is formed.

In this non-aqueous electrolyte battery 10, when the battery is charged, for example, lithium ions are deintercalated from the positive electrode active material layer 21B and are intercalated into the negative electrode active material layer 22B through the non-aqueous liquid electrolyte impregnated in the separator 1. Also, when the battery is discharged, for example, lithium ions are deintercalated from the negative electrode active material layer 22B and are intercalated into the positive electrode active material layer 21B through the non-aqueous liquid electrolyte impregnated in the separator 1.

Furthermore, as a modification example, a configuration in which the substrate 2 according to the first embodiment is used as a separator, a layer similar to the surface layer 3 composed of a low-porosity layer 3a and a high-porosity layer 3b is provided on the surfaces of the positive electrode 21 and the negative electrode 22 such that the high-porosity layer 3b comes to the outer side, may also be employed.

<Effect>

In a cylindrical non-aqueous electrolyte battery that uses the separator of the present technology, the expansion and contraction of the electrodes (particularly, the negative electrode) resulting from charging and discharging can be absorbed by the high-porosity layer 3b of the separator 1, collapse and clogging of the pores on the surface can be suppressed in the separator 1 as a whole. Therefore, the decrease of the battery characteristics of the cylindrical non-aqueous electrolyte battery caused by charging and discharging can be suppressed.

3. Third Embodiment

In the third embodiment, a square non-aqueous electrolyte battery which employs the separator according to the first embodiment is explained.

(3-1) Configuration of Non-Aqueous Electrolyte Battery

Figure 8:
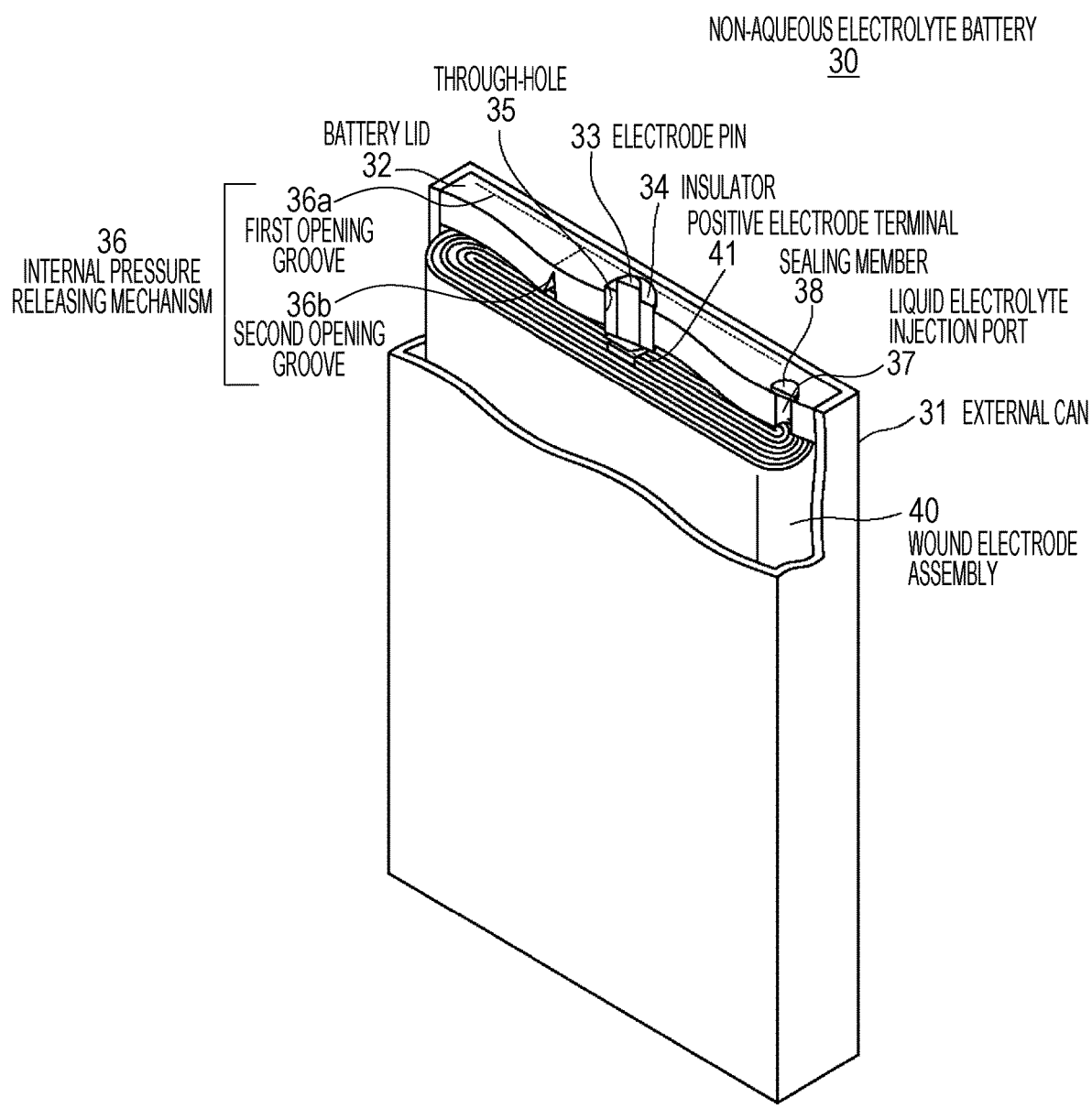
FIG. 8 is a schematic diagram illustrating the configuration of a square non-aqueous electrolyte battery related to a third embodiment of the present technology.

FIG. 8 illustrates the configuration of a non-aqueous electrolyte battery 30 according to the third embodiment. This non-aqueous electrolyte battery is a so-called square battery, and accommodates the wound electrode assembly 40 in a square outer can 31.

The non-aqueous electrolyte battery 30 is configured to include a square-shaped outer can 31; a wound electrode assembly 40, which is a power generating element, accommodated in this outer can 31; a battery lid 32 that closes the opening of the outer can 31; and an electrode pin 33 provided approximately at the center of the battery lid 32.

The outer can 31 is formed as a bottomed hollow square tube using, for example, an electrically conductive metal such as iron (Fe). The inner surface of this outer can 31 is preferably configured so as to increase electrical conductivity of the outer can 31, for example, by providing nickel plating or applying a conductive coating material. Furthermore, the outer peripheral surface of the outer can 31 may be protected by, for example, being covered with an external label formed from a plastic sheet or paper, or being coated with an insulating coating material. The battery lid 32 is formed of, for example, an electrically conductive metal such as iron (Fe) similarly to the outer can 31.

The wound electrode assembly 40 has a configuration similar to that of the second embodiment, and is obtained by laminating a positive electrode and a negative electrode, with the separator of the present technology being interposed therebetween, and winding the assembly in an elliptical and slender shape. In a case in which a material containing at least one of a metal element and a semimetal element as a constituent element is used as the negative electrode active material, it is preferable that the surface layer composed of a low-porosity layer and a high-porosity layer of the separator of the present technology is provided so as to face at least the negative electrode side surface. The positive electrode, negative electrode, separator and non-aqueous liquid electrolyte are similar to those of the first embodiment or the second embodiment, and detailed explanation will not be repeated. Furthermore, a gel electrolyte layer obtained by retaining a non-aqueous liquid electrolyte in a polymer compound may be formed between the positive electrode, the separator, and the negative electrode.

The wound electrode assembly 40 having such a configuration is provided with a number of positive electrode terminals 41 connected to the positive electrode current collector, and a number of negative electrode terminals connected to the negative electrode current collector. All of the positive electrode terminals 41 and negative electrode terminals are led out to an end in the axial direction of the wound electrode assembly 40. The positive electrode terminals 41 are connected to the lower end of the electrode pin 33 by a fixing means such as welding. Furthermore, the negative electrode terminals are connected to the inner surface of the outer can 31 by a fixing means such as welding.

The electrode pin 33 is formed from an electrically conductive axial member, and is retained by an insulating body 34 in a state of having the head portion protruded to the upper end. The electrode pin 33 is fixed approximately at the center of the battery lid 32 through the insulating body 34. The insulating body 34 is formed of a material having high insulation properties, and is fitted to a through-hole 35 provided on the surface side of the battery lid 32. Furthermore, the electrode pin 33 passes through the through-hole 35, and the tips of the positive electrode terminals 41 are fixed to the lower end surface of the through-hole 35.

The battery lid 32 provided with such an electrode pin 33 and the like is fitted to the opening of the outer can 31, and the contact surface between the outer can 31 and the battery lid 32 is joined by a fixing means such as welding. Thereby, the opening of the outer can 31 is tightly sealed by the battery lid 32, and thus the outer can is constructed to be air-tight and liquid-tight. This battery lid 32 is provided with an internal pressure releasing mechanism 36 that breaks part of the battery lid 32 when the pressure inside the outer can 31 rises to a predetermined value or higher, and thereby loosens (releases) the internal pressure to the outside.

The internal pressure releasing mechanism 36 is configured to include two first opening grooves 36a (one first opening groove 36a is not shown in the diagram) extending linearly in the longitudinal direction on the inner surface of the battery lid 32; and a second opening groove 36b similarly extending in the width direction that is perpendicular to the longitudinal direction on the inner surface of the battery lid 32, with the two ends of the second opening groove 36b being in communication with the two first opening grooves 36a. The two first opening grooves 36a are installed in parallel to each other along the outer periphery of the longer edge side of the battery lid 32 in the vicinity of the inner side of two longer edges that are positioned to face the width direction of the battery lid 32. Furthermore, the second opening groove 36b is provided to be positioned approximately in the middle between the outer periphery on the side of one shorter edge in one side of the longitudinal direction of the electrode pin 33, and the electrode pin 33.

One of the first opening grooves 36a and the second opening groove 36b together form, for example, a V-shape in which the cross-section shape opens on the lower surface side. Moreover, the shape of the first opening groove 36a and the second opening groove 36b is not limited to the V-shape disclosed in this embodiment. For example, the shape of the first opening groove 36a and the second opening groove 36b may be a U-shape or a semicircular shape.

A liquid electrolyte injection port 37 is provided so as to pass through the battery lid 32. The liquid electrolyte injection port 37 is used to inject the non-aqueous liquid electrolyte after the battery lid 32 and the outer can 31 are caulked, and after the injection of the non-aqueous liquid electrolyte, the liquid electrolyte injection port is sealed with a sealing member 38. Therefore, in a case in which the wound electrode assembly is produced by forming a gel electrolyte between the positive electrode, the separator, and the negative electrode in advance, the liquid electrolyte injection port 37 and the sealing member 38 may not be provided.

[Separator]

The separator has similar configuration as that of the first embodiment.

[Non-Aqueous Liquid Electrolyte]

Regarding the non-aqueous liquid electrolyte, the one described in the second embodiment can be used. Furthermore, a gel electrolyte obtained by retaining a non-aqueous liquid electrolyte in a polymer compound, such as described in the second embodiment, may also be used.

(3-2) Method for Producing Non-Aqueous Electrolyte Battery

This non-aqueous electrolyte battery can be produced, for example, as follows.

[Method for Producing Positive Electrode and Negative Electrode]

The positive electrode and the negative electrode can be produced by methods similar to those of the second embodiment.

[Assembling of Non-Aqueous Electrolyte Batter]

Similarly to the second embodiment, a wound electrode assembly 40 that is wound in an elliptical and slender shape is produced by laminating a positive electrode, a negative electrode, and the separator of the present technology in order and winding the assembly. Subsequently, the wound electrode assembly 40 is accommodated in an outer can 31, which is a rectangular can made of, for example, a metal such as aluminum (Al) or iron (Fe).

Then, an electrode pin 33 provided on a battery lid 32 and a positive electrode terminal 41 led out from the wound electrode assembly 40 are connected, and subsequently the opening is sealed with the battery lid 32. A non-aqueous liquid electrolyte is injected through a liquid electrolyte injection port 37, for example, under reduced pressure, and the battery is sealed with a sealing member 38. Thus, this non-aqueous electrolyte battery can be obtained.

Furthermore, as a modification example, a configuration in which the substrate 2 according to the first embodiment is used as a separator, and a layer similar to the surface layer 3 composed of a low-porosity layer 3a and a high-porosity layer 3b is provided on the surfaces of the positive electrode and the negative electrode such that the high-porosity layer 3b comes to the outer side, may also be used.

<Effect>

The third embodiment can obtain effects similar to those of the second embodiment.

4. Fourth Embodiment

In the fourth embodiment, a laminate film type non-aqueous electrolyte battery employing the separator according to the first embodiment is explained.

(4-1) Configuration of Non-Aqueous Electrolyte Battery

Figure 9:
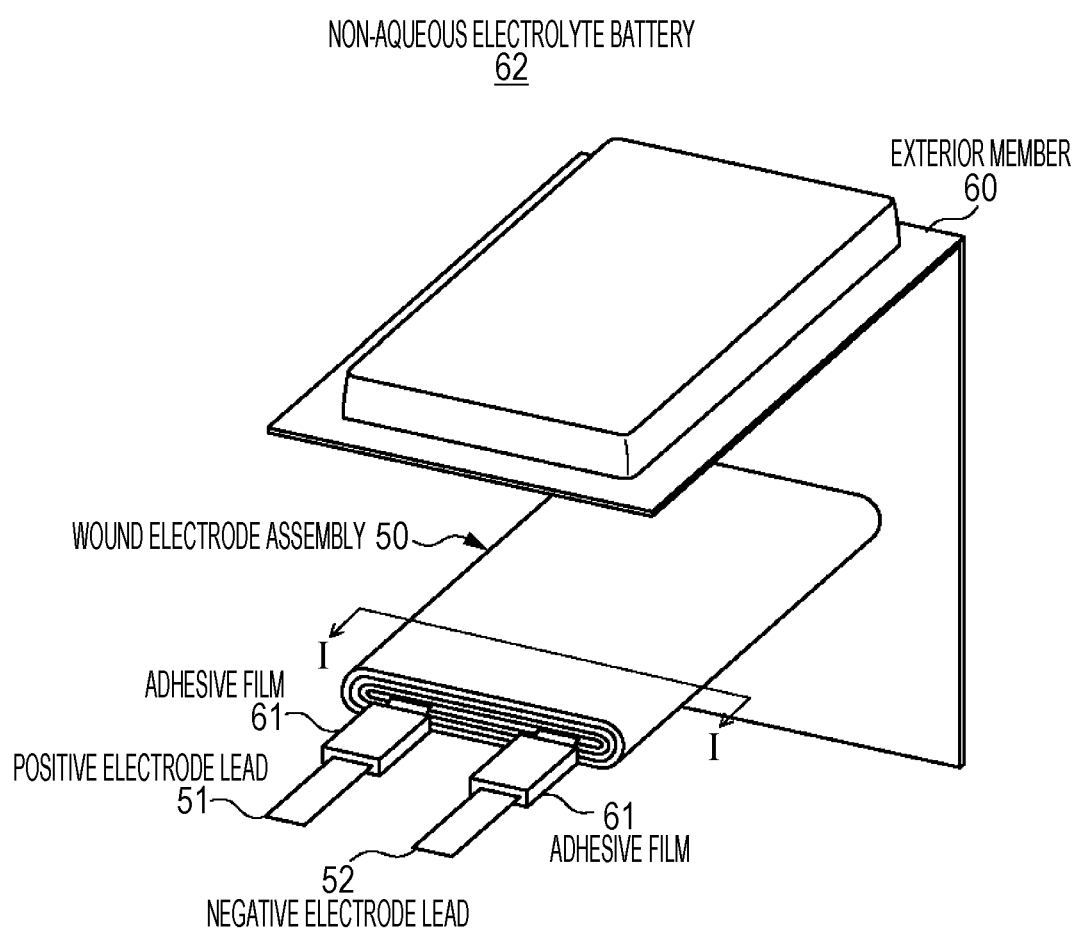
FIG. 9 is an exploded perspective view diagram illustrating the configuration of a laminate film type non-aqueous electrolyte battery related to a fourth embodiment of the present technology.

FIG. 9 illustrates the configuration of a non-aqueous electrolyte battery 62 according to the fourth embodiment. This non-aqueous electrolyte battery 62 is a so-called laminate film type, and is a product in which a wound electrode assembly 50 equipped with a positive electrode lead 51 and a negative electrode lead 52 is accommodated inside a film-like exterior member 60.

The positive electrode lead 51 and the negative electrode lead 52 are respectively led out from the interior of the exterior member 60 toward the outside, for example, in the same direction. The positive electrode lead 51 and the negative electrode lead 52 are respectively constructed from, for example, a metal material such as aluminum, copper, nickel or stainless steel, and are respectively formed in a thin plate form or a mesh form.

The exterior member 60 is formed from, for example, a laminate film in which a resin layer is formed on both surfaces of a metal layer. In the laminate film, an outer resin layer is formed on the surface that is exposed to the outside of the battery in the metal layer, and an inner resin layer is formed on the surface on the inner side of the battery, which faces the power generating element such as the wound electrode assembly 50.

The metal layer plays the most important role of blocking penetration of moisture, oxygen and light, and protecting the content, and from the viewpoints of lightness, extensibility, price, and the ease of processing, aluminum (Al) is most effectively used. The outer resin layers have good appearance, toughness, flexibility and the like, and a resin material such as nylon or polyethylene terephthalate (PET) is used. The inner resin layers are parts that are melted by heat or ultrasonic waves and are fused with each other, and therefore, a polyolefin resin is appropriate, while cast polypropylene (CPP) is frequently used. If necessary, an adhesive layer may be provided between the metal layer and the outer resin layer as well as the inner resin layer.

The exterior member 60 is provided with a recess for accommodating the wound electrode assembly 50, which is formed, for example, from the inner resin layer side toward the direction of the outer resin layer by deep drawing, and the inner resin layer is installed to face the wound electrode assembly 50. The inner resin layers facing each other in the exterior member 60 are closely adhered to each other by fusion or the like at the outer periphery of the recess. Disposed between the exterior member 60 and the positive electrode lead 51 as well as the negative electrode lead 52 is an adhesive film 61 for increasing the adhesiveness between the inner resin layer of the exterior member 60 and the positive electrode lead 51 as well as the negative electrode lead 52 formed from a metal material. The adhesive film 61 is formed from a resin material which is highly adhesive to a metal material, and the adhesive film 61 is constructed from, for example, a polyolefin resin such as polyethylene, polypropylene, or a modified polyethylene or a modified polypropylene obtained by modifying polyethylene or polypropylene.

Moreover, the exterior member 60 may be constructed from a laminate film having a different structure, a polymer film of polypropylene or the like, or a metal film, instead of the aluminum laminate film in which the metal layer is formed of aluminum (Al).

Figure 10:
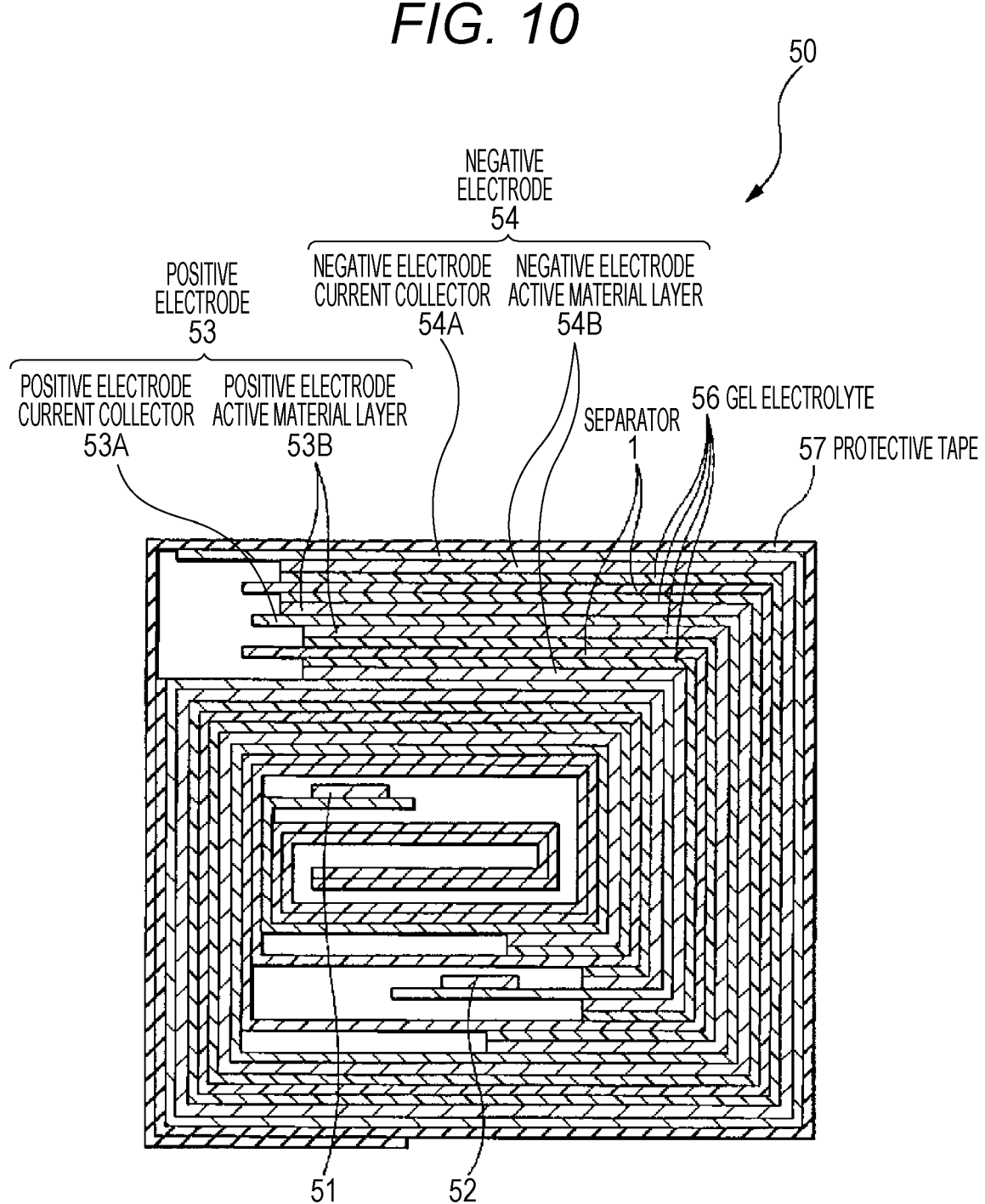
FIG. 10 is a cross-sectional diagram illustrating the cross-sectional configuration, as cut along the line I-I, of the wound electrode assembly illustrated in FIG. 9.

FIG. 10 illustrates the cross-sectional structure, which is cut along the I-I line, of the wound electrode assembly 50 illustrated in FIG. 9. The wound electrode assembly 50 is a product obtained by laminating a positive electrode 53 and the negative electrode 54, with a separator 1 and a gel electrolyte 56 being interposed therebetween, and winding the assembly, and the outermost periphery is protected by a protective tape 57 as necessary.

[Positive Electrode]

The positive electrode 53 has a structure in which a positive electrode active material layer 53B is provided on one surface or on both surfaces of a positive electrode current collector 53A. The configurations of the positive electrode current collector 53A and the positive electrode active material layer 53B are similar to those of the positive electrode current collector 21A and the positive electrode active material layer 21B of the second embodiment described above.

[Negative Electrode]

The negative electrode 54 has a structure in which a negative electrode active material layer 54B is provided on one surface or on both surfaces of a negative electrode current collector 54A, and the negative electrode active material layer 54B and the positive electrode active material layer 53B are disposed to face each other. The configurations of the negative electrode current collector 54A and the negative electrode active material layer 54B are similar to those of the negative electrode current collector 22A and the negative electrode active material layer 22B of the second embodiment described above.

[Separator]

The separator 1 is similar to that of the first embodiment.

[Non-Aqueous Electrolyte]

A gel electrolyte 56 is a non-aqueous electrolyte, and includes a non-aqueous liquid electrolyte and a polymer compound that serves as a retaining body retaining the non-aqueous liquid electrolyte, thus being in a so-called gel form. A gel-like electrolyte is preferable because a high ion conductivity can be obtained, and also, liquid leakage of the battery can be prevented. Moreover, for the non-aqueous electrolyte battery 62 according to the fourth embodiment, a non-aqueous liquid electrolyte similar to that of the second embodiment may also be used instead of the gel electrolyte 56.

(4-2) Method for Producing Non-Aqueous Electrolyte Battery

This non-aqueous electrolyte battery 62 can be produced, for example, as follows.

[Method for Producing Positive Electrode and Negative Electrode]

The positive electrode 53 and the negative electrode 54 can be produced by a method similar to that of the second embodiment.

[Assembling of Non-Aqueous Electrolyte Battery]

A precursor solution containing a non-aqueous electrolyte liquid, a polymer compound and a mixed solvent is applied on both surfaces of a positive electrode 53 and both surfaces of a negative electrode 54, the mixed solvent is volatilized, and thus a gel electrolyte 56 is formed. Thereafter, a positive electrode lead 51 is attached to an end of a positive electrode current collector 53A by welding, and also, a negative electrode lead 52 is attached to an end of the negative electrode current collector 54A by welding.

Next, the positive electrode 53 and the negative electrode 54, both having the gel electrolyte 56 formed thereon, were laminated with the separator 1 being interposed therebetween, to form a laminate, and then this laminate is wound in the longitudinal direction of the laminate. A protective tape 57 is adhered to the outermost periphery, and thus a wound electrode assembly 50 is formed. Finally, for example, the wound electrode assembly 50 is sandwiched between exterior members 60, and the outer peripheries of the exterior members 60 are sealed by adhering each other by heat fusion or the like. At that time, an adhesive film 61 is inserted between the positive electrode lead 51 as well as the negative electrode lead 52 and the exterior members 60. Thereby, the non-aqueous electrolyte battery 62 illustrated in FIG. 9 and FIG. 10 is completed.

Furthermore, this non-aqueous electrolyte battery 62 may be produced as follows. First, as described above, a positive electrode 53 and a negative electrode 54 are produced, and a positive electrode lead 51 and a negative electrode lead 52 are attached to the positive electrode 53 and the negative electrode 54. Subsequently, the positive electrode 53 and the negative electrode 54 are laminated, with a separator 1 being interposed therebetween, and wound, a protective tape 57 is adhered to the outermost periphery, and thus a wound electrode assembly 50 is formed. Next, this wound electrode assembly 50 is interposed between exterior members 60, the outer peripheral edges except one side are thermally fused to form a bag shape, and thus the wound electrode assembly 50 is accommodated inside the exterior members 60. Subsequently, a composition for electrolyte containing the monomers that serve as raw materials of a polymer compound, a polymerization initiator, and optionally other materials such as a polymerization inhibitor is prepared, together with the non-aqueous liquid electrolyte, and these are injected into the inside of the exterior member 60.

The composition for electrolyte is injected, and then the opening of the exterior members 60 is sealed by thermal fusion in a vacuum atmosphere. Next, the monomers are polymerized by applying heat, and thus a polymer compound is produced. Thereby, a gel-like gel electrolyte 56 is formed, and the non-aqueous electrolyte battery 62 illustrated in FIG. 9 and FIG. 10 is assembled.

Furthermore, in the case of using a non-aqueous liquid electrolyte instead of the gel electrolyte 56 in the non-aqueous electrolyte battery 62, a positive electrode 53 and a negative electrode 54 are laminated, with a separator 1 being interposed, and wound, a protective tape 57 is adhered to the outermost periphery, and thus a wound electrode assembly 50 is formed. Next, this wound electrode 50 is sandwiched between exterior members 60, the outer peripheral edges except one side are thermally fused to form a bag shape, and the wound electrode assembly 50 is accommodated inside the exterior members 60. Subsequently, the non-aqueous liquid electrolyte is injected into the inside of the exterior members 60, the opening of the exterior members 60 is sealed by thermal fusion in a vacuum atmosphere, and thereby the non-aqueous electrolyte battery 62 is assembled.

(4-3) Other Examples of Laminate Film Type Non-Aqueous Electrolyte Battery

Figure 11:
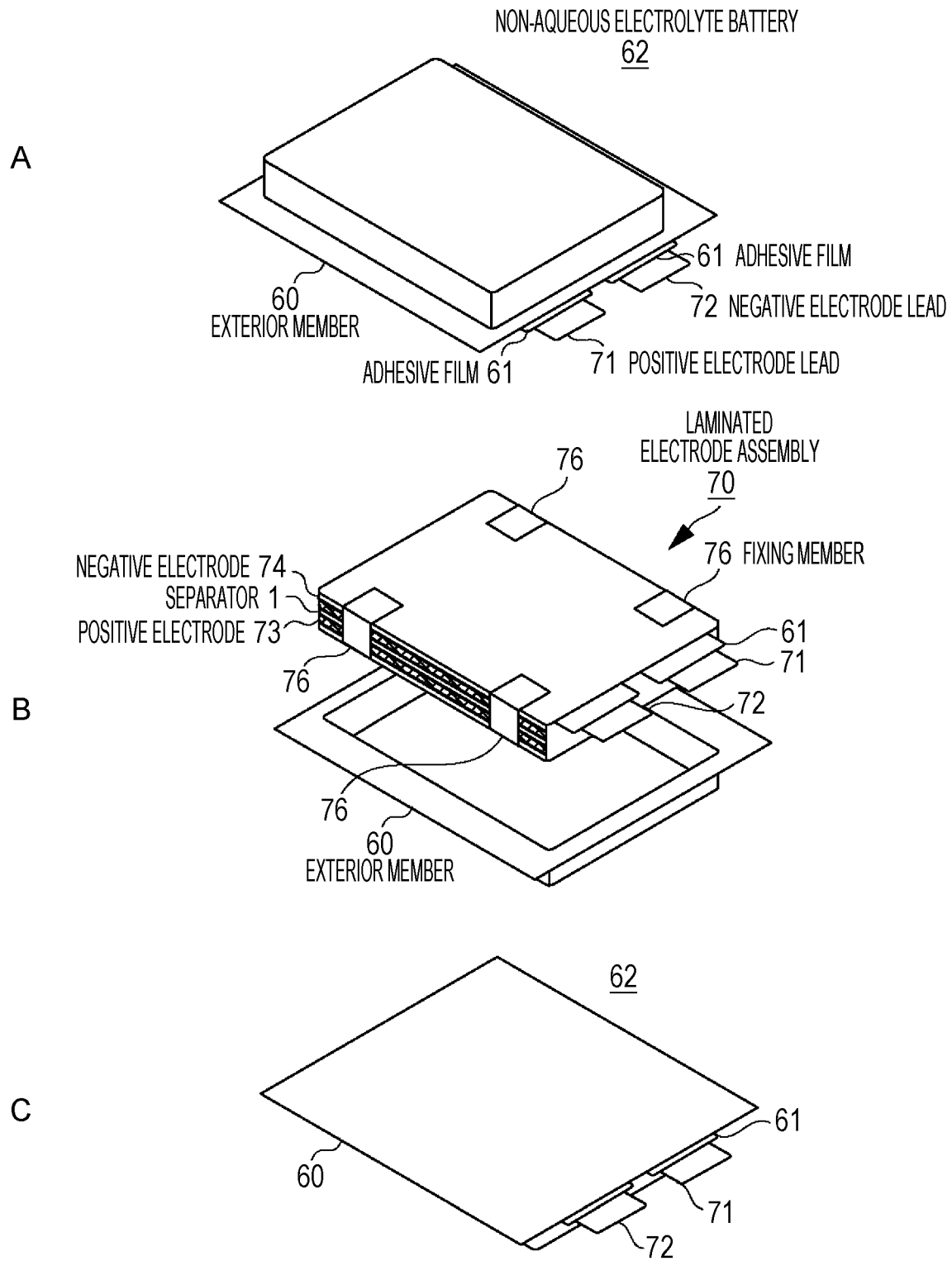
FIG. 11 is an exploded perspective view diagram illustrating the configuration of a laminate film type non-aqueous electrolyte battery using a laminated electrode assembly.

In the fourth embodiment, a non-aqueous electrolyte battery 62 in which the wound electrode assembly 50 is sheathed with exterior members 60 has been explained; however, a laminated electrode assembly 70 may also be used instead of the wound electrode assembly 50 as illustrated in FIG. 11A to FIG. 11C. FIG. 11A is an external appearance diagram of the non-aqueous electrolyte battery 62 accommodating the laminated electrode assembly 70. FIG. 11B is an exploded perspective view diagram illustrating the state of the laminated electrode assembly 70 accommodated in the exterior members 60. FIG. 11C is an external appearance diagram illustrating the external appearance from the bottom side of the non-aqueous electrolyte battery 62 illustrated in FIG. 11A.

Regarding the laminated electrode assembly 70, use is made of a laminated electrode assembly 70 in which a rectangular-shaped positive electrode 73 and a rectangular-shaped negative electrode 74 are laminated, with a separator 1 being interposed therebetween, and are fixed with a fixing member 76. In the laminated electrode assembly 70, a positive electrode lead 71 connected to the positive electrode 73 and a negative electrode lead 72 connected to the negative electrode 74 are led out, and an adhesive film 61 is provided between the positive electrode lead 71 as well as the negative electrode lead 72 and an exterior member 60.

Moreover, the method for forming the gel electrolyte 56 or the method for injecting a non-aqueous liquid electrolyte, and the method of thermally fusing the exterior member 60 are similar to those in the case of using the wound electrode assembly 50 described in section (4-2).

Furthermore, as a modification example, a configuration in which the substrate 2 according to the first embodiment is used as a separator, and a layer similar to the surface layer 3 composed of a low-porosity layer 3a and a high-porosity layer 3b is provided on the surfaces of the positive electrode 53 and the negative electrode 54, or on the surfaces of the positive electrode 73 and the negative electrode 74, such that the high-porosity layer 3b comes to the outer side, may also be used.

<Effect>

According to the fourth embodiment, an effect similar to those of the second embodiment can be obtained. Particularly, in a battery which uses a laminate film as an exterior material, an increase in the battery thickness may easily occur, unlike those electrode assemblies such as metal cans. However, by using the separator of the present technology, the conspicuous increase in the device thickness resulting from the progress of cycles can be reduced.

5. Fifth Embodiment

In the fifth embodiment, an example of a battery pack of a laminate film type non-aqueous electrolyte battery employing the separator according to the first embodiment will be explained.

The battery pack of a laminate film type non-aqueous electrolyte battery of the fifth embodiment will be explained below with reference to the drawings. Moreover, in the following explanation, a wound electrode assembly sheathed with a hard laminate film and a soft laminate film is referred to as a battery cell, and a battery cell connected with a circuit board and fitted with a top cover and a rear cover is referred to as a battery pack. For the battery pack and the battery cell, the protruded side of the positive electrode terminal and the negative electrode terminal is referred to as top part, the side opposite to the top part is referred to as bottom part, and the two edges excluding the top part and the bottom part are referred to as side part. Furthermore, the length in the direction of side part-side part is referred to as the width direction, and the length in the direction of top part-bottom part is referred to as height.

(5-1) Configuration of Battery Pack

Figure 12:
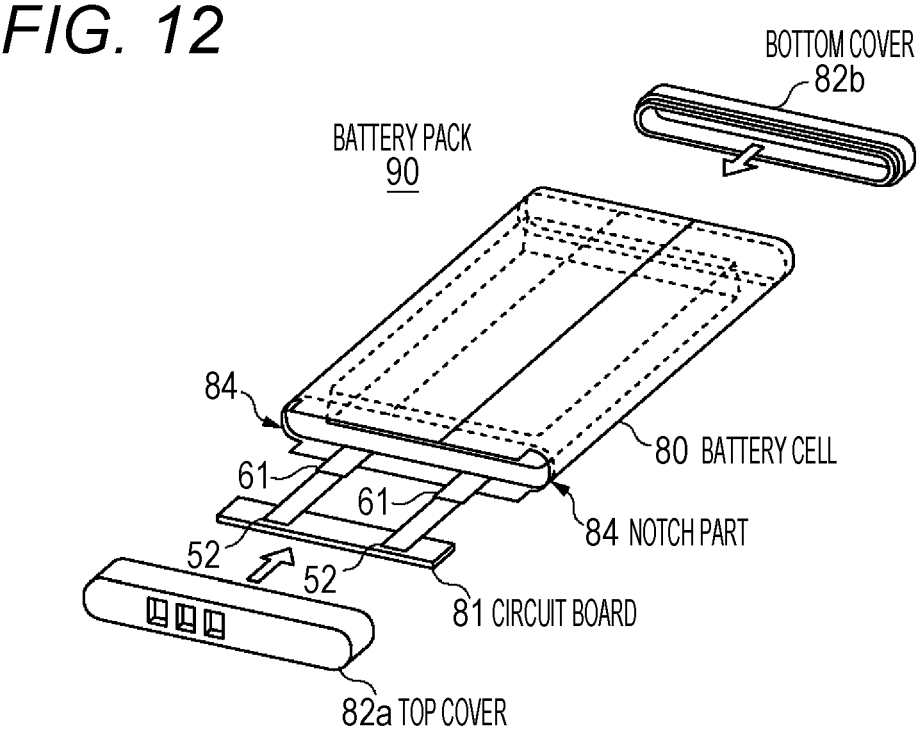
FIG. 12 is an exploded perspective view diagram illustrating the configuration of a battery pack of a laminate film type non-aqueous electrolyte battery related to a fifth embodiment of the present technology.
Figure 13:
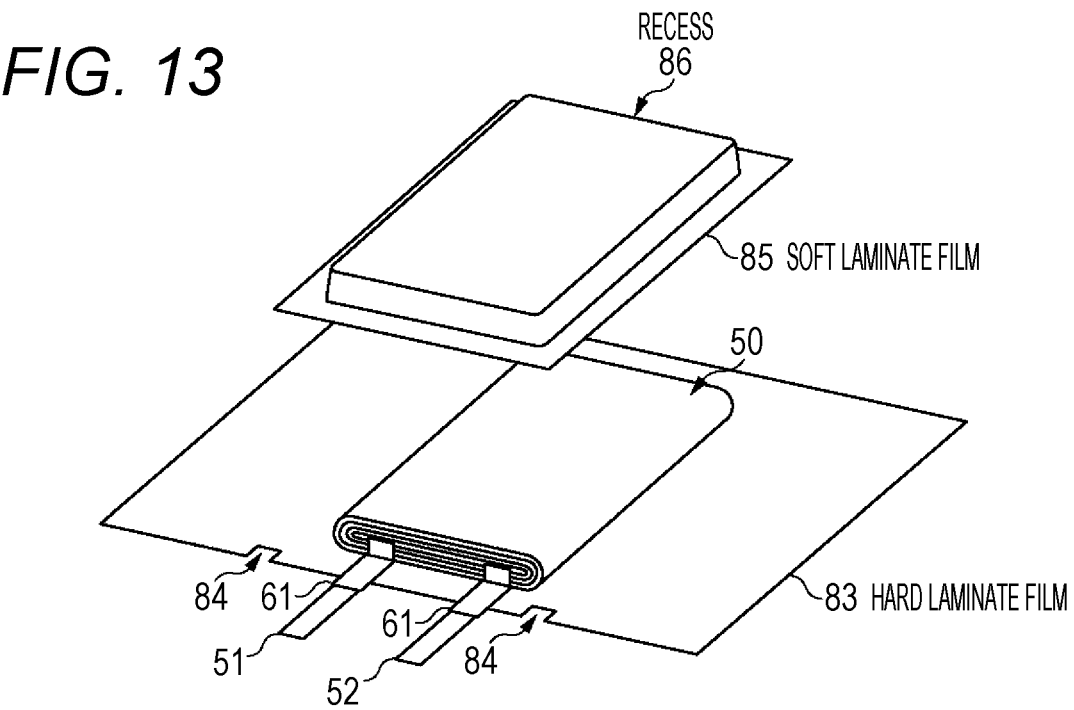
FIG. 13 is an exploded perspective view diagram illustrating the structure of a battery cell of the battery pack illustrated in FIG. 12.
Figure 14:
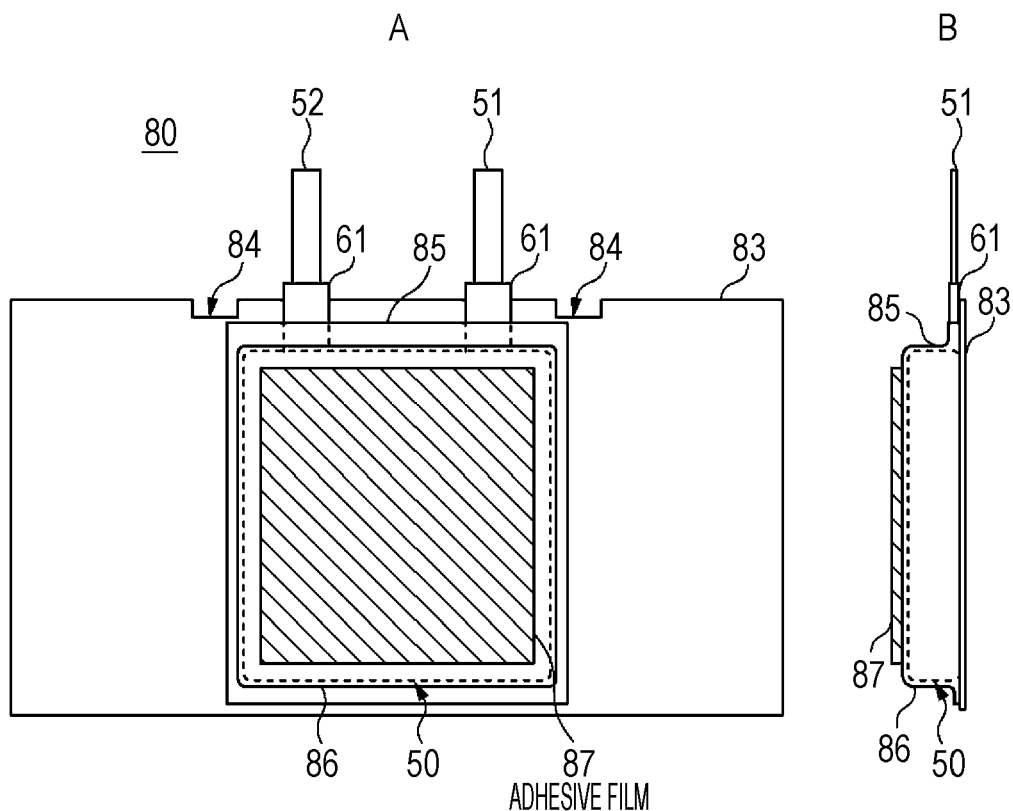
FIG. 14 is a top plan view diagram and a lateral view diagram illustrating the state in the middle of production of a battery cell of the battery pack illustrated in FIG. 12.
Figure 15:
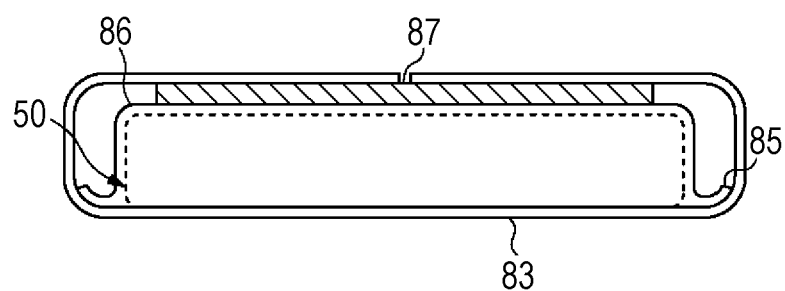
FIG. 15 is a cross-sectional diagram illustrating the structure of a battery cell of the battery pack illustrated in FIG. 12.

FIG. 12 is a perspective view diagram illustrating one configuration example of the battery pack 90 according to the fifth embodiment. FIG. 13 is an exploded perspective view diagram illustrating the structure of a battery cell 80. FIG. 14 is a top view diagram and a lateral view diagram illustrating the state in the middle of production of the battery cell 80 according to the fifth embodiment. FIG. 15 is a cross-sectional diagram illustrating the cross-sectional structure in the battery cell 80.

The battery pack 90 is, for example, a battery pack of a non-aqueous electrolyte battery having a rectangular shape or a flat shape, and as illustrated in FIG. 12, the battery pack 90 includes a battery cell 80 which has an opening formed, with two open ends, and has a wound electrode assembly 50 accommodated in an exterior material; and a top cover 82*a* and a bottom cover 82*b* respectively fitted to the openings at the two ends of the battery cell 80. Moreover, for the wound electrode assembly 50 accommodated in the battery pack 90, a wound electrode assembly 50 similar to that of the fourth embodiment can be used. In the battery cell 80, a positive electrode lead 51 and a negative electrode lead 52 connected to the wound electrode assembly 50 are led out from a fused area of the exterior material to the outside through an adhesive film 61, and the positive electrode lead 51 and the negative electrode lead 52 are connected to a circuit board 81.

As illustrated in FIG. 13 and FIG. 14, the exterior material has a general plate shape, and is formed from a hard laminate film 83 having a rectangular shape when viewed in the plane direction; and a soft laminate film 85 having a rectangular shape with a shorter length in the direction of the side part than that of the hard laminate film 83. The openings at the two ends of the battery cell 80 have a general rectangular shape, and the two shorter edges of the opening bulge out so as to form an elliptic arc toward the outer side.

The battery cell 80 is formed from a soft laminate film 85 provided with a recess 86; a wound electrode assembly 50 accommodated in the recess 86; and a hard laminate film 83 provided so as to cover the opening of the recess 86 accommodating the wound electrode assembly 50. The hard laminate film 83 is set such that while the hard laminate film 83 wraps the recess 86 accommodating the wound electrode assembly 50, the shorter edges on both sides are in close contact or are separated apart with a slight gap to face each other. Furthermore, the longer edges on the top side of the hard laminate film 83 may be provided with notch parts 84 as illustrated in FIG. 13 and FIG. 14. The notch parts 84 are provided so as to be positioned on the two shorter edges of the battery cell 80 as viewed from the front. When the notch parts 84 are provided, fitting of the top cover 82*a* can be made easier.

Furthermore, at the sealed part where the hard laminate film 83 and the soft laminate film 85 are sealed, a positive electrode lead 51 and a negative electrode lead 52 that are electrically connected to the positive electrode 53 and the negative electrode 54 of the wound electrode assembly 50, respectively, are led out.

The top cover 82*a* and the bottom cover 82*b* have a shape capable of fitting to the openings at both ends of the battery cell 80, and specifically, when viewed from the front, the top cover 82*a* and the bottom cover 82*b* have a general rectangular shape, with the two shorter edges bulging so as to form an elliptic arc toward the outer side. Moreover, the front means the direction of viewing the battery cell 80 from the top side.

[Exterior Material]

As illustrated in FIG. 13 and FIG. 14, this exterior material is formed from a soft laminate film 85 provided with a recess 86 for accommodating the wound electrode assembly 50; and a hard laminate film 83 that is superimposed on this soft laminate film 85 so as to cover the recess 86.

[Soft Laminate Film]

The soft laminate film 85 has a configuration similar to that of the exterior member 60 according to the fourth embodiment. Particularly, the soft laminate film 85 has a feature that a soft metal material, for example, annealing-treated aluminum (JIS A8021P-O) or (JIS A8079P-O) is used as the metal layer.

[Hard Laminate Film]

The soft laminate film 85 has a function of maintaining the shape after bending, and withstanding deformations from the outside. Therefore, the soft laminate film has a feature that a hard metal material, for example, a metal material such as aluminum (Al), stainless steel (SUS), iron (Fe), copper (Cu) or nickel (Ni), is used as the metal layer, and particularly, hard aluminum that has not been annealing-treated (JIS A3003P-H18) or (JIS A3004P-H18), austenite-based stainless steel (SUS304), or the like is used.

[Wound Electrode Assembly]

The wound electrode assembly 50 may have a configuration similar to that of the fourth embodiment. Furthermore, the laminated electrode assembly 70 explained as another example of the fourth embodiment may also be used.

[Non-Aqueous Liquid Electrolyte and Gel Electrolyte]

The non-aqueous liquid electrolyte that is injected into the battery cell 80, or the gel electrolyte formed at the surfaces of the positive electrode 53 and the negative electrode 54 can have a configuration similar to that of the second embodiment.

[Separator]

The separator 1 is similar to that of the first embodiment.

[Circuit Board]

A circuit board 81 is electrically connected with the positive electrode lead 51 and the negative electrode lead 52 of the wound electrode assembly 50. On the circuit board 81, a protection circuit including a temperature protection element such as a fuse, a heat-sensitive resistance element (Positive Temperature Coefficient: PTC element), or a thermistor, as well as an ID resistance for identifying the battery pack, and the like are mounted, and plural (for example, three) contact points are further formed thereon. The protection circuit is provided with a charge-discharge control FET (Field Effect Transistor), an IC (Integrated Circuit) that performs monitoring of the battery cell 80 and the control of the charge-discharge control FET, and the like.

A heat-sensitive resistance element is connected in series to the wound electrode assembly, and when the temperature of the battery is higher compared to the set temperature, the electrical resistance is rapidly increased, and the current that flows through the battery is substantially cut off. A fuse is also connected in series to the wound electrode assembly, and when an overcurrent flows through the battery, the fuse undergoes fusion cutting caused by the current flowing therethrough and cuts the current off. Furthermore, the fuse is provided with a heater resistance in its vicinity, and at the time of excess voltage, the fuse undergoes fusion cutting as the temperature of the heater resistance is increased, and cuts the current off.

Furthermore, when the terminal voltage of the battery cell 80 becomes higher than or equal to the charge prohibiting voltage, which is higher than the full charge voltage, there is a possibility that the battery cell 80 may be in a hazardous condition leading to heat generation, ignition, or the like. Therefore, the protecting circuit monitors the voltage of the battery cell 80, and when the battery cell 80 reaches the charge prohibiting voltage, the protection circuit inhibits charging by turning off the charging control FET. Furthermore, when the terminal voltage of the battery cell 80 is over-discharged to a value lower than or equal to the discharge prohibiting voltage, and the voltage of the battery cell 80 reaches 0 V, there is a possibility that the battery cell 80 may be in an internal short circuit condition, and recharging may become unfeasible. Therefore, the protection circuit monitors the voltage of the battery cell 80, and when the voltage reaches the discharge prohibiting voltage, the protection circuit inhibits discharging by turning off the discharging control FET.

[Top Cover]

The top cover 82a is fitted to the top side opening of the battery cell 80, and a side wall for fitting to the top side opening is provided along a portion or entirety of the outer periphery of the top cover 82a. The battery cell 80 and the top cover 82a are thermally fused with the side wall of the top cover 82a and the end inner surface of the hard laminate film 83, and are thus adhered.

The circuit board 81 is accommodated in the top cover 82a. The top cover 82a is provided with plural openings at positions corresponding to the contact points of the circuit board 81 so that the plural contact points are exposed to the outside. The contact points of the circuit board 81 are brought into contact with an electronic apparatus through the openings of the top cover 82a. Thereby, the battery pack 90 and the electronic apparatus are electronically connected. Such a top cover 82a is produced in advance by injection molding.

[Bottom Cover]

The bottom cover 82b is fitted to the opening on the bottom side of the battery cell 80, and is provided with a side wall for fitting to the opening on the bottom side along a portion or entirety of the outer periphery of the bottom cover 82b. The battery cell 80 and the bottom cover 82b are thermally fused to the side wall of the bottom cover 82b and an end inner surface of the hard laminate film 83, and are thus adhered.

Such a bottom cover 82b is produced in advance by injection molding. Furthermore, a method of installing the battery cell 80 in a mold, pouring a hot melt resin into the bottom part, and thereby integrally molding the bottom cover with the battery cell 80 can also be used.

(5-2) Method for Producing Battery Pack

[Production of Battery Cell]

The wound electrode assembly 50 is accommodated in the recess 86 of the soft laminate film 85, and the hard laminate film 83 is disposed so as to cover the recess 86. At this time, the hard laminate film 83 and the soft laminate film 85 are disposed such that the inner resin layer of the hard laminate film 83 and the inner resin layer of the soft laminate film 85 face each other. Thereafter, the hard laminate film 83 and the soft laminate film 85 are sealed along the periphery of the recess 86. Sealing is carried out by thermally fusing the inner resin layer of the hard laminate film 83 and the inner resin layer of the soft laminate film 85 under reduced pressure, using a heater head made of metal that is not shown in the diagram.

When the inner resin layer of the hard laminate film 83 and the inner resin layer of the soft laminate film 85 are thermally fused under reduced pressure, a non-aqueous liquid electrolyte is injected through one edge that is not thermally fused. Alternatively, the wound electrode assembly 50 may be formed by forming a gel electrolyte in advance on both surfaces of the positive electrode and both surfaces of the negative electrode.

Next, as illustrated in FIG. 15, the hard laminate film 83 is deformed such that the shorter edges of the hard laminate film 83 are brought into contact. At this time, an adhesive film 87 formed from a resin material having high adhesiveness to both the inner resin layer of the hard laminate film 83 and the outer resin layer of the soft laminate film 85, is inserted between the hard laminate film 83 and the soft laminate film 85. Subsequently, when one surface at which the joint of the shorter edges of the hard laminate film 83 is positioned is heated with a heater head (not illustrated), the inner resin layer of the hard laminate film 83 and the outer resin layer of the soft laminate film 85 are thermally fused, and thus the battery cell 80 is obtained. Moreover, instead of using the adhesive film 87, an adhesive layer formed from a resin having high adhesiveness to the outer resin layer of the soft laminate film 85 may be provided on the surface of the inner resin layer of the hard laminate film 83, and the adhesive layer may be thermally fused.

[Production of Battery Pack]

Subsequently, the positive electrode lead 51 and the negative electrode lead 52 led out from the battery cell 80 are connected to the circuit board 81, subsequently the circuit board 81 is accommodated in the top cover 82a, and the top cover 82a is fitted to the opening on the top side of the battery cell 80. Furthermore, the bottom cover 82b is fitted to the opening on the bottom side of the battery cell 80.

Finally, the fitting parts of the top cover 82a and the bottom cover 82b are respectively heated using a heater head, and the top cover 82a and the bottom cover 82b are thermally fused with the inner resin layer of the hard laminate film 83. Thereby, the battery pack 90 is produced.

<Effect>

In the fifth embodiment, an effect similar to those of the fourth embodiment can be obtained.

6. Sixth Embodiment

In the sixth embodiment, a battery pack which includes a non-aqueous electrolyte battery employing the separator according to the first embodiment will be explained.

Figure 16:
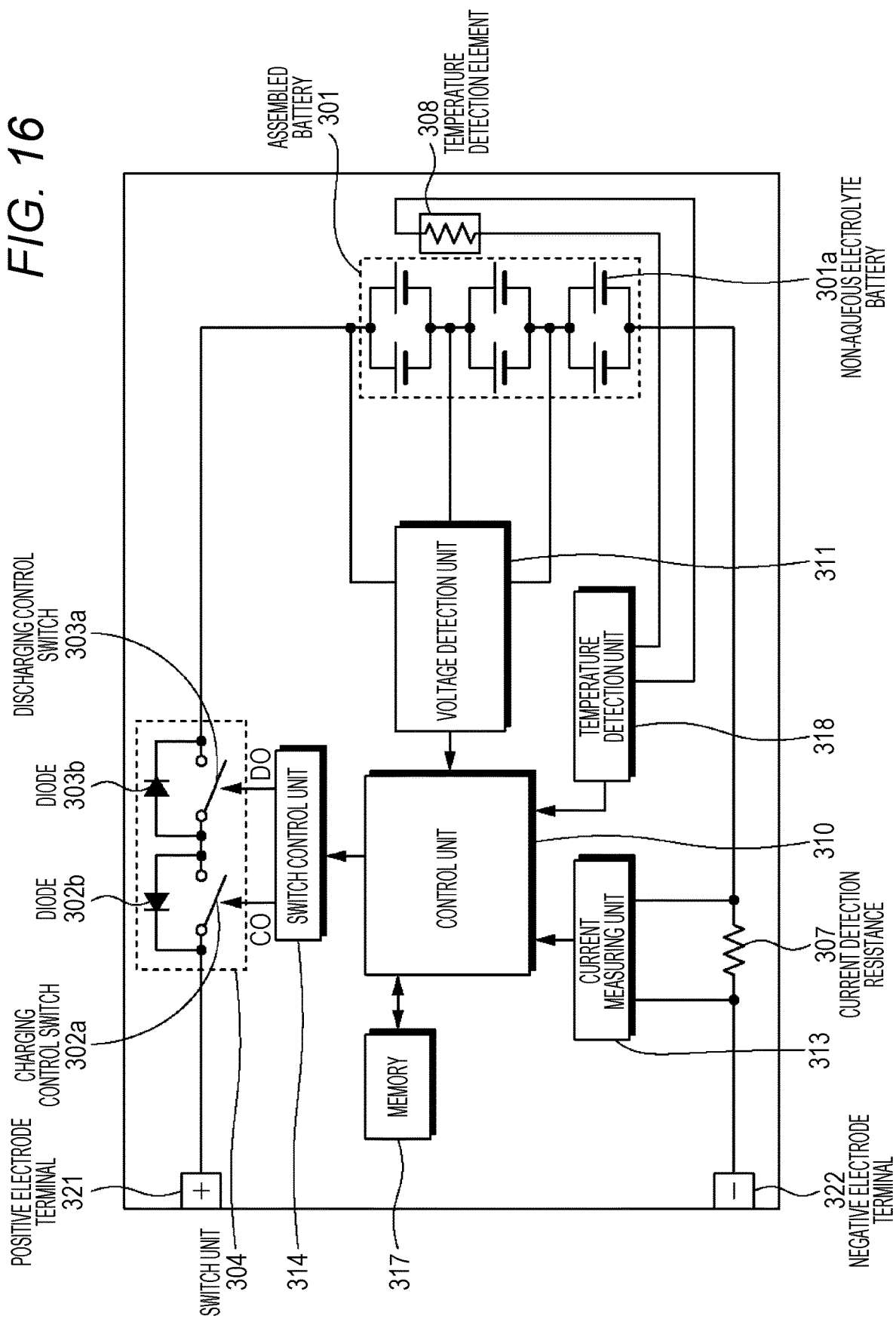
FIG. 16 is a block diagram illustrating a circuit configuration example of the battery pack according to an embodiment of the present technology.

FIG. 16 is a block diagram illustrating an example of the circuit configuration in a case in which the non-aqueous electrolyte battery of the present technology is applied to a battery pack. The battery pack includes an assembled battery 301, an exterior material, a switch unit 304 including a charging control switch 302a and a discharging control switch 303a, a current detection resistance 307, a temperature detection element 308, and a control unit 310.

Furthermore, the battery pack includes a positive electrode terminal 321 and a negative electrode terminal 322, and at the time of charging, the positive electrode terminal 321 and the negative electrode terminal 322 are connected to the positive electrode terminal and the negative electrode terminal of a battery charger, respectively, and charging is carried out. Furthermore, at the time of using an electronic apparatus, the positive electrode terminal 321 and the negative electrode terminal 322 are connected to the positive electrode terminal and the negative electrode terminal of an electronic apparatus, respectively, and discharging is carried out.

The assembled battery 301 is composed of plural non-aqueous electrolyte batteries 301a connected in series and/or in parallel. This non-aqueous electrolyte battery 301a is a non-aqueous electrolyte battery of the present technology. Moreover, FIG. 16 illustrates an example in which six non-aqueous electrolyte batteries 301a are connected in two-parallel three-serial (2P3S) connection; however, in addition to that, any connection method such as n-parallel m-serial (wherein n and m represent integers) connection may also be used.

The switch unit 304 includes a charging control switch 302a, a diode 302b, a discharging control switch 303a, and a diode 303b, and is controlled by the control unit 310. The diode 302b has polarity in the reverse direction with respect to the charging current that flows in the direction from the positive electrode terminal 321 to the assembled battery 301, and in the forward direction with respect to the discharging current that flows in the direction from the negative electrode terminal 322 to the assembled battery 301. The diode 303b has polarity in the forward direction with respect to the charging current, and in the reverse direction with respect to the discharging current. Moreover, in this example, the switch unit is provided on the plus (+)-side; however, the switch unit may also be provided on the minus (−)-side.

The charging control switch 302a is controlled by the charge-discharge control unit such that the charging control switch is turned off when the battery voltage reaches the overcharge detection voltage, and no charging current flows through the current path of the assembled battery 301. After the turning-off of the charging control switch, only discharging is enabled by means of the diode 302b. Furthermore, the charging control switch 302a is controlled by the control unit 310 such that the charging control switch is turned off when a large current flows at the time of charging, and cuts off the charging current that flows through the current path of the assembled battery 301.

The discharging control switch 303a is controlled by the control unit 310 such that the discharging control switch is turned off when the battery voltage reaches the overdischarge detection voltage, and no discharging current flows through the current path of the assembled battery 301. After the turning-off of the discharging control switch 303a, only charging is enabled by means of the diode 303b. Furthermore, the discharging control switch 303a is controlled by the control unit 310 such that the discharging control switch is turned off when a large current flows at the time of discharging, and cuts off the discharging current that flows through the current path of the assembled battery 301.

The temperature detection element 308 is, for example, a thermistor, and is provided in the vicinity of the assembled battery 301. The temperature detection element 308 measures the temperature of the assembled battery 301 and supplies the measured temperature to the control unit 310. A voltage detection unit 311 measures the voltages of the assembled battery 301 and the various non-aqueous electrolyte batteries 301a that constitute the assembled battery, performs A/D conversion of these measured voltages, and supplies the resultant values to the control unit 310. A current measuring unit 313 measures the current using the current detection resistance 307, and supplies the measured current to the control unit 310.

A switch control unit 314 controls the charging control switch 302a and the discharging control switch 303a of the switch unit 304 based on the voltages and currents input from the voltage detection unit 311 and the current measuring unit 313. The switch control unit 314 prevents overcharging, overdischarging, and overcurrent charge-discharge by sending control signals to the switch unit 304 when the voltages of some of the non-aqueous electrolyte batteries 301a reach a value lower than or equal to the overcharge detection voltage or the overdischarge detection voltage, and when a large current flows suddenly.

Here, for example, when the non-aqueous electrolyte battery is a lithium ion secondary battery, and a material which forms a lithium alloy at near 0 V with respect to Li/Li$^+$ is used as the negative electrode active material, the overcharge detection voltage is set to, for example, 4.20 V±0.05 V, and the overdischarge detection voltage is set to, for example, 2.4 V±0.1 V.

For the charge-discharge switch, for example, a semiconductor switch such as a MOSFET can be used. In this case, parasitic diodes of the MOSFET function as diodes 302b and 303b. When a P-channel type FET is used as the charge-discharge switch, the switch control unit 314 supplies control signals DO and CO respectively to the respective gates of the charging control switch 302a and the discharging control switch 303a. When the charging control switch 302a and the discharging control switch 303a are of P-channel type, the switches are turned on by a gate potential lower than the source potential by a predetermined value or more. That is, in a conventional charging and discharging operation, the control signals CO and DO are adjusted to a low level, and the charging control switch 302a and the discharging control switch 303a are brought to the on-state.

For example, at the time of overcharging or overdischarging, the control signals CO and DO are adjusted to a high level, and the charging control switch 302a and the discharging control switch 303a are brought to the off-state.

A memory 317 is composed of a RAM or a ROM, and is composed of, for example, EPROM (Erasable Programmable Read Only Memory), which is a non-volatile memory. In the memory 317, the values computed at the control unit 310, the internal resistance values of the batteries in the initial state of the various non-aqueous electrolyte batteries 301a measured in the stages of the production process, and the like are stored in advance, and rewriting can also be appropriately achieved. Furthermore, by causing the memory to store the full charge capacity of the non-aqueous electrolyte battery 301a, for example, the residual capacity can be calculated together with the control unit 310.

A temperature detection unit 318 measures the temperature using the temperature detection element 308, performs the charge-discharge control at the time of abnormal heat generation or performs compensation in the calculation of the residual capacity.

7. Seventh Embodiment

In the seventh embodiment, apparatuses such as an electronic apparatus, an electric vehicle, and a power storage device, which are equipped with the non-aqueous electrolyte battery according to the second to fourth embodiments and the battery pack according to the fifth and sixth embodiments, will be explained. The non-aqueous electrolyte battery and the battery pack explained in the second to fifth embodiments can be used to supply electric power to apparatuses such as an electronic apparatus, an electric vehicle, and a power storage device.

Examples of the electronic apparatus include a laptop computer, a PDA (personal digital assistant), a mobile telephone, a cordless phone headset, a video movie camera, a digital still camera, an electronic book, an electronic dictionary, a music player, a radio, a headphone, a game player, a navigation system, a memory card, a pacemaker, a hearing aid, an electric tool, an electric shaver, a refrigerator, an air conditioner, a television, a stereo system, a water heater, an electromagnetic range, a dish washer, a washing machine, a dryer, a lighting device, a toy, a medical instrument, a robot, a road conditioner, and a signal mechanism.

Furthermore, examples of the electric vehicle include a railway vehicle, a golf cart, an electric cart, and an electric car (including a hybrid car). The battery and battery pack are used as power supplies for driving or auxiliary power supplies.

Examples of the power storage device include power supplies for electric power storage for constructions including houses, or for power generation facilities.

In the following description, among the application examples described above, a specific example of a power storage system using a power storage device to which the non-aqueous electrolyte battery of the present technology is applied will be explained.

This power storage system has, for example, a configuration such as described below. A first power storage system is a power storage system in which a power storage device is charged by an electric power generation device that implements power generation from a renewable energy. A second power storage system is a power storage system which has a power storage device and supplies electric power to an electronic apparatus that is connected to a power storage device. A third power storage system is an electronic apparatus which receives supply of electric power from a power storage device. These power storage systems are carried out as systems that promote efficient supply of electric power in cooperation with an external electric power supply network.

Furthermore, a fourth power storage system is an electric vehicle having a conversion device which receives supply of electric power from a power storage device and converts electric power to the driving force of a vehicle; and a control device which performs information processing related to vehicle control according to the information related to the power storage device. A fifth power storage system is an electric power system which includes a power information transmission/reception unit that transmits and receives signals through a network with other apparatuses, and performs charge-discharge control of the power storage device described above, based on the information received by the transmission/reception unit. A sixth power storage system is an electric power system which receives supply of electric power from the power storage device described above or supplies electric power from an electric power generation device or a power network to a power storage device. Hereinafter, power storage systems will be explained.

(7-1) Power Storage System in House as Application Example

Figure 17:
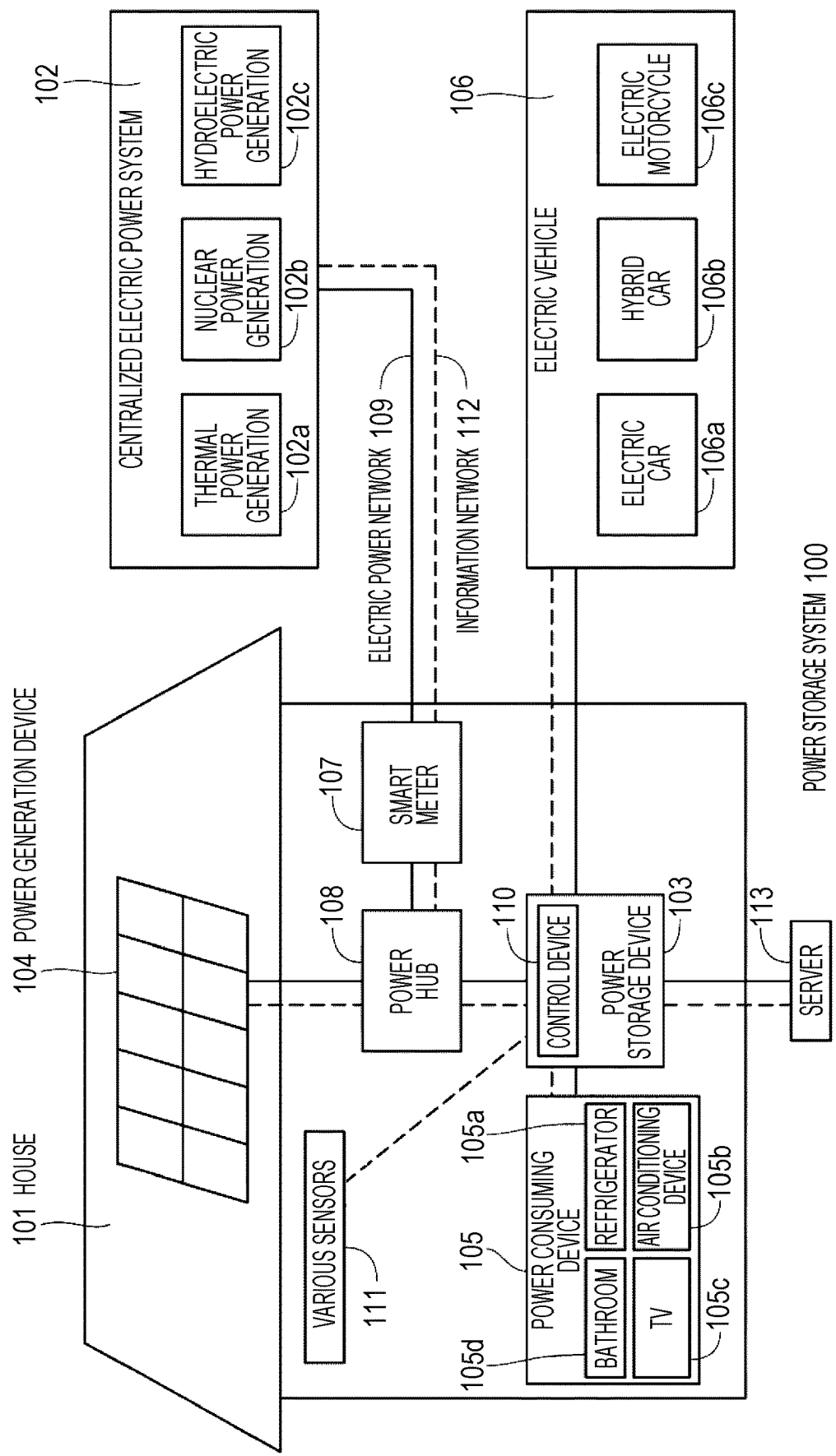
FIG. 17 is an outline diagram illustrating an example of applying the non-aqueous electrolyte battery of the present technology to a power storage system for houses.

An example of applying a power storage device which uses the non-aqueous electrolyte battery of the present technology to a power storage system for houses, is explained with reference to FIG. 17. For example, in a power storage system 100 for a house 101, electric power is supplied from a centralized electric power system 102 such as a thermal power station 102a, a nuclear power station 102b, or a hydroelectric power station 102c, to a power storage device 103 through an electric power network 109, an information network 112, a smart meter 107, a power hub 108 or the like. Together with this, electric power is supplied from an independent power source such as a domestic electric power generation device 104 to the power storage device 103. The electric power supplied to the power storage device 103 is stored. The electric power used in the house 101 is supplied using the power storage device 103. A similar power storage system can be used in buildings as well, without being limited to the house 101.

The house 101 is provided with a domestic electric power generation device 104, a power consuming device 105, a power storage device 103, a control device 110 that controls various devices, a smart meter 107, and a sensor 111 that acquires various types of information. The various devices are connected by an electric power network 109 and an information network 112. A solar cell, a fuel cell or the like is used as the domestic electric power generation device 104, and the electric power thus generated is supplied to the power consuming device 105 and/or power storage device 103. Examples of the power consuming device 105 include a refrigerator 105a, an air conditioning device 105b, a television receiver 105c, and a bathroom 105d. Furthermore, the power consuming device 105 includes an electric vehicle 106. Examples of the electric vehicle 106 include an electric car 106a, a hybrid car 106b, and an electric motorcycle 106c.

In the power storage device 103, the non-aqueous electrolyte battery of the present technology is applied. The non-aqueous electrolyte battery of the present technology may be configured to include, for example, the lithium ion secondary battery described above. The smart meter 107 has a function of measuring the amount of commercial electric power used, and transmits the amount of use thus measured to the power company. The electric power network 109 may use any one of direct current power supply, alternating current power supply, and non-contact power supply, or any combination of plural modes thereof.

Examples of various sensors 111 include a motion sensor, an illuminance sensor, an object detection sensor, a power consumption sensor, a vibration sensor, a contact sensor, a temperature sensor, and an infrared sensor. The information acquired by various sensors 111 are transmitted to the control device 110. The weather condition, the condition of a person and the like are understood based on the information obtained from the sensors 111, the power consuming device 105 is automatically controlled, and thus energy consumption can be minimized. Furthermore, the control device 110 can transmit the information on the house 101 to an external electric power company or the like through the internet.

The power hub 108 achieves processing such as branching of the electric power lines and direct current-alternating current conversion. Examples of the communication modes of an information network 112 that is connected to the control device 110 include a method of using a communication interface such as UART (Universal Asynchronous Receiver-Transceiver: transmission and reception circuit for asynchronous serial communication); and a method of utilizing a sensor network based on wireless communication standards such as Bluetooth, ZigBee, and Wi-Fi. The Bluetooth mode can be applied to multimedia communications, and one-to-many connection communication can be performed. ZigBee uses a physical layer of IEEE (Institute of Electrical and Electronics Engineers) 802.15.4. IEEE 802.15.4 is the title of the short distance wireless network standards called PAN (Personal Area Network) or W (Wireless) PAN.

The control device 110 is connected to an external server 113. This server 113 may be managed by any one of the house 101, an electric power company, and a service provider. The information transmitted and received by the server 113 is, for example, information on power consumption, information on lifestyle patterns, electric power fees, information on weather, information on natural disasters, and information on electricity transactions. These pieces of information may be transmitted and received from a power consuming device (for example, a television receiver) at home, or may be transmitted and received from an out-of-home device (for example, a mobile telephone). These pieces of information may be displayed on a device having a display function, for example, a television receiver, a mobile telephone, or a PDA (Personal Digital Assistant).

The control device 110 that controls various units is configured to include a CPU (Central Processing Unit), a RAM (Random Access Memory), a ROM (Read Only Memory), and the like, and in this example, the control device is housed in the power storage device 103. The control device 110 is connected to the power storage device 103, the domestic electric power generation device 104, the power consuming device 105, the various sensors 111, and the server 113 through the information network 112, and has a function of, for example, regulating the amount of use of commercial electric power and the amount of power generation. In addition to that, the control device 110 may also have a function of performing electricity transactions in the electric power market.

As described above, not only the electric power of the centralized electric power system 102 such as a thermal power station 102a, a nuclear power station 102b, or a hydroelectric power station 102c, but also the electric power generated by a domestic electric power generation device 104 (solar power generation and wind power generation) can be stored in the power storage device 103. Therefore, even if the electric power generated by the domestic electric power generation device 104 fluctuates, it is possible to perform control so as to make the amount of electric power sent to the outside constant, or to discharge electricity by a necessary amount. For example, a method of use in which the electric power obtained by solar power generation is stored in the power storage device 103, and inexpensive late night power is stored in the power storage device 103 during nighttime, while the electric power stored in the power storage device 103 is discharged and used in a time zone in which the fee during daytime is high, can be employed.

Moreover, in this example, an example in which the control device 110 is housed in the power storage device 103 has been described; however, the control device 110 may be housed in a smart meter 107 or may be configured to be used alone. Furthermore, the power storage system 100 may be used by plural households in a multiple dwelling house, or may be used by a plural numbers of single family-dwelling houses.

(7-2) Power Storage System in Vehicle as Application Example

Figure 18:
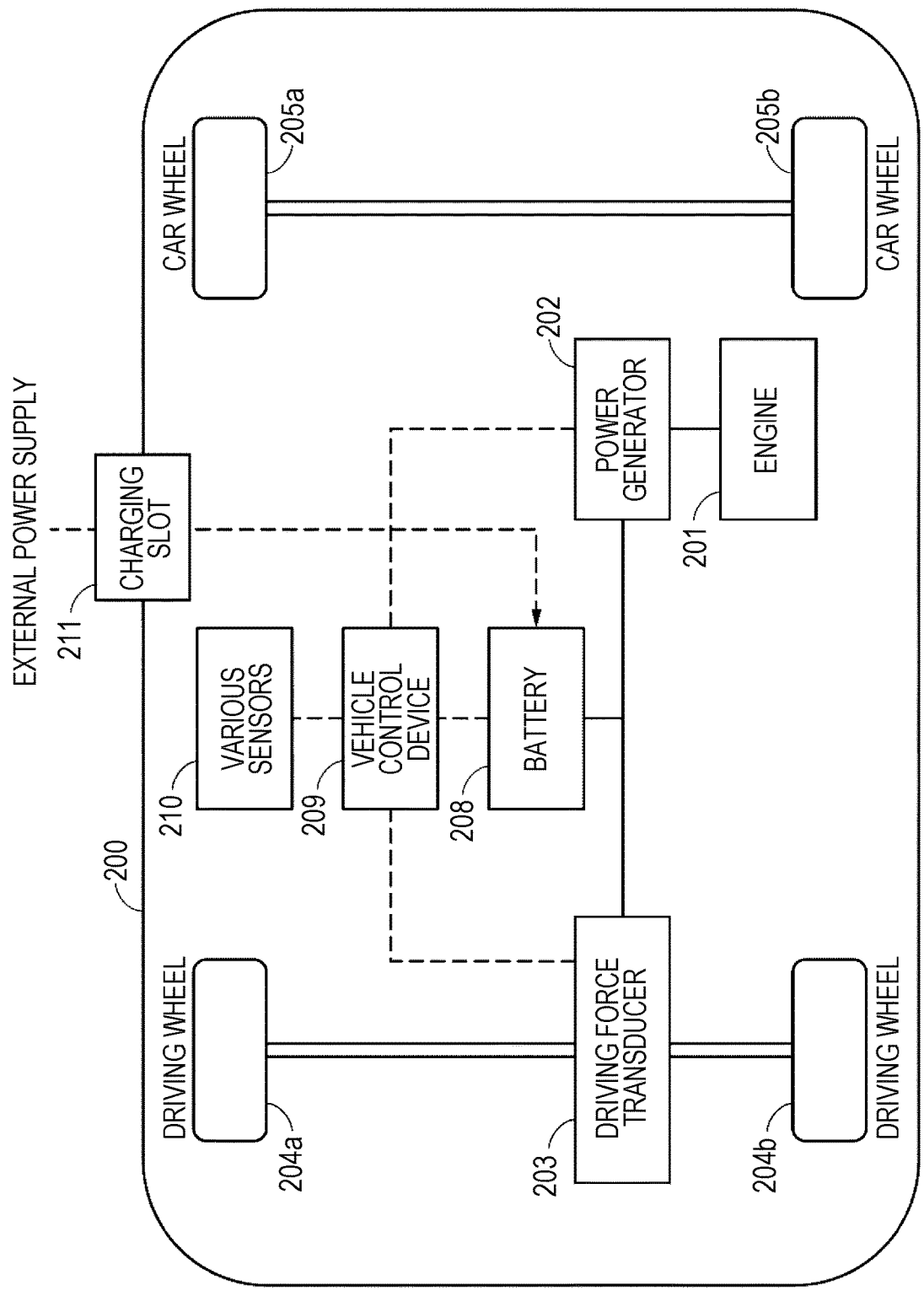
FIG. 18 is an outline diagram schematically illustrating an example of the configuration of a hybrid vehicle which employs a series hybrid system to which the present technology is applied.

An example of applying the present technology to a power storage system for vehicles will be explained with reference to FIG. 18. FIG. 18 schematically illustrates an example of the configuration of a hybrid vehicle which employs the series hybrid system to which the present technology is applied. A series hybrid system is a car which runs using an electric power driving force transducer, by using the electric power generated by a power generator that is driven by an engine, or by using electric power that has been temporarily stored in a battery.

This hybrid vehicle 200 is equipped with an engine 201, a power generator 202, an electric power driving force transducer 203, a driving wheel 204a, a driving wheel 204b, a wheel 205a, a wheel 205b, a battery 208, a vehicle control device 209, various sensors 210, and a charging slot 211. The non-aqueous electrolyte battery of the present technology described above is applied to the battery 208.

The hybrid vehicle 200 runs by means of the electric power driving force transducer 203 as a driving force source. An example of the electric power driving force transducer 203 is a motor. The electric power driving force transducer 203 is operated by the electric power of the battery 208, and the rotational force of this electric power driving force transducer 203 is transferred to the driving wheels 204a and 204b. Moreover, when direct current-alternating current (DC-AC) or inverse conversion (AC-DC conversion) is used at a site in need thereof, the electric power driving force transducer 203 can be applied to an alternating current motor or a direct current motor. The various sensors 210 control the engine speed through the vehicle control device 209, or control the opening (degree of throttle opening) of a throttle valve that is not shown in the diagram. The various sensors 210 include a speed sensor, an acceleration sensor, an engine speed sensor, and the like.

The rotational force of an engine 201 can be transferred to a power generator 202, and the electric power generated by the power generator 202 by means of the rotational force can be stored in a battery 208.

When a hybrid vehicle 200 is decelerated by a braking mechanism that is not shown in the diagram, the resistance force at the time of deceleration is added as a rotational force to the electric power driving force transducer 203, and the regenerative electric power generated by the electric power driving force transducer 203 by this rotational force is stored in the battery 208.

When the battery 208 is connected to an external power supply of the hybrid vehicle 200, the battery 208 can receive supply of electric power from an external power supply through a charging slot 211 as an input slot and store the received electric power.

Although not shown in the diagram, an information processing device that performs information processing for vehicle control based on the information related to the non-aqueous electrolyte battery, may also be included. Examples of such an information processing device include an information processing device which performs display of the battery residual quantity based on the information on the residual quantity of the battery.

An explanation has been given above, for example, on a series hybrid car that runs using a motor by using electric power generated by a power generator that is driven by an engine, or by using electric power that has been temporarily stored in a battery. However, the present technology can also be effectively applied to a parallel hybrid car in which the power outputs of both the engine and the motor are used as a driving source, and three modes such as running only on the engine, running only on the motor, and running on both the engine and the motor, may be switched as appropriate upon use. In addition, the present technology can also be effectively applied to a so-called electric vehicle that runs by being driven by a driving motor only without using an engine.

EXAMPLES

<Example 1-1> to <Example 1-72> and <Comparative Example 1-1> to <Comparative Example 1-3>

In Example 1-1 to Example 1-72 and Comparative Example 1-1 to Comparative Example 1-3 described below, the effect of the present technology were checked using separators in which the respective thicknesses and the respective porosities of the low-porosity layer and the high-porosity layer that constituted the surface layer had been adjusted.

Example 1-1

Production of Positive Electrode

A positive electrode mix was prepared by mixing 91% by mass of lithium cobaltate ($LiCoO_2$) as a positive electrode active material, 6% by mass of carbon black as a conductive material, and 3% by mass of polyvinylidene fluoride (PVdF) as a binder material, and this positive electrode mix was dispersed in N-methyl-2-pyrrolidone (NMP) as a dispersing medium to obtain a positive electrode mix slurry. This positive electrode mix slurry was applied on both surfaces of a positive electrode current collector formed from a band-shaped aluminum foil having a thickness of 12 μm, such that a part of the positive electrode current collector was exposed. Subsequently, the dispersing medium of the applied positive electrode mix slurry was evaporated and dried, and the remaining positive electrode mix slurry was compression molded using a roll press. Thereby, a positive electrode active material layer was formed. Lastly, a positive electrode terminal was attached to an exposed area of the positive electrode current collector, and thus a positive electrode was formed.

[Production of Negative Electrode]

A negative electrode mix was prepared by mixing 85% by mass of silicon (Si) particles as a negative electrode active material, 10% by mass of carbon black as a conductive material, and 5% by mass of polyvinylidene fluoride (PVdF) as a binder material, and this negative electrode mix was dispersed in N-methyl-2-pyrrolidone (NMP) as a dispersing solvent. Thus, a negative electrode mix slurry was obtained. This negative electrode mix slurry was applied on both surfaces of a negative electrode current collector formed from a band-shaped copper foil having a thickness of 15 μm, such that a part of the negative electrode current collector was exposed. Subsequently, the dispersing medium of the applied negative electrode mix slurry was evaporated and dried, and the remaining negative electrode mix slurry was compression molded using a roll press. Thereby, a negative electrode active material layer was formed. Lastly, a negative electrode terminal was attached to an exposed area of the positive electrode current collector, and thus a negative electrode was formed.

[Production of Separator]

First, a low-porosity layer which was a first surface layer was formed on both surfaces of a substrate. As the substrate, a microporous film made of polyethylene (PE) having a thickness of 9 μm and a porosity of 35% was used. The surface layer was formed as described below, on both surfaces of this substrate. First, as particles, alumina particles having an average particle size of 0.3 μm, which are inorganic particles, and polyvinylidene fluoride (PVdF) which is a resin material were mixed at a mass ratio of 9:1, the mixture was dispersed in 2-butanone (MEK), and thus a resin solution was produced. Subsequently, this resin solution was applied uniformly on both surfaces of the substrate to the same thickness. Moreover, when the alumina particles and polyvinylidene fluoride (PVdF) as a resin material were mixed at a mass ratio of 9:1, the mixing ratio as a volume ratio is such that alumina particles:polyvinylidene fluoride is nearly 80:20 ((9÷3.95):(1÷1.75)) from the specific gravity of alumina, 3.95 [$g/cm^3$], and the specific gravity of polyvinylidene fluoride, 1.75 [$g/cm^3$]. Furthermore, the resin solution obtained by mixing alumina and polyvinylidene fluoride at a mass ratio of 9:1 was such that the specific gravity of the solid content was 3.5 $g/cm^3$ (10÷(9÷3.95+1÷1.75)).

At this time, in order to form a low-porosity layer having a porosity of 60% and a one-surface thickness of 1 μm (total thickness of both surfaces: 2 μm) on both surfaces of the substrate, the resin solution was applied such that the area density of the solid content composed of alumina and polyvinylidene fluoride would be 0.00028 $g/cm^2$. The area density of the solid content was calculated from the product of the specific gravity of the solid content of the resin solution (3.5 [$g/cm^3$]), the volume ratio of the solid portion excluding pores in the low-porosity layer (40%=0.4), and the thickness of the low-porosity layer (2 [μm]=0.0002 [cm]) (3.5×0.4×0.0002).

Moreover, on the occasion of forming the low-porosity layer, the porosity is regulated by the solid content ratio of the inorganic particles and the resin material in the resin solution. For example, as the solid content ratio in the resin solution is made smaller, the ratio of MEK is increased, and the existence ratio of pores formed in the part from which MEK is removed is increased. The substrate having the resin solution applied on both surfaces, which was produced as such, was passed through a drying furnace, and thus 2-butanone (MEK) was removed. Thereby, a low-porosity layer having a porosity of 60% and a one-surface thickness of 1 μm (total thickness of both surfaces: 2 μm) was formed respectively on the two surfaces of the substrate.

Subsequently, a high-porosity layer having a porosity of 90% and a one-surface thickness of 6 μm (total thickness of both surfaces: 12 μm), which was a second surface layer, was further formed on both surfaces of the low-porosity layer. On the respective surfaces of the low-porosity layer formed on both surfaces of the substrate, a resin solution was applied while the solid content ratio of the resin solution and the coating thickness of the resin solution were adjusted. Regarding the application of the resin solution, a layer of the resin solution having a mottled pattern on the surface was formed by using a roll having convexities and concavities corresponding to a mottled pattern on the surface, and transferring the resin solution applied on the roll surface to the surface of the low-porosity layer. The coating amount of the resin solution was adjusted so as to obtain an area density of the solid content composed of alumina and polyvinylidene fluoride of 0.00042 g/cm$^2$. The coating amount of the resin solution was calculated from the product of the specific gravity of the solid content of the resin solution (3.5 [g/cm$^3$]), the volume ratio of the solid portion excluding pores in the high-porosity layer (10%=0.1), and the thickness of the high-porosity layer (12 [μm]=0.0012 [cm]) (3.5×0.1×0.0012). Furthermore, at this time, the area ratio between the part in which the resin solution was transferred and formed convexities of the high-porosity layer, and the part in which the resin solution was transferred and formed concavities of the high-porosity layer was adjusted such that the average porosity of the high-porosity layer after completion of the separator would be 90%.

The substrate thus produced, in which a resin solution layer having a mottled surface shape on both surfaces, was passed through a drying furnace, and thus 2-butanone (MEK) was removed. Thereby, a high-porosity layer having a porosity of 90% and a one-surface thickness of 6 μm (total thickness of both surfaces: 12 μm) was formed respectively on the two surfaces of the substrate.

Moreover, at the time of forming the high-porosity layer, the porosity is carried out by the surface shape of the roll used to transfer the resin solution. For example, in a case in which a high-porosity layer having a porosity of 90% is formed, when the resin solution is transferred, the area ratio between the part having the resin solution and the part without the resin solution is adjusted to be 1:3. In the case of making the porosity small, the porosity is adjusted by making the area ratio of the part having the resin solution larger.

[Preparation of Non-Aqueous Liquid Electrolyte]

A non-aqueous liquid electrolyte was prepared by dissolving lithium hexafluorophosphate (LiPF$_6$) as an electrolyte salt at a concentration of 1 mol/dm$^3$ in a non-aqueous solvent prepared by mixing ethylene carbonate (EC), vinylene carbonate (VC), and diethyl carbonate (DEC) at the ratio of ethylene carbonate (EC):vinylene carbonate (VC):diethyl carbonate (DEC)=30:10:60 as a mass ratio.

[Assembling of Cylindrical Battery]

The separator in which a positive electrode, a negative electrode and a surface layer were formed together on both surfaces, was laminated in the order of the positive electrode, the separator, the negative electrode, and the separator. The assembly was wound several times in the longitudinal direction, and then the winding end portion was fixed with an adhesive tape. Thus, a wound electrode assembly was formed. Subsequently, the negative electrode lead was connected to a negative electrode can along with having the positive electrode terminal connected to a safety valve that was connected to a battery lid. The wound electrode assembly was interposed between a pair of insulating plates and was accommodated inside the battery can. Subsequently, a center pin was inserted at the center of the wound electrode assembly.

Subsequently, the non-aqueous liquid electrolyte was injected into the inside of the cylindrical battery can from above the insulating plate. Finally, a safety valve mechanism composed of a safety valve, a disc holder and a cut-off disc, a PTC element, and a battery lid were placed at the opening of the battery can, and the opening was sealed by caulking with an insulating sealing gasket. Thereby, a cylindrical battery as illustrated in FIG. 6, having a battery shape with a diameter of 18 mm and a height of 65 mm (ICR18650 size) and having a battery capacity of 3500 mAh, was produced.

<Example 1-2> to <Example 1-3>

Separators were produced in a similar manner as in Example 1-1, except that a polyethylene (PE) microporous film having a porosity of 25% or 40% was respectively used as the substrate. Cylindrical batteries of Example 1-2 and Example 1-3 were respectively produced using these separators.

<Example 1-4> to <Example 1-6>

Separators were respectively produced in a similar manner as in Example 1-1, except that at the time of forming the low-porosity layer of the separator, the porosity of the low-porosity layer was adjusted to be 40%, 45%, or 65%, by decreasing or increasing the amount of the dispersing solvent in the resin solution, and by regulating the solid content concentration in the resin solution. Cylindrical batteries of Example 1-4 to Example 1-6 were respectively produced using these separators.

<Example 1-7> to <Example 1-11>

Separators were respectively produced in a similar manner as in Example 1-1, except that at the time of forming the high-porosity layer of the separator, the porosity of the high-porosity layer was adjusted to be 60%, 65%, 70%, 80%, or 85%, by regulating the area ratio of the part to which the resin solution was transferred. Cylindrical batteries of Example 1-7 to Example 1-11 were respectively produced using these separators.

Example 1-12

A separator was produced in a similar manner as in Example 1-1, except that a high-porosity layer having a one-surface thickness of 7 μm (total thickness of both surfaces: 14 μm) and a porosity of 90% was formed, without forming a low-porosity layer. A cylindrical battery of Example 1-12 was produced using this separator.

Example 1-13

A separator was produced in a similar manner as in Example 1-1, except that a high-porosity layer with a uniform surface, having a one-surface thickness of 7 μm (total thickness of both surfaces: 14 μm) and a porosity of 60% was formed by phase separation, without forming a low-porosity layer. A cylindrical battery of Example 1-13 was produced using this separator.

Moreover, the high-porosity layer was produced as follows. A resin solution was applied on both surfaces of low-porosity layers formed on both surfaces of a substrate, and then the substrate coated with the resin solution was immersed in a bath containing water, which was a good solvent, to induce phase separation. Thus, 2-butanone (MEK) in the resin solution was removed. At this time, high-energy ultrasonic waves were applied to the bath, and thereby high-porosity layers with a surface having concavo-convex shapes in a mottled pattern were formed. Subsequently, the substrate having the low-porosity layers and the high-porosity layers formed thereon were passed through a dryer, thereby water and residual MEK were removed, and thus a separator was produced.

Example 1-14

A separator was produced in a similar manner as in Example 1-1, except that a high-porosity layer having a one-surface thickness of 7 µm (total thickness of both surfaces: 14 µm) and a porosity of 70% was formed by phase separation, without forming a low-porosity layer. A cylindrical battery of Example 1-14 was produced using this separator. Moreover, the concavo-convex shapes on the surface of the high-porosity layer were regulated by using more intense energy of the ultrasonic waves applied to the bath at the time of phase separation, compared to Example 1-13.

Example 1-15

A separator having a lattice-like surface shape was produced in a similar manner as in Example 1-1, except that at the time of forming the high-porosity layer of the separator, application of the resin solution was carried out using a roll which had convexities and concavities corresponding to the lattice shape illustrated in FIG. 4B on the surface. A cylindrical battery of Example 1-15 was produced using this separator.

Example 1-16

A separator having a dotted surface shape was produced in a similar manner as in Example 1-1, except that at the time of forming the high-porosity layer of the separator, application of the resin solution was carried out using a roll which had convexities and concavities corresponding to the dotted shape illustrated in FIG. 4C on the surface. A cylindrical battery of Example 1-16 was produced using this separator.

Example 1-17

A separator having a pinhole-shaped surface shape was produced in a similar manner as in Example 1-1, except that at the time of forming the high-porosity layer of the separator, application of the resin solution was carried out using a roll which had convexities and concavities corresponding to the pinhole shape illustrated in FIG. 4D on the surface. A cylindrical battery of Example 1-17 was produced using this separator.

Example 1-18

A separator having a honeycomb-like surface shape was produced in a similar manner as in Example 1-1, except that at the time of forming the high-porosity layer of the separator, application of the resin solution was carried out using a roll which had convexities and concavities corresponding to the honeycomb-like shape shown in FIG. 4E on the surface. A cylindrical battery of Example 1-18 was produced using this separator.

<Example 1-19> to <Example 1-36>

At the time of forming a negative electrode active material layer, a carbon-tin composite material was used instead of a silicon powder as the negative electrode active material. Regarding the carbon-tin composite material, a SnCoC-containing material was used, which contained tin (Sn), cobalt (Co) and carbon (C) as constituent elements, and had a composition including a content of tin of 22% by mass, a content of cobalt of 55% by mass, and a content of carbon of 23% by mass, with the ratio of tin with respect to the sum of tin and cobalt, (Co/(Sn+Co)), being 71.4% by mass.

A negative electrode mix was produced by mixing 80% by mass of a SnCoC-containing material powder as a negative electrode active material, 12% by mass of graphite as a conductive agent, and 8% by mass of polyvinylidene fluoride (PVdF) as a binder. Subsequently, the negative electrode mix was dispersed in N-methyl-2-pyrrolidone, and thereby a paste-like negative electrode mix slurry was prepared. Cylindrical batteries of Example 1-19 to Example 1-36 were produced in a similar manner as in Example 1-1 to Example 1-18, respectively, except that this negative electrode mix slurry was used.

<Example 1-37> to <Example 1-54>

At the time of forming the negative electrode active material layer, lithium titanate ($Li_4Ti_5O_{12}$) was used instead of a silicon powder as the negative electrode active material. A negative electrode mix was prepared by mixing 85% by mass of lithium titanate ($Li_4Ti_5O_{12}$) as a negative electrode active material, 10% by mass of graphite as a conductive agent, and 5% by mass of polyvinylidene fluoride (PVdF) as a binder. Subsequently, the negative electrode mix was dispersed in N-methyl-2-pyrrolidone, and thereby a paste-like negative electrode mix slurry was prepared. Cylindrical batteries of Example 1-37 to Example 1-54 were produced in a similar manner as in Example 1-1 to Example 1-18, respectively, except that this negative electrode mix slurry was used.

<Example 1-55> to <Example 1-72>

At the time of forming a negative electrode active material layer, graphite was used instead of a silicon powder as the negative electrode active material. A negative electrode mix was prepared by mixing 96% by mass of a granular graphite powder having an average particle size of 20 µm as a negative electrode active material, 1.5% by mass of an acrylic acid modification product of a styrene-butadiene copolymer as a binder material, and 1.5% by mass of carboxymethyl cellulose as a thickening material. An appropriate amount of water was further added to the negative electrode mix under stirring, and thereby a negative electrode mix slurry was prepared. Cylindrical batteries of Example 1-55 to Example 1-72 were produced in a similar manner as in Example 1-1 to Example 1-18, respectively, except that this negative electrode mix slurry was used.

Comparative Example 1-1

A cylindrical battery of Comparative Example 1-1 was produced in a similar manner as in Example 1-1, except that a polyethylene microporous film having a thickness of 23 µm and having no surface layer provided thereon was used as a separator.

Comparative Example 1-2

A cylindrical battery of Comparative Example 1-2 was produced in a similar manner as in Example 1-1, except that a surface layer was not provided in the separator, and a gap of 14 µm in total was provided by providing a gap of 7 µm between the separator and the negative electrode as an expansion absorbing portion of the separator, and also providing a gap of 7 μm between the separator and the positive electrode.

Comparative Example 1-3

A cylindrical battery of Comparative Example 1-3 was produced in a similar manner as in Example 1-1, except that the high-porosity layer of the separator was formed such that the porosity of the high-porosity layer was 50%.

<Example 2-1> to <Example 2-72> and
<Comparative Example 2-1> to <Comparative Example 2-3>

In Example 2-1 to Example 2-72 and Comparative Example 2-1 to Comparative Example 2-3 described below, the effect of the present technology were checked using separators in which the respective thicknesses and the respective porosities of the low-porosity layer and the high-porosity layer that constituted the surface layer had been adjusted.

Example 2-1

A cylindrical battery having a battery shape that measured 18 mm in diameter and 65 mm in height (ICR18650 size) and a battery capacity of 3500 mAh, as illustrated in FIG. 6, was produced in a similar manner as in Example 1-1, except that a separator produced as follows was used.

[Production of Separator]

A separator was produced in a similar manner as in Example 1-1, except that boehmite (AlOOH) was used, instead of alumina, as the inorganic particles used in the surface layer of the separator. Moreover, the specific gravities of boehmite and alumina are different, and the specific gravity of boehmite (3.07) is smaller than the specific gravity of alumina (3.95). The volume ratio between the inorganic particles and the resin material (nearly 0.8:0.2) was not changed, the feed amount of the resin material was set to be constant, and the feed amount of boehmite was adjusted to 3.07/3.95 times so as to be proportional to the specific gravity.

Specifically, first, a low-porosity layer which was a first surface layer was formed on both surfaces of a substrate. As the substrate, a microporous film made of polyethylene (PE) having a thickness of 9 μm and a porosity of 35% was used. The surface layer was formed as described below, on both surfaces of this substrate.

Next, a resin solution was produced by mixing boehmite as the inorganic particles and polyvinylidene fluoride (PVdF) as a resin material at a mass ratio of 0.875:0.125 (9×(3.07/3.95):1), and dispersing the mixture in 2-butanone (MEK). Moreover, the feed amount of polyvinylidene fluoride as the resin material was similar to that used in Example 1-1, while the feed amount of boehmite was reduced to be equivalent to the feed amount of alumina in Example 1-1.

Subsequently, this resin solution was applied uniformly to the same thickness on both surfaces of the substrate. Moreover, when the boehmite particles and the polyvinylidene fluoride (PVdF) as a resin material were mixed at a mass ratio of 0.875:0.125, the resin solution obtained by mixing alumina and polyvinylidene fluoride at a mass ratio of 0.875:0.125 had a specific gravity of the solid content of 2.8 g/cm$^3$ (1÷(0.875÷3.07+0.125÷1.75)).

At this time, in order to form a low-porosity layer having a porosity of 60% and a one-surface thickness of 1 μm (total thickness of both surfaces: 2 μm) on both surfaces of the substrate, a resin solution was applied such that the area density of the solid content composed of boehmite and polyvinylidene fluoride would be 0.000224 g/cm$^2$. The area density of the solid content was calculated from the product of the specific gravity of the solid content of the resin solution (2.8 [g/cm$^3$]), the volume ratio of the solid portion excluding pores in the low-porosity layer (40%=0.4), and the thickness of the low-porosity layer (2 [μm]=0.0002 [cm]) (2.8×0.4×0.0002).

Moreover, at the time of forming the low-porosity layer, the porosity is regulated by the solid content ratio of the inorganic particles and the resin material in the resin solution. For example, as the solid content ratio in the resin solution decreases, the MEK ratio increases, and the existence ratio of pores formed in the part from which MEK has been removed is increased. A substrate having a resin solution applied on both surfaces, which was produced as such, was passed through a drying furnace, and thus 2-butanone (MEK) was removed. Thereby, a low-porosity layer having a porosity of 60% and a one-surface thickness of 1 μm (total thickness of both surfaces: 2 μm) was formed respectively on both surfaces of the substrate.

Subsequently, a high-porosity layer having a porosity of 90% and a one-surface thickness of 6 μm (total thickness of both surfaces: 12 μm), which was a second surface layer, was further formed on both surfaces of the low-porosity layers. A resin solution was applied on the respective surfaces of the low-porosity layers formed on both surfaces of the substrate, while the solid content ratio of the resin solution and the coating thickness of the resin solution were adjusted. Regarding the application of the resin solution, a layer of the resin solution having a mottled pattern on the surface was formed by using a roll having convexities and concavities corresponding to a mottled pattern on the surface, and transferring the resin solution applied on the roll surface to the surface of the low-porosity layer. The coating amount of the resin solution was adjusted so as to obtain an area density of the solid content composed of boehmite and polyvinylidene fluoride of 0.000336 g/cm$^2$. The coating amount of the resin solution was calculated from the product of the specific gravity of the solid content of the resin solution (2.8 [g/cm$^3$]), the volume ratio of the solid portion excluding pores in the high-porosity layer (10%=0.1), and the thickness of the high-porosity layer (12 [μm]=0.0012 [cm]) (2.8×0.1×0.0012). Furthermore, at this time, the area ratio between the part in which the resin solution was transferred and formed convexities of the high-porosity layer, and the part in which the resin solution was transferred and formed concavities of the high-porosity layer was adjusted such that the average porosity of the high-porosity layer after completion of the separator would be 90%.

The substrate thus produced, in which a resin solution layer having a mottled surface shape was formed on both surfaces, was passed through a drying furnace, and thus 2-butanone (MEK) was removed. Thereby, a high-porosity layer having a porosity of 90% and a one-surface thickness of 6 μm (total thickness of both surfaces: 12 μm) was formed respectively on both surfaces of the substrate.

Moreover, at the time of forming the high-porosity layer, the porosity can be regulated by performing the formation by means of the surface shape of the roll used to transfer the resin solution. For example, in a case in which a high-porosity layer having a porosity of 90% is formed, when the resin solution is transferred, the area ratio between the part having the resin solution and the part without the resin solution is adjusted to be 1:3. In the case of making the porosity small, the porosity is adjusted by making the area ratio of the part having the resin solution larger.

<Example 2-2> to <Example 2-3>

Separators were respectively produced in a similar manner as in Example 2-1, except that a polyethylene (PE) microporous film having a porosity of 25% or 40% was respectively used as a substrate. Cylindrical batteries of Example 2-2 and Example 2-3 were respectively produced using these separators.

<Example 2-4> to <Example 2-6>

Separators were respectively produced in a similar manner as in Example 2-1, except that at the time of forming the low-porosity layer of the separator, the porosity of the low-porosity layer was adjusted to 40%, 45%, or 65%, by increasing or decreasing the amount of the dispersing solvent in the resin solution, or by regulating the solid content concentration in the resin solution. Cylindrical batteries of Example 2-4 to Example 2-6 were respectively produced using these separators.

<Example 2-7> to <Example 2-11>

Separators were respectively produced in a similar manner as in Example 2-1, except that at the time of forming the high-porosity layer of the separator, the porosity of the high-porosity layer was adjusted to 60%, 65%, 70%, 80%, or 85%, by adjusting the area ratio of the part to which the resin solution was transferred. Cylindrical batteries of Example 2-7 to Example 2-11 were respectively produced using these separators.

Example 2-12

A separator was produced in a similar manner as in Example 2-1, except that a low-porosity layer was not formed, and a high-porosity layer having a one-surface thickness of 7 µm (total thickness of both surfaces: 14 µm) and a porosity of 90% was formed. A cylindrical battery of Example 2-12 was produced using this separator.

Example 2-13

A separator was produced in a similar manner as in Example 2-1, except that a low-porosity layer was not formed, and a high-porosity layer with a uniform surface having a one-surface thickness of 7 µm (total thickness of both surfaces: 14 µm) and a porosity of 60% was formed by phase separation. A cylindrical battery of Example 2-13 was produced using this separator.

Moreover, the high-porosity layer was produced as follows. A resin solution was applied on both surfaces of low-porosity layers formed on both surfaces of a substrate, and then the substrate coated with the resin solution was immersed in a bath containing water, which was a good solvent, to induce phase separation. Thus, 2-butanone (MEK) in the resin solution was removed. At this time, high-energy ultrasonic waves were applied to the bath, and thereby high-porosity layers with a surface having concavo-convex shapes in a mottled pattern were formed. Subsequently, the substrate having the low-porosity layers and the high-porosity layers formed thereon were passed through a dryer, thereby water and residual MEK were removed, and thus a separator was produced.

Example 2-14

A separator was produced in a similar manner as in Example 2-1, except that a low-porosity layer was not formed, and a high-porosity layer having a one-surface thickness of 7 µm (total thickness of both surfaces: 14 µm) and a porosity of 70% was formed by phase separation. A cylindrical battery of Example 2-14 was produced using this separator. Moreover, the concavo-convex shapes on the surface of the high-porosity layer were regulated by using more intense energy of the ultrasonic waves applied to the bath at the time of phase separation, compared to Example 2-13.

Example 2-15

A separator having a lattice-like surface shape was produced in a similar manner as in Example 2-1, except that at the time of forming the high-porosity layer of the separator, application of the resin solution was carried out using a roll which had convexities and concavities corresponding to the lattice shape illustrated in FIG. 4B on the surface. A cylindrical battery of Example 2-15 was produced using this separator.

Example 2-16

A separator having a dotted surface shape was produced in a similar manner as in Example 2-1, except that at the time of forming the high-porosity layer of the separator, application of the resin solution was carried out using a roll which had convexities and concavities corresponding to the dotted shape illustrated in FIG. 4C on the surface. A cylindrical battery of Example 2-16 was produced using this separator.

Example 2-17

A separator having a pinhole-shaped surface shape was produced in a similar manner as in Example 2-1, except that at the time of forming the high-porosity layer of the separator, application of the resin solution was carried out using a roll which had convexities and concavities corresponding to the pinhole shape illustrated in FIG. 4D on the surface. A cylindrical battery of Example 2-17 was produced using this separator.

Example 2-18

A separator having a honeycomb-like surface shape was produced in a similar manner as in Example 2-1, except that at the time of forming the high-porosity layer of the separator, application of the resin solution was carried out using a roll which had convexities and concavities corresponding to the honeycomb-like shape shown in FIG. 4E on the surface. A cylindrical battery of Example 2-18 was produced using this separator.

<Example 2-19> to <Example 2-36>

At the time of forming a negative electrode active material layer, a carbon-tin composite material was used instead of silicon as the negative electrode active material. Regarding the carbon-tin composite material, a SnCoC-containing material was used, which contained tin (Sn), cobalt (Co) and carbon (C) as constituent elements, and had a composition including a content of tin of 22% by mass, a content of cobalt of 55% by mass, and a content of carbon of 23% by mass, with the ratio of tin with respect to the sum of tin and cobalt, (Co/(Sn+Co)), being 71.4% by mass.

A negative electrode mix was produced by mixing 80% by mass of a SnCoC-containing material powder as a negative electrode active material, 12% by mass of graphite as a conductive agent, and 8% by mass of polyvinylidene fluoride (PVdF) as a binder. Subsequently, the negative electrode mix was dispersed in N-methyl-2-pyrrolidone, and thereby a paste-like negative electrode mix slurry was prepared. Cylindrical batteries of Example 2-19 to Example 2-36 were produced in a similar manner as in Example 2-1 to Example 2-18, respectively, except that this negative electrode mix slurry was used.

<Example 2-37> to <Example 2-54>

At the time of forming the negative electrode active material layer, lithium titanate ($Li_4Ti_5O_{12}$) was used instead of silicon as the negative electrode active material. A negative electrode mix was prepared by mixing 85% by mass of lithium titanate ($Li_4Ti_5O_{12}$) as a negative electrode active material, 10% by mass of graphite as a conductive agent, and 5% by mass of polyvinylidene fluoride (PVdF) as a binder. Subsequently, the negative electrode mix was dispersed in N-methyl-2-pyrrolidone, and thereby a paste-like negative electrode mix slurry was prepared. Cylindrical batteries of Example 2-37 to Example 2-54 were produced in a similar manner as in Example 2-1 to Example 2-18, respectively, except that this negative electrode mix slurry was used.

<Example 2-55> to <Example 2-72>

At the time of forming a negative electrode active material layer, graphite was used instead of a silicon powder as the negative electrode active material. A negative electrode mix was prepared by mixing 96% by mass of a granular graphite powder having an average particle size of 20 μm as a negative electrode active material, 1.5% by mass of an acrylic acid modification product of a styrene-butadiene copolymer as a binder material, and 1.5% by mass of carboxymethyl cellulose as a thickening material. An appropriate amount of water was further added to the negative electrode mix under stirring, and thereby a negative electrode mix slurry was prepared. Cylindrical batteries of Example 2-55 to Example 2-72 were produced in a similar manner as in Example 1-1 to Example 1-18, respectively, except that this negative electrode mix slurry was used.

[Evaluation of Batteries]
(a) Cycle Test

For the cylindrical batteries of Example 1-1 to Example 1-36, Example 1-55 to Example 1-72, Example 2-1 to Example 2-36, and Comparative Example 1-1 to Comparative Example 1-3 thus produced, constant current charging was carried out up to a battery voltage of 4.2 V with a charging current of 1 C in an atmosphere at 23° C., and then constant voltage charging was carried out at 4.2 V. At the time point when the charging current reached 0.5 mA, charging was terminated. Thereafter, constant current discharging was carried out up to a battery voltage of 3.0 V with a discharging current of 1 C, and the discharge capacity at this time was measured and designated as the initial capacity. Moreover, "1 C" means a current value with which the theoretical capacity is discharged in one hour. Subsequently, charging and discharging was carried out up to 500 cycles under the same conditions as the charging and discharging conditions described above, and the discharge capacity of the $500^{th}$ cycle was measured. The capacity retention ratio was calculated by the following formula:

Capacity retention ratio [%]=(Discharge capacity of $500^{th}$ cycle/initial capacity)×100

Furthermore, in regard to Examples 1-37 to Example 1-54 and Example 2-37 to Example 2-54, in which lithium titanate was used as the negative electrode active material, charging and discharging was carried out by setting the charge upper limit voltage to 2.8 V and the discharge termination voltage to 1.8 V, under the charging and discharging conditions described above. Thus, the capacity retention ratio was calculated.

(b) Confirmation of Separator Porosity and Thickness

For the cylindrical batteries of the various Examples and Comparative Examples thus produced, initial charging was carried out under the same conditions as those used in the cycle test described above, and then the batteries were disassembled. The respective porosities and thicknesses of the low-porosity layer and the high-porosity layer of the separator were measured. Furthermore, the cylindrical batteries that had been subjected to charging and discharging up to 500 cycles under the same conditions as those used in the cycle test described above, were similarly disassembled, and the respective porosities and thicknesses of the low-porosity layer and the high-porosity layer of the separator were measured.

The evaluation results are presented in the following Table 1 and Table 2.

TABLE 1

|  | Inorganic particles | Negative electrode active material | Substrate Material | Substrate Thickness [μm] | Substrate Porosity [%] | Surface layer Low-porosity layer Thickness [μm] | Surface layer Low-porosity layer Porosity [%] | Surface layer High-porosity layer Thickness [μm] | Surface layer High-porosity layer Porosity [%] | Surface shape |
|---|---|---|---|---|---|---|---|---|---|---|
| Example 1-1 | Alumina | Silicon | PE | 9 | 35 | 2 | 60 | 12 | 90 | Mottled |
| Example 1-2 |  |  |  |  | 25 | 2 | 60 | 12 | 90 | Mottled |
| Example 1-3 |  |  |  |  | 40 | 2 | 60 | 12 | 90 | Mottled |
| Example 1-4 |  |  |  |  | 35 | 2 | 40 | 12 | 90 | Mottled |
| Example 1-5 |  |  |  |  | 35 | 2 | 45 | 12 | 90 | Mottled |
| Example 1-6 |  |  |  |  | 35 | 2 | 65 | 12 | 90 | Mottled |
| Example 1-7 |  |  |  |  | 35 | 2 | 60 | 12 | 60 | Mottled |
| Example 1-8 |  |  |  |  | 35 | 2 | 60 | 12 | 65 | Mottled |
| Example 1-9 |  |  |  |  | 35 | 2 | 60 | 12 | 70 | Mottled |

TABLE 1-continued

| Example | | | | | | | | | | |
|---|---|---|---|---|---|---|---|---|---|---|
| Example 1-10 | | | | | 35 | 2 | 60 | 12 | 80 | Mottled |
| Example 1-11 | | | | | 35 | 2 | 60 | 12 | 85 | Mottled |
| Example 1-12 | | | | | 35 | 0 | — | 14 | 90 | Mottled |
| Example 1-13 | | | | | 35 | 0 | — | 14 | 60 | Mottled (ultrasonication) |
| Example 1-14 | | | | | 35 | 0 | — | 14 | 70 | Mottled (ultrasonication) |
| Example 1-15 | | | | | 35 | 2 | 60 | 12 | 90 | Lattice-like |
| Example 1-16 | | | | | 35 | 2 | 60 | 12 | 90 | Dotted |
| Example 1-17 | | | | | 35 | 2 | 60 | 12 | 90 | Pinhole-shaped |
| Example 1-18 | | | | | 35 | 2 | 60 | 12 | 90 | Honeycomb-like |
| Example 1-19 | | Carbon-tin | PE | 9 | 35 | 2 | 60 | 12 | 90 | Mottled |
| Example 1-20 | | composite | | | 25 | 2 | 60 | 12 | 90 | Mottled |
| Example 1-21 | | material | | | 40 | 2 | 60 | 12 | 90 | Mottled |
| Example 1-22 | | | | | 35 | 2 | 40 | 12 | 90 | Mottled |
| Example 1-23 | | | | | 35 | 2 | 45 | 12 | 90 | Mottled |
| Example 1-24 | | | | | 35 | 2 | 65 | 12 | 90 | Mottled |
| Example 1-25 | | | | | 35 | 2 | 60 | 12 | 60 | Mottled |
| Example 1-26 | | | | | 35 | 2 | 60 | 12 | 65 | Mottled |
| Example 1-27 | | | | | 35 | 2 | 60 | 12 | 70 | Mottled |
| Example 1-28 | | | | | 35 | 2 | 60 | 12 | 80 | Mottled |
| Example 1-29 | | | | | 35 | 2 | 60 | 12 | 85 | Mottled |
| Example 1-30 | | | | | 35 | 0 | — | 14 | 90 | Mottled |
| Example 1-31 | | | | | 35 | 0 | — | 14 | 60 | Mottled (ultrasonication) |
| Example 1-32 | | | | | 35 | 0 | — | 14 | 70 | Mottled (ultrasonication) |
| Example 1-33 | | | | | 35 | 2 | 60 | 12 | 90 | Lattice-like |
| Example 1-34 | Alumina | Carbon-tin | PE | 9 | 35 | 2 | 60 | 12 | 90 | Dotted |
| Example 1-35 | | composite | | | 35 | 2 | 60 | 12 | 90 | Pinhole-shaped |
| Example 1-36 | | material | | | 35 | 2 | 60 | 12 | 90 | Honeycomb-like |
| Example 1-37 | | Lithium | PE | 9 | 35 | 2 | 60 | 12 | 90 | Mottled |
| Example 1-38 | | titanate | | | 25 | 2 | 60 | 12 | 90 | Mottled |
| Example 1-39 | | | | | 40 | 2 | 60 | 12 | 90 | Mottled |
| Example 1-40 | | | | | 35 | 2 | 40 | 12 | 90 | Mottled |
| Example 1-41 | | | | | 35 | 2 | 45 | 12 | 90 | Mottled |
| Example 1-42 | | | | | 35 | 2 | 65 | 12 | 90 | Mottled |
| Example 1-43 | | | | | 35 | 2 | 60 | 12 | 60 | Mottled |
| Example 1-44 | | | | | 35 | 2 | 60 | 12 | 65 | Mottled |
| Example 1-45 | | | | | 35 | 2 | 60 | 12 | 70 | Mottled |
| Example 1-46 | | | | | 35 | 2 | 60 | 12 | 80 | Mottled |
| Example 1-47 | | | | | 35 | 2 | 60 | 12 | 85 | Mottled |
| Example 1-48 | | | | | 35 | 0 | — | 14 | 90 | Mottled |
| Example 1-49 | | | | | 35 | 0 | — | 14 | 60 | Mottled (ultrasonication) |
| Example 1-50 | | | | | 35 | 0 | — | 14 | 70 | Mottled (ultrasonication) |
| Example 1-51 | | | | | 35 | 2 | 60 | 12 | 90 | Lattice-like |
| Example 1-52 | | | | | 35 | 2 | 60 | 12 | 90 | Dotted |
| Example 1-53 | | | | | 35 | 2 | 60 | 12 | 90 | Pinhole-shaped |
| Example 1-54 | | | | | 35 | 2 | 60 | 12 | 90 | Honeycomb-like |
| Example 1-55 | | Graphite | PE | 9 | 35 | 2 | 60 | 12 | 90 | Mottled |
| Example 1-56 | | | | | 25 | 2 | 60 | 12 | 90 | Mottled |
| Example 1-57 | | | | | 40 | 2 | 60 | 12 | 90 | Mottled |
| Example 1-58 | | | | | 35 | 2 | 40 | 12 | 90 | Mottled |
| Example 1-59 | | | | | 35 | 2 | 45 | 12 | 90 | Mottled |
| Example 1-60 | | | | | 35 | 2 | 65 | 12 | 90 | Mottled |
| Example 1-61 | | | | | 35 | 2 | 60 | 12 | 60 | Mottled |
| Example 1-62 | | | | | 35 | 2 | 60 | 12 | 65 | Mottled |
| Example 1-63 | | | | | 35 | 2 | 60 | 12 | 70 | Mottled |
| Example 1-64 | | | | | 35 | 2 | 60 | 12 | 80 | Mottled |
| Example 1-65 | | | | | 35 | 2 | 60 | 12 | 85 | Mottled |
| Example 1-66 | | | | | 35 | 0 | — | 14 | 90 | Mottled |
| Example 1-67 | Alumina | Graphite | PE | 9 | 35 | 0 | — | 14 | 60 | Mottled (ultrasonication) |
| Example 1-68 | | | | | 35 | 0 | — | 14 | 70 | Mottled (ultrasonication) |
| Example 1-69 | | | | | 35 | 2 | 60 | 12 | 90 | Lattice-like |
| Example 1-70 | | | | | 35 | 2 | 60 | 12 | 90 | Dotted |
| Example 1-71 | | | | | 35 | 2 | 60 | 12 | 90 | Pinhole-shaped |
| Example 1-72 | | | | | 35 | 2 | 60 | 12 | 90 | Honeycomb-like |
| Comparative Example 1-1 | Alumina | Silicon | PE | 23 | 35 | — | — | — | — | — |
| Comparative Example 1-2 | | | | 9 | 35 | — | — | — | — | — |
| Comparative Example 1-3 | | | | 9 | 35 | 2 | 60 | 12 | 50 | Mottled |

TABLE 1-continued

|  | Capacity retention ratio [%] | Surface layer after initial charging | | | | Surface layer after 500 cycles | | | |
|---|---|---|---|---|---|---|---|---|---|
|  |  | Low-porosity layer | | High-porosity layer | | Low-porosity layer | | High-porosity layer | |
|  |  | Thickness [μm] | Porosity [%] | Thickness [μm] | Porosity [%] | Thickness [μm] | Porosity [%] | Thickness [μm] | Porosity [%] |
| Example 1-1 | 88 | 2 | 60 | 4 | 70 | 2 | 60 | 2 | 40 |
| Example 1-2 | 88 | 2 | 60 | 4 | 70 | 2 | 60 | 2 | 40 |
| Example 1-3 | 88 | 2 | 40 | 4 | 70 | 2 | 40 | 2 | 40 |
| Example 1-4 | 88 | 2 | 45 | 4 | 70 | 2 | 45 | 2 | 40 |
| Example 1-5 | 88 | 2 | 65 | 4 | 70 | 2 | 65 | 2 | 40 |
| Example 1-6 | 88 | 2 | 60 | 4 | 70 | 2 | 60 | 2 | 40 |
| Example 1-7 | 82 | 2 | 60 | 8 | 40 | 2 | 60 | 6.5 | 26 |
| Example 1-8 | 84 | 2 | 60 | 7 | 40 | 2 | 60 | 6 | 30 |
| Example 1-9 | 83 | 2 | 60 | 7 | 49 | 2 | 60 | 5 | 28 |
| Example 1-10 | 88 | 2 | 60 | 5 | 52 | 2 | 60 | 4 | 40 |
| Example 1-11 | 88 | 2 | 60 | 4 | 55 | 2 | 60 | 3 | 40 |
| Example 1-12 | 72 | 0 | — | 6 | 77 | 0 | — | 4 | 65 |
| Example 1-13 | 52 | 0 | — | 10 | 44 | 0 | — | 8 | 30 |
| Example 1-14 | 62 | 0 | — | 9 | 53 | 0 | — | 7 | 40 |
| Example 1-15 | 88 | 2 | 60 | 4 | 70 | 2 | 60 | 2 | 40 |
| Example 1-16 | 88 | 2 | 60 | 4 | 70 | 2 | 60 | 2 | 40 |
| Example 1-17 | 88 | 2 | 60 | 4 | 70 | 2 | 60 | 2 | 40 |
| Example 1-18 | 88 | 2 | 60 | 4 | 70 | 2 | 60 | 2 | 40 |
| Example 1-19 | 94 | 2 | 60 | 6 | 80 | 2 | 60 | 4 | 70 |
| Example 1-20 | 94 | 2 | 60 | 6 | 80 | 2 | 60 | 4 | 70 |
| Example 1-21 | 94 | 2 | 40 | 6 | 80 | 2 | 40 | 4 | 70 |
| Example 1-22 | 94 | 2 | 45 | 6 | 80 | 2 | 45 | 4 | 70 |
| Example 1-23 | 94 | 2 | 65 | 6 | 80 | 2 | 65 | 4 | 70 |
| Example 1-24 | 94 | 2 | 60 | 6 | 80 | 2 | 60 | 4 | 70 |
| Example 1-25 | 82 | 2 | 60 | 8 | 40 | 2 | 60 | 6.5 | 26 |
| Example 1-26 | 84 | 2 | 60 | 7 | 40 | 2 | 60 | 6 | 30 |
| Example 1-27 | 83 | 2 | 60 | 7 | 49 | 2 | 60 | 5 | 28 |
| Example 1-28 | 88 | 2 | 60 | 6 | 80 | 2 | 60 | 4 | 40 |
| Example 1-29 | 90 | 2 | 60 | 6 | 80 | 2 | 60 | 4 | 51 |
| Example 1-30 | 74 | 0 | — | 8 | 83 | 0 | — | 6 | 77 |
| Example 1-31 | 54 | 0 | — | 10 | 44 | 0 | — | 8 | 30 |
| Example 1-32 | 64 | 0 | — | 9 | 53 | 0 | — | 7 | 40 |
| Example 1-33 | 94 | 2 | 60 | 6 | 80 | 2 | 60 | 4 | 70 |
| Example 1-34 | 94 | 2 | 60 | 6 | 80 | 2 | 60 | 4 | 70 |
| Example 1-35 | 94 | 2 | 60 | 6 | 80 | 2 | 60 | 4 | 70 |
| Example 1-36 | 94 | 2 | 60 | 6 | 80 | 2 | 60 | 4 | 70 |
| Example 1-37 | 96 | 2 | 60 | 8 | 85 | 2 | 60 | 6 | 80 |
| Example 1-38 | 96 | 2 | 60 | 8 | 85 | 2 | 60 | 6 | 80 |
| Example 1-39 | 96 | 2 | 40 | 8 | 85 | 2 | 40 | 6 | 80 |
| Example 1-40 | 96 | 2 | 45 | 8 | 85 | 2 | 45 | 6 | 80 |
| Example 1-41 | 96 | 2 | 65 | 8 | 85 | 2 | 65 | 6 | 80 |
| Example 1-42 | 96 | 2 | 60 | 8 | 85 | 2 | 60 | 6 | 80 |
| Example 1-43 | 82 | 2 | 60 | 8 | 40 | 2 | 60 | 6.5 | 26 |
| Example 1-44 | 84 | 2 | 60 | 8 | 48 | 2 | 60 | 6 | 30 |
| Example 1-45 | 88 | 2 | 60 | 8 | 55 | 2 | 60 | 6 | 40 |
| Example 1-46 | 92 | 2 | 60 | 8 | 70 | 2 | 60 | 6 | 60 |
| Example 1-47 | 94 | 2 | 60 | 8 | 78 | 2 | 60 | 6 | 70 |
| Example 1-48 | 76 | 0 | — | 10 | 86 | 0 | — | 8 | 83 |
| Example 1-49 | 56 | 0 | — | 10 | 44 | 0 | — | 8 | 30 |
| Example 1-50 | 66 | 0 | — | 10 | 58 | 0 | — | 8 | 48 |
| Example 1-51 | 96 | 2 | 60 | 8 | 85 | 2 | 60 | 6 | 80 |
| Example 1-52 | 96 | 2 | 60 | 8 | 85 | 2 | 60 | 6 | 80 |
| Example 1-53 | 96 | 2 | 60 | 8 | 85 | 2 | 60 | 6 | 80 |
| Example 1-54 | 96 | 2 | 60 | 8 | 85 | 2 | 60 | 6 | 80 |
| Example 1-55 | 96 | 2 | 60 | 8 | 85 | 2 | 60 | 6 | 80 |
| Example 1-56 | 96 | 2 | 60 | 8 | 85 | 2 | 60 | 6 | 80 |
| Example 1-57 | 96 | 2 | 40 | 8 | 85 | 2 | 40 | 6 | 80 |
| Example 1-58 | 96 | 2 | 45 | 8 | 85 | 2 | 45 | 6 | 80 |
| Example 1-59 | 96 | 2 | 65 | 8 | 85 | 2 | 65 | 6 | 80 |
| Example 1-60 | 96 | 2 | 60 | 8 | 85 | 2 | 60 | 6 | 80 |
| Example 1-61 | 82 | 2 | 60 | 8 | 40 | 2 | 60 | 6.5 | 26 |
| Example 1-62 | 84 | 2 | 60 | 8 | 48 | 2 | 60 | 6 | 30 |
| Example 1-63 | 88 | 2 | 60 | 8 | 55 | 2 | 60 | 6 | 40 |
| Example 1-64 | 92 | 2 | 60 | 8 | 70 | 2 | 60 | 6 | 60 |
| Example 1-65 | 94 | 2 | 60 | 8 | 78 | 2 | 60 | 6 | 70 |
| Example 1-66 | 78 | 0 | — | 10 | 86 | 0 | — | 8 | 83 |
| Example 1-67 | 58 | 0 | — | 10 | 44 | 0 | — | 8 | 30 |
| Example 1-68 | 68 | 0 | — | 10 | 58 | 0 | — | 8 | 48 |
| Example 1-69 | 96 | 2 | 60 | 8 | 85 | 2 | 60 | 6 | 80 |
| Example 1-70 | 96 | 2 | 60 | 8 | 85 | 2 | 60 | 6 | 80 |
| Example 1-71 | 96 | 2 | 60 | 8 | 85 | 2 | 60 | 6 | 80 |

TABLE 1-continued

|  |  |  |  |  |  |  |  |  |  |
|---|---|---|---|---|---|---|---|---|---|
| Example 1-72 | 96 | 2 | 60 | 8 | 85 | 2 | 60 | 6 | 80 |
| Comparative Example 1-1 | 5 | PE separator: 23 → 17 μm 12% | | | | PE separator: 23 → 15 μm 0% | | | |
| Comparative Example 1-2 | 5 | PE separator: 35% | | | | | | | |
| Comparative Example 1-3 | 5 | 2 | 60 | 8 | 25 | 2 | 60 | 6 | 0 |

TABLE 2

| | | | | | | Surface layer | | | |
|---|---|---|---|---|---|---|---|---|---|
| | | Negative electrode | | Substrate | | Low-porosity layer | | High-porosity layer | |
| | Inorganic particles | active material | Material | Thickness [μm] | Porosity [%] | Thickness [μm] | Porosity [%] | Thickness [μm] | Porosity [%] | Surface shape |
| Example 2-1 | Boehmite | Silicon | PE | 9 | 35 | 2 | 60 | 12 | 90 | Mottled |
| Example 2-2 | | | | | 25 | 2 | 60 | 12 | 90 | Mottled |
| Example 2-3 | | | | | 40 | 2 | 60 | 12 | 90 | Mottled |
| Example 2-4 | | | | | 35 | 2 | 40 | 12 | 90 | Mottled |
| Example 2-5 | | | | | 35 | 2 | 45 | 12 | 90 | Mottled |
| Example 2-6 | | | | | 35 | 2 | 65 | 12 | 90 | Mottled |
| Example 2-7 | | | | | 35 | 2 | 60 | 12 | 60 | Mottled |
| Example 2-8 | | | | | 35 | 2 | 60 | 12 | 65 | Mottled |
| Example 2-9 | | | | | 35 | 2 | 60 | 12 | 70 | Mottled |
| Example 2-10 | | | | | 35 | 2 | 60 | 12 | 80 | Mottled |
| Example 2-11 | | | | | 35 | 2 | 60 | 12 | 85 | Mottled |
| Example 2-12 | | | | | 35 | 0 | — | 14 | 90 | Mottled |
| Example 2-13 | | | | | 35 | 0 | — | 14 | 60 | Mottled (ultrasonication) |
| Example 2-14 | | | | | 35 | 0 | — | 14 | 70 | Mottled (ultrasonication) |
| Example 2-15 | | | | | 35 | 2 | 60 | 12 | 90 | Lattice-like |
| Example 2-16 | | | | | 35 | 2 | 60 | 12 | 90 | Dotted |
| Example 2-17 | | | | | 35 | 2 | 60 | 12 | 90 | Pinhole-shaped |
| Example 2-18 | | | | | 35 | 2 | 60 | 12 | 90 | Honeycomb-like |
| Example 2-19 | | Carbon-tin composite material | PE | 9 | 35 | 2 | 60 | 12 | 90 | Mottled |
| Example 2-20 | | | | | 25 | 2 | 60 | 12 | 90 | Mottled |
| Example 2-21 | | | | | 40 | 2 | 60 | 12 | 90 | Mottled |
| Example 2-22 | | | | | 35 | 2 | 40 | 12 | 90 | Mottled |
| Example 2-23 | | | | | 35 | 2 | 45 | 12 | 90 | Mottled |
| Example 2-24 | | | | | 35 | 2 | 65 | 12 | 90 | Mottled |
| Example 2-25 | | | | | 35 | 2 | 60 | 12 | 60 | Mottled |
| Example 2-26 | | | | | 35 | 2 | 60 | 12 | 65 | Mottled |
| Example 2-27 | | | | | 35 | 2 | 60 | 12 | 70 | Mottled |
| Example 2-28 | | | | | 35 | 2 | 60 | 12 | 80 | Mottled |
| Example 2-29 | | | | | 35 | 2 | 60 | 12 | 85 | Mottled |
| Example 2-30 | | | | | 35 | 0 | — | 14 | 90 | Mottled |
| Example 2-31 | | | | | 35 | 0 | — | 14 | 60 | Mottled (ultrasonication) |
| Example 2-32 | | | | | 35 | 0 | — | 14 | 70 | Mottled (ultrasonication) |
| Example 2-33 | | | | | 35 | 2 | 60 | 12 | 90 | Lattice-like |
| Example 2-34 | Boehmite | Carbon-tin composite material | PE | 9 | 35 | 2 | 60 | 12 | 90 | Dotted |
| Example 2-35 | | | | | 35 | 2 | 60 | 12 | 90 | Pinhole-shaped |
| Example 2-36 | | | | | 35 | 2 | 60 | 12 | 90 | Honeycomb-like |
| Example 2-37 | | Lithium titanate | PE | 9 | 35 | 2 | 60 | 12 | 90 | Mottled |
| Example 2-38 | | | | | 25 | 2 | 60 | 12 | 90 | Mottled |
| Example 2-39 | | | | | 40 | 2 | 60 | 12 | 90 | Mottled |
| Example 2-40 | | | | | 35 | 2 | 40 | 12 | 90 | Mottled |
| Example 2-41 | | | | | 35 | 2 | 45 | 12 | 90 | Mottled |
| Example 2-42 | | | | | 35 | 2 | 65 | 12 | 90 | Mottled |
| Example 2-43 | | | | | 35 | 2 | 60 | 12 | 60 | Mottled |
| Example 2-44 | | | | | 35 | 2 | 60 | 12 | 65 | Mottled |
| Example 2-45 | | | | | 35 | 2 | 60 | 12 | 70 | Mottled |
| Example 2-46 | | | | | 35 | 2 | 60 | 12 | 80 | Mottled |
| Example 2-47 | | | | | 35 | 2 | 60 | 12 | 85 | Mottled |
| Example 2-48 | | | | | 35 | 0 | — | 14 | 90 | Mottled |
| Example 2-49 | | | | | 35 | 0 | — | 14 | 60 | Mottled (ultrasonication) |
| Example 2-50 | | | | | 35 | 0 | — | 14 | 70 | Mottled (ultrasonication) |
| Example 2-51 | | | | | 35 | 2 | 60 | 12 | 90 | Lattice-like |
| Example 2-52 | | | | | 35 | 2 | 60 | 12 | 90 | Dotted |

TABLE 2-continued

| | | | | | | | | | |
|---|---|---|---|---|---|---|---|---|---|
| Example 2-53 | | | | | 35 | 2 | 60 | 12 | 90 | Pinhole-shaped |
| Example 2-54 | | | | | 35 | 2 | 60 | 12 | 90 | Honeycomb-like |
| Example 2-55 | | Graphite | PE | 9 | 35 | 2 | 60 | 12 | 90 | Mottled |
| Example 2-56 | | | | | 25 | 2 | 60 | 12 | 90 | Mottled |
| Example 2-57 | | | | | 40 | 2 | 60 | 12 | 90 | Mottled |
| Example 2-58 | | | | | 35 | 2 | 40 | 12 | 90 | Mottled |
| Example 2-59 | | | | | 35 | 2 | 45 | 12 | 90 | Mottled |
| Example 2-60 | | | | | 35 | 2 | 65 | 12 | 90 | Mottled |
| Example 2-61 | | | | | 35 | 2 | 60 | 12 | 60 | Mottled |
| Example 2-62 | | | | | 35 | 2 | 60 | 12 | 65 | Mottled |
| Example 2-63 | | | | | 35 | 2 | 60 | 12 | 70 | Mottled |
| Example 2-64 | | | | | 35 | 2 | 60 | 12 | 80 | Mottled |
| Example 2-65 | | | | | 35 | 2 | 60 | 12 | 85 | Mottled |
| Example 2-66 | | | | | 35 | 0 | — | 14 | 90 | Mottled |
| Example 2-67 | Boehmite | Graphite | PE | 9 | 35 | 0 | — | 14 | 60 | Mottled (ultrasonication) |
| Example 2-68 | | | | | 35 | 0 | — | 14 | 70 | Mottled (ultrasonication) |
| Example 2-69 | | | | | 35 | 2 | 60 | 12 | 90 | Lattice-like |
| Example 2-70 | | | | | 35 | 2 | 60 | 12 | 90 | Dotted |
| Example 2-71 | | | | | 35 | 2 | 60 | 12 | 90 | Pinhole-shaped |
| Example 2-72 | | | | | 35 | 2 | 60 | 12 | 90 | Honeycomb-like |

| | | Surface layer after initial charging | | | | Surface layer after 500 cycles | | | |
|---|---|---|---|---|---|---|---|---|---|
| | Capacity retention ratio [%] | Low-porosity layer | | High-porosity layer | | Low-porosity layer | | High-porosity layer | |
| | | Thickness [μm] | Porosity [%] | Thickness [μm] | Porosity [%] | Thickness [μm] | Porosity [%] | Thickness [μm] | Porosity [%] |
| Example 2-1 | 90 | 2 | 60 | 4 | 70 | 2 | 60 | 2 | 40 |
| Example 2-2 | 90 | 2 | 60 | 4 | 70 | 2 | 60 | 2 | 40 |
| Example 2-3 | 90 | 2 | 60 | 4 | 70 | 2 | 60 | 2 | 40 |
| Example 2-4 | 90 | 2 | 40 | 4 | 70 | 2 | 40 | 2 | 40 |
| Example 2-5 | 90 | 2 | 45 | 4 | 70 | 2 | 45 | 2 | 40 |
| Example 2-6 | 90 | 2 | 65 | 4 | 70 | 2 | 65 | 2 | 40 |
| Example 2-7 | 84 | 2 | 60 | 8 | 40 | 2 | 60 | 6.5 | 26 |
| Example 2-8 | 86 | 2 | 60 | 7 | 40 | 2 | 60 | 6 | 30 |
| Example 2-9 | 85 | 2 | 60 | 7 | 49 | 2 | 60 | 5 | 28 |
| Example 2-10 | 90 | 2 | 60 | 5 | 52 | 2 | 60 | 4 | 40 |
| Example 2-11 | 90 | 2 | 60 | 4 | 55 | 2 | 60 | 3 | 40 |
| Example 2-12 | 74 | 0 | — | 6 | 77 | 0 | — | 4 | 65 |
| Example 2-13 | 54 | 0 | — | 10 | 44 | 0 | — | 8 | 30 |
| Example 2-14 | 64 | 0 | — | 9 | 53 | 0 | — | 7 | 40 |
| Example 2-15 | 90 | 2 | 60 | 4 | 70 | 2 | 60 | 2 | 40 |
| Example 2-16 | 90 | 2 | 60 | 4 | 70 | 2 | 60 | 2 | 40 |
| Example 2-17 | 90 | 2 | 60 | 4 | 70 | 2 | 60 | 2 | 40 |
| Example 2-18 | 96 | 2 | 60 | 4 | 70 | 2 | 60 | 2 | 40 |
| Example 2-19 | 96 | 2 | 60 | 6 | 80 | 2 | 60 | 4 | 70 |
| Example 2-20 | 96 | 2 | 60 | 6 | 80 | 2 | 60 | 4 | 70 |
| Example 2-21 | 96 | 2 | 60 | 6 | 80 | 2 | 60 | 4 | 70 |
| Example 2-22 | 96 | 2 | 40 | 6 | 80 | 2 | 40 | 4 | 70 |
| Example 2-23 | 96 | 2 | 45 | 6 | 80 | 2 | 45 | 4 | 70 |
| Example 2-24 | 96 | 2 | 65 | 6 | 80 | 2 | 65 | 4 | 70 |
| Example 2-25 | 84 | 2 | 60 | 8 | 40 | 2 | 60 | 6.5 | 26 |
| Example 2-26 | 86 | 2 | 60 | 7 | 40 | 2 | 60 | 6 | 30 |
| Example 2-27 | 85 | 2 | 60 | 7 | 49 | 2 | 60 | 5 | 28 |
| Example 2-28 | 90 | 2 | 60 | 6 | 80 | 2 | 60 | 4 | 40 |
| Example 2-29 | 92 | 2 | 60 | 6 | 80 | 2 | 60 | 4 | 51 |
| Example 2-30 | 76 | 0 | — | 6 | 83 | 0 | — | 6 | 77 |
| Example 2-31 | 56 | 0 | — | 10 | 44 | 0 | — | 8 | 30 |
| Example 2-32 | 66 | 0 | — | 9 | 53 | 0 | — | 7 | 40 |
| Example 2-33 | 96 | 2 | 60 | 6 | 80 | 2 | 60 | 4 | 70 |
| Example 2-34 | 96 | 2 | 60 | 6 | 80 | 2 | 60 | 4 | 70 |
| Example 2-35 | 96 | 2 | 60 | 6 | 80 | 2 | 60 | 4 | 70 |
| Example 2-36 | 96 | 2 | 60 | 6 | 80 | 2 | 60 | 4 | 70 |
| Example 2-37 | 98 | 2 | 60 | 8 | 85 | 2 | 60 | 6 | 80 |
| Example 2-38 | 98 | 2 | 60 | 8 | 85 | 2 | 60 | 6 | 80 |
| Example 2-39 | 98 | 2 | 60 | 8 | 85 | 2 | 60 | 6 | 80 |
| Example 2-40 | 98 | 2 | 40 | 8 | 85 | 2 | 40 | 6 | 80 |
| Example 2-41 | 98 | 2 | 45 | 8 | 85 | 2 | 45 | 6 | 80 |
| Example 2-42 | 98 | 2 | 65 | 8 | 85 | 2 | 65 | 6 | 80 |
| Example 2-43 | 84 | 2 | 60 | 8 | 40 | 2 | 60 | 6.5 | 26 |
| Example 2-44 | 86 | 2 | 60 | 8 | 48 | 2 | 60 | 6 | 30 |
| Example 2-45 | 90 | 2 | 60 | 8 | 55 | 2 | 60 | 6 | 40 |
| Example 2-46 | 94 | 2 | 60 | 8 | 70 | 2 | 60 | 6 | 60 |
| Example 2-47 | 96 | 2 | 60 | 8 | 78 | 2 | 60 | 6 | 70 |
| Example 2-48 | 78 | 0 | — | 10 | 86 | 0 | — | 6 | 83 |

TABLE 2-continued

| | | | | | | | | | |
|---|---|---|---|---|---|---|---|---|---|
| Example 2-49 | 58 | 0 | — | 10 | 44 | 0 | — | 6 | 30 |
| Example 2-50 | 68 | 0 | — | 10 | 58 | 0 | — | 6 | 48 |
| Example 2-51 | 98 | 2 | 60 | 8 | 85 | 2 | 60 | 6 | 80 |
| Example 2-52 | 98 | 2 | 60 | 8 | 85 | 2 | 60 | 6 | 80 |
| Example 2-53 | 98 | 2 | 60 | 8 | 85 | 2 | 60 | 6 | 80 |
| Example 2-54 | 98 | 2 | 60 | 8 | 85 | 2 | 60 | 6 | 80 |
| Example 2-55 | 98 | 2 | 60 | 8 | 85 | 2 | 60 | 6 | 80 |
| Example 2-56 | 98 | 2 | 60 | 8 | 85 | 2 | 60 | 6 | 80 |
| Example 2-57 | 98 | 2 | 60 | 8 | 85 | 2 | 60 | 6 | 80 |
| Example 2-58 | 98 | 2 | 40 | 8 | 85 | 2 | 40 | 6 | 80 |
| Example 2-59 | 98 | 2 | 45 | 8 | 85 | 2 | 45 | 6 | 80 |
| Example 2-60 | 98 | 2 | 65 | 8 | 85 | 2 | 65 | 6 | 80 |
| Example 2-61 | 84 | 2 | 60 | 8 | 40 | 2 | 60 | 6.5 | 26 |
| Example 2-62 | 86 | 2 | 60 | 8 | 48 | 2 | 60 | 6 | 30 |
| Example 2-63 | 90 | 2 | 60 | 8 | 55 | 2 | 60 | 6 | 40 |
| Example 2-64 | 94 | 2 | 60 | 8 | 70 | 2 | 60 | 6 | 60 |
| Example 2-65 | 96 | 2 | 60 | 8 | 78 | 2 | 60 | 6 | 70 |
| Example 2-66 | 80 | 0 | — | 10 | 86 | 0 | — | 6 | 83 |
| Example 2-67 | 60 | 0 | — | 10 | 44 | 0 | — | 6 | 30 |
| Example 2-68 | 70 | 0 | — | 10 | 58 | 0 | — | 6 | 48 |
| Example 2-69 | 98 | 2 | 60 | 8 | 85 | 2 | 60 | 6 | 80 |
| Example 2-70 | 98 | 2 | 60 | 8 | 85 | 2 | 60 | 6 | 80 |
| Example 2-71 | 98 | 2 | 60 | 8 | 85 | 2 | 60 | 6 | 80 |
| Example 2-72 | 98 | 2 | 60 | 8 | 85 | 2 | 60 | 6 | 80 |

As can be seen from Table 1 and Table 2, it was confirmed that in the cylindrical batteries of the various Examples, each of which used a separator composed of a substrate; a low-porosity layer having a porosity higher than that of the substrate; and a high-porosity layer having a porosity higher than that of the low-porosity layer, the capacity retention ratio was 80% or higher in all cases. Furthermore, it was found that the capacity retention ratio was markedly increased by adjusting the porosity of the high-porosity layer to 80% or higher. Such a tendency could be confirmed irrespective of the kind of the negative electrode active material.

On the other hand, in Comparative Example 1-1 to Comparative Example 1-3, the capacity retention ratio was 5%, and the cycle characteristics were noticeably deteriorated. In Comparative 1-1 that used a separator formed from a polyethylene microporous film having a thickness of 23 μm, the separator obtained by disassembling the battery after charging and discharging for 500 cycles, was compressed to a thickness of 15 μm. Thus, the pores had collapsed, and also by-products penetrated into the collapsed pores, thereby causing clogging. It is contemplated that in Comparative Example 1-1, the ion passage function of the separator was impaired, and a decrease of the cycle characteristics occurred.

In Comparative Example 1-2 that was configured to include a polyethylene microporous film having a thickness of 9 μm, with a gap being provided between the positive electrode and the microporous film and between the negative electrode and the microporous film, when the battery was disassembled after charging and discharging for 500 cycles, the electrodes had buckled. In Comparative Example 1-2, for example, the negative electrode buckled and thereby parts of the negative electrode came to face each other due to the buckling of the electrodes, and the buckled part of the negative electrode did not face the positive electrode in close proximity. Thus, the effective area of the negative electrode confronting the positive electrode was markedly decreased. Therefore, it is speculated that even if the non-aqueous liquid electrolyte existed between the positive electrode and the negative electrode, there were generated regions in which no battery reaction occurred between the positive electrode and the negative electrode, and the battery reaction was not effectively implemented.

In Comparative Example 1-3 in which the porosity of the high-porosity layer was adjusted to 50%, the porosity after initial charging was 25%; however, after 500 cycles, the high-porosity layer was clogged to a porosity of 0%. In Comparative Example 1-3, it is speculated that the porosity of the high-porosity layer at the time of production was low, and even with collapse to a small extent, the porosity was largely decreased.

<Example 3-1> to <Example 3-182> and <Comparative Example 3-1

In Example 3-1 to Example 3-182 and Comparative Example 3-1, the effect of the present technology were checked by changing the inorganic particles and the resin material constituting the surface layer of the separator.

Example 3-1

A separator having a low-porosity layer having a one-surface thickness of 1 μm (total thickness of both surfaces: 2 μm) and a porosity of 60%, and a high-porosity layer having a one-surface thickness of 6 μm (total thickness of both surfaces: 12 μm) and a porosity of 90%, was produced in a similar manner as in Example 1-1 on a polyethylene microporous film having a thickness of 9 μm, using alumina as the inorganic particles and polyvinylidene fluoride (PVdF) as the resin material. A cylindrical battery that used this separator and graphite as the negative electrode active material was produced.

Example 3-2

A cylindrical battery was produced in a similar manner as in Example 3-1, except that polyimide was used, instead of polyvinylidene fluoride, as the resin material used in the surface layer of the separator.

Example 3-3

A cylindrical battery was produced in a similar manner as in Example 3-1, except that aramid (all aromatic polyamide)

was used, instead of polyvinylidene fluoride, as the resin material used in the surface layer of the separator.

Example 3-4

A cylindrical battery was produced in a similar manner as in Example 3-1, except that polyacrylonitrile was used, instead of polyvinylidene fluoride, as the resin material used in the surface layer of the separator.

Example 3-5

A cylindrical battery was produced in a similar manner as in Example 3-1, except that polyvinyl alcohol was used, instead of polyvinylidene fluoride, as the resin material used in the surface layer of the separator.

Example 3-6

A cylindrical battery was produced in a similar manner as in Example 3-1, except that a polyether was used, instead of polyvinylidene fluoride, as the resin material used in the surface layer of the separator.

Example 3-7

A cylindrical battery was produced in a similar manner as in Example 3-1, except that an acrylic acid resin was used, instead of polyvinylidene fluoride, as the resin material used in the surface layer of the separator.

<Example 3-8> to <Example 3-14>

Cylindrical batteries were produced in a similar manner as in Example 3-1 to Example 3-7, respectively, except that boehmite was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of boehmite was adjusted to be proportional to the specific gravity.

<Example 3-15> to <Example 3-21>

Cylindrical batteries were produced in a similar manner as in Example 3-1 to Example 3-7, respectively, except that aluminum nitride (AlN, specific gravity: 3.26 g/cm$^3$) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of aluminum nitride was adjusted to be proportional to the specific gravity.

<Example 3-22> to <Example 3-28>

Cylindrical batteries were produced in a similar manner as in Example 3-1 to Example 3-7, respectively, except that boron nitride (BN, specific gravity: 2.18 g/cm$^3$) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of boron nitride was adjusted to be proportional to the specific gravity.

<Example 3-29> to <Example 3-35>

Cylindrical batteries were produced in a similar manner as in Example 3-1 to Example 3-7, respectively, except that silicon carbide (SiC, specific gravity: 5.43 g/cm$^3$) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of silicon carbide was adjusted to be proportional to the specific gravity.

<Example 3-36> to <Example 3-42>

Cylindrical batteries were produced in a similar manner as in Example 3-1 to Example 3-7, respectively, except that talc (Mg$_3$Si$_4$O$_{10}$(OH)$_2$, specific gravity: 2.7 g/cm$^3$) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of talc was adjusted to be proportional to the specific gravity.

<Example 3-43> to <Example 3-49>

Cylindrical batteries were produced in a similar manner as in Example 3-1 to Example 3-7, respectively, except that Li$_2$O$_4$ (specific gravity: 3.01 g/cm$^3$) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of Li$_2$O$_4$ was adjusted to be proportional to the specific gravity.

<Example 3-50> to <Example 3-56>

Cylindrical batteries were produced in a similar manner as in Example 3-1 to Example 3-7, respectively, except that Li$_3$PO$_4$ (specific gravity: 2.54 g/cm$^3$) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of Li$_3$PO$_4$ was adjusted to be proportional to the specific gravity.

<Example 3-57> to <Example 3-63>

Cylindrical batteries were produced in a similar manner as in Example 3-1 to Example 3-7, respectively, except that LiF (specific gravity: 2.64 g/cm$^3$) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of LiF was adjusted to be proportional to the specific gravity.

<Example 3-64> to <Example 3-70>

Cylindrical batteries were produced in a similar manner as in Example 3-1 to Example 3-7, respectively, except that diamond (specific gravity: 3.52 g/cm³) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of diamond was adjusted to be proportional to the specific gravity.

<Example 3-71> to <Example 3-77>

Cylindrical batteries were produced in a similar manner as in Example 3-1 to Example 3-7, respectively, except that zirconium oxide (ZrO₂, specific gravity: 6.00 g/cm³) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of zirconium oxide was adjusted to be proportional to the specific gravity.

<Example 3-78> to <Example 3-84>

Cylindrical batteries were produced in a similar manner as in Example 3-1 to Example 3-7, respectively, except that yttrium oxide (Y₂O₃, specific gravity: 5.01 g/cm³) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of yttrium oxide was adjusted to be proportional to the specific gravity.

<Example 3-85> to <Example 3-91>

Cylindrical batteries were produced in a similar manner as in Example 3-1 to Example 3-7, respectively, except that barium titanate (BaTiO₃, specific gravity: 6.02 g/cm³) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of barium titanate was adjusted to be proportional to the specific gravity.

<Example 3-92> to <Example 3-98>

Cylindrical batteries were produced in a similar manner as in Example 3-1 to Example 3-7, respectively, except that strontium titanate (SrTiO₃, specific gravity: 3.99 g/cm³) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of strontium titanate was adjusted to be proportional to the specific gravity.

<Example 3-99> to <Example 3-105>

Cylindrical batteries were produced in a similar manner as in Example 3-1 to Example 3-7, respectively, except that silicon oxide (specific gravity: 2.20 g/cm³) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of silicon oxide was adjusted to be proportional to the specific gravity.

<Example 3-106> to <Example 3-112>

Cylindrical batteries were produced in a similar manner as in Example 3-1 to Example 3-7, respectively, except that zeolite (specific gravity: 2.20 g/cm³) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of zeolite was adjusted to be proportional to the specific gravity.

<Example 3-113> to <Example 3-119>

Cylindrical batteries were produced in a similar manner as in Example 3-1 to Example 3-7, respectively, except that barium sulfate (specific gravity: 4.50 g/cm³) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of barium sulfate was adjusted to be proportional to the specific gravity.

<Example 3-120> to <Example 3-126>

Cylindrical batteries were produced in a similar manner as in Example 3-1 to Example 3-7, respectively, except that titanium oxide (TiO₂, specific gravity: 4.20 g/cm³) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of titanium oxide was adjusted to be proportional to the specific gravity.

<Example 3-127> to <Example 3-133>

Cylindrical batteries were produced in a similar manner as in Example 3-1 to Example 3-7, respectively, except that magnesium oxide (specific gravity: 3.60 g/cm³) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of magnesium oxide was adjusted to be proportional to the specific gravity.

<Example 3-134> to <Example 3-140>

Cylindrical batteries were produced in a similar manner as in Example 3-1 to Example 3-7, respectively, except that graphite (specific gravity: 2.25 g/cm³) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of graphite was adjusted to be proportional to the specific gravity.

<Example 3-141> to <Example 3-147>

Cylindrical batteries were produced in a similar manner as in Example 3-1 to Example 3-7, respectively, except that carbon nanotube (specific gravity: 2.00 g/cm$^3$) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of carbon nanotube was adjusted to be proportional to the specific gravity.

<Example 3-148> to <Example 3-154>

Cylindrical batteries were produced in a similar manner as in Example 3-1 to Example 3-7, respectively, except that aluminum hydroxide (Al(OH)$_3$, specific gravity: 2.42 g/cm$^3$) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of aluminum hydroxide was adjusted to be proportional to the specific gravity.

<Example 3-155> to <Example 3-161>

Cylindrical batteries were produced in a similar manner as in Example 3-1 to Example 3-7, respectively, except that boron carbide (B$_4$C, specific gravity: 2.51 g/cm$^3$) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of boron carbide was adjusted to be proportional to the specific gravity.

<Example 3-162> to <Example 3-168>

Cylindrical batteries were produced in a similar manner as in Example 3-1 to Example 3-7, respectively, except that silicon nitride (Si$_3$N$_4$, specific gravity: 3.44 g/cm$^3$) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of silicon nitride was adjusted to be proportional to the specific gravity.

<Example 3-169> to <Example 3-175>

Cylindrical batteries were produced in a similar manner as in Example 3-1 to Example 3-7, respectively, except that titanium nitride (TiN, specific gravity: 5.43 g/cm$^3$) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of titanium nitride was adjusted to be proportional to the specific gravity.

<Example 3-176> to <Example 3-182>

Cylindrical batteries were produced in a similar manner as in Example 3-1 to Example 3-7, respectively, except that zinc oxide (specific gravity: 5.61 g/cm$^3$) was used instead of alumina, as the inorganic particles used in the surface layer of the separator. At this time, the volume ratio between the inorganic particles and the resin material (nearly 0.8:0.2) was not changed, the feed amount of the resin material was kept constant, and the feed amount of zinc oxide was adjusted to be proportional to the specific gravity.

Comparative Example 3-1

A cylindrical battery was produced in a similar manner as in Example 3-1, except that a polyethylene microporous film having a thickness of 23 μm was used as the separator similarly to Comparative Example 1-1.

[Evaluation of Batteries]
(a) Cycle Test

A cycle test was carried out in a similar manner as in Example 1-1 for the cylindrical batteries of the various Examples and Comparative Example 3-1 thus produced.

The evaluation results are presented in the following Table 3.

TABLE 3

| | Negative electrode active material | Substrate | | Surface layer | | | 500-cycle capacity retention ratio [%] |
|---|---|---|---|---|---|---|---|
| | | Material | Thickness [μm] | Inorganic particles | Resin material | Porosity | |
| Example 3-1 | Graphite | PE | 9 | Alumina | Polyvinylidene fluoride | Low-porosity | 96 |
| Example 3-2 | | | | | Polyimide | layer 60% | 94 |
| Example 3-3 | | | | | Aramid (polyamide) | High-porosity | 96 |
| Example 3-4 | | | | | Polyacrylonitrile | layer 90% | 94 |
| Example 3-5 | | | | | Polyvinyl alcohol | | 94 |
| Example 3-6 | | | | | Polyether | | 94 |
| Example 3-7 | | | | | Acrylic acid resin | | 94 |
| Example 3-8 | | | | Boehmite | Polyvinylidene fluoride | | 98 |
| Example 3-9 | | | | | Polyimide | | 96 |
| Example 3-10 | | | | | Aramid (polyamide) | | 98 |
| Example 3-11 | | | | | Polyacrylonitrile | | 96 |
| Example 3-12 | | | | | Polyvinyl alcohol | | 96 |
| Example 3-13 | | | | | Polyether | | 96 |
| Example 3-14 | | | | | Acrylic acid resin | | 96 |

TABLE 3-continued

|  | Negative electrode active material | Substrate Material | Thickness [μm] | Surface layer Inorganic particles | Resin material | Porosity | 500-cycle capacity retention ratio [%] |
|---|---|---|---|---|---|---|---|
| Example 3-15 |  |  |  | Aluminum nitride | Polyvinylidene fluoride |  | 91 |
| Example 3-16 |  |  |  |  | Polyimide |  | 89 |
| Example 3-17 |  |  |  |  | Aramid (polyamide) |  | 91 |
| Example 3-18 |  |  |  |  | Polyacrylonitrile |  | 89 |
| Example 3-19 |  |  |  |  | Polyvinyl alcohol |  | 89 |
| Example 3-20 |  |  |  |  | Polyether |  | 89 |
| Example 3-21 |  |  |  |  | Acrylic acid resin |  | 89 |
| Example 3-22 |  |  |  | Boron nitride | Polyvinylidene fluoride |  | 95 |
| Example 3-23 |  |  |  |  | Polyimide |  | 93 |
| Example 3-24 |  |  |  |  | Aramid (polyamide) |  | 95 |
| Example 3-25 |  |  |  |  | Polyacrylonitrile |  | 93 |
| Example 3-26 |  |  |  |  | Polyvinyl alcohol |  | 93 |
| Example 3-27 |  |  |  |  | Polyether |  | 93 |
| Example 3-28 |  |  |  |  | Acrylic acid resin |  | 93 |
| Example 3-29 |  |  |  | Silicon carbide | Polyvinylidene fluoride |  | 95 |
| Example 3-30 |  |  |  |  | Polyimide |  | 93 |
| Example 3-31 |  |  |  |  | Aramid (polyamide) |  | 95 |
| Example 3-32 |  |  |  |  | Polyacrylonitrile |  | 93 |
| Example 3-33 |  |  |  |  | Polyvinyl alcohol |  | 93 |
| Example 3-34 |  |  |  |  | Polyether |  | 93 |
| Example 3-35 |  |  |  |  | Acrylic acid resin |  | 93 |
| Example 3-36 |  |  |  | Talc | Polyvinylidene fluoride |  | 95 |
| Example 3-37 |  |  |  |  | Polyimide |  | 93 |
| Example 3-38 |  |  |  |  | Aramid (polyamide) |  | 95 |
| Example 3-39 |  |  |  |  | Polyacrylonitrile |  | 93 |
| Example 3-40 |  |  |  |  | Polyvinyl alcohol |  | 93 |
| Example 3-41 |  |  |  |  | Polyether |  | 93 |
| Example 3-42 |  |  |  |  | Acrylic acid resin |  | 93 |
| Example 3-43 |  |  |  | $Li_2O_4$ | Polyvinylidene fluoride |  | 91 |
| Example 3-44 |  |  |  |  | Polyimide |  | 89 |
| Example 3-45 |  |  |  |  | Aramid (polyamide) |  | 91 |
| Example 3-46 |  |  |  |  | Polyacrylonitrile |  | 89 |
| Example 3-47 |  |  |  |  | Polyvinyl alcohol |  | 89 |
| Example 3-48 |  |  |  |  | Polyether |  | 89 |
| Example 3-49 |  |  |  |  | Acrylic acid resin |  | 89 |
| Example 3-50 | Graphite | PE | 9 | $Li_3PO_4$ | Polyvinylidene fluoride | Low-porosity layer 60% | 91 |
| Example 3-51 |  |  |  |  | Polyimide |  | 89 |
| Example 3-52 |  |  |  |  | Aramid (polyamide) | High-porosity layer 90% | 91 |
| Example 3-53 |  |  |  |  | Polyacrylonitrile |  | 89 |
| Example 3-54 |  |  |  |  | Polyvinyl alcohol |  | 89 |
| Example 3-55 |  |  |  |  | Polyether |  | 89 |
| Example 3-56 |  |  |  |  | Acrylic acid resin |  | 89 |
| Example 3-57 |  |  |  | LiF | Polyvinylidene fluoride |  | 91 |
| Example 3-58 |  |  |  |  | Polyimide |  | 89 |
| Example 3-59 |  |  |  |  | Aramid (polyamide) |  | 91 |
| Example 3-60 |  |  |  |  | Polyacrylonitrile |  | 89 |
| Example 3-61 |  |  |  |  | Polyvinyl alcohol |  | 89 |
| Example 3-62 |  |  |  |  | Polyether |  | 89 |
| Example 3-63 |  |  |  |  | Acrylic acid resin |  | 89 |
| Example 3-64 |  |  |  | Diamond | Polyvinylidene fluoride |  | 91 |
| Example 3-65 |  |  |  |  | Polyimide |  | 89 |
| Example 3-66 |  |  |  |  | Aramid (polyamide) |  | 91 |
| Example 3-67 |  |  |  |  | Polyacrylonitrile |  | 89 |
| Example 3-68 |  |  |  |  | Polyvinyl alcohol |  | 89 |
| Example 3-69 |  |  |  |  | Polyether |  | 89 |
| Example 3-70 |  |  |  |  | Acrylic acid resin |  | 89 |
| Example 3-71 |  |  |  | Zirconium oxide | Polyvinylidene fluoride |  | 97 |
| Example 3-72 |  |  |  |  | Polyimide |  | 95 |
| Example 3-73 |  |  |  |  | Aramid (polyamide) |  | 97 |
| Example 3-74 |  |  |  |  | Polyacrylonitrile |  | 95 |
| Example 3-75 |  |  |  |  | Polyvinyl alcohol |  | 95 |
| Example 3-76 |  |  |  |  | Polyether |  | 95 |
| Example 3-77 |  |  |  |  | Acrylic acid resin |  | 95 |
| Example 3-78 |  |  |  | Yttrium oxide | Polyvinylidene fluoride |  | 93 |
| Example 3-79 |  |  |  |  | Polyimide |  | 91 |
| Example 3-80 |  |  |  |  | Aramid (polyamide) |  | 93 |
| Example 3-81 |  |  |  |  | Polyacrylonitrile |  | 91 |
| Example 3-82 |  |  |  |  | Polyvinyl alcohol |  | 91 |
| Example 3-83 |  |  |  |  | Polyether |  | 91 |
| Example 3-84 |  |  |  |  | Acrylic acid resin |  | 91 |
| Example 3-85 |  |  |  | Barium titanate | Polyvinylidene fluoride |  | 96 |
| Example 3-86 |  |  |  |  | Polyimide |  | 94 |
| Example 3-87 |  |  |  |  | Aramid (polyamide) |  | 96 |

TABLE 3-continued

| | Negative electrode active material | Substrate Material | Thickness [μm] | Inorganic particles | Resin material | Porosity | 500-cycle capacity retention ratio [%] |
|---|---|---|---|---|---|---|---|
| Example 3-88 | | | | | Polyacrylonitrile | | 94 |
| Example 3-89 | | | | | Polyvinyl alcohol | | 94 |
| Example 3-90 | | | | | Polyether | | 94 |
| Example 3-91 | | | | | Acrylic acid resin | | 94 |
| Example 3-92 | | | | Strontium titanate | Polyvinylidene fluoride | | 93 |
| Example 3-93 | | | | | Polyimide | | 91 |
| Example 3-94 | | | | | Aramid (polyamide) | | 93 |
| Example 3-95 | | | | | Polyacrylonitrile | | 91 |
| Example 3-96 | | | | | Polyvinyl alcohol | | 91 |
| Example 3-97 | | | | | Polyether | | 91 |
| Example 3-98 | | | | | Acrylic acid resin | | 91 |
| Example 3-99 | Graphite | PE | 9 | Silicon oxide | Polyvinylidene fluoride | Low-porosity layer 60% | 96 |
| Example 3-100 | | | | | Polyimide | | 94 |
| Example 3-101 | | | | | Aramid (polyamide) | High-porosity layer 90% | 96 |
| Example 3-102 | | | | | Polyacrylonitrile | | 94 |
| Example 3-103 | | | | | Polyvinyl alcohol | | 94 |
| Example 3-104 | | | | | Polyether | | 94 |
| Example 3-105 | | | | | Acrylic acid resin | | 94 |
| Example 3-106 | | | | Zeolite | Polyvinylidene fluoride | | 93 |
| Example 3-107 | | | | | Polyimide | | 91 |
| Example 3-108 | | | | | Aramid (polyamide) | | 93 |
| Example 3-109 | | | | | Polyacrylonitrile | | 91 |
| Example 3-110 | | | | | Polyvinyl alcohol | | 91 |
| Example 3-111 | | | | | Polyether | | 91 |
| Example 3-112 | | | | | Acrylic acid resin | | 91 |
| Example 3-113 | | | | Barium sulfate | Polyvinylidene fluoride | | 93 |
| Example 3-114 | | | | | Polyimide | | 91 |
| Example 3-115 | | | | | Aramid (polyamide) | | 93 |
| Example 3-116 | | | | | Polyacrylonitrile | | 91 |
| Example 3-117 | | | | | Polyvinyl alcohol | | 91 |
| Example 3-118 | | | | | Polyether | | 91 |
| Example 3-119 | | | | | Acrylic acid resin | | 91 |
| Example 3-120 | | | | Titanium oxide | Polyvinylidene fluoride | | 93 |
| Example 3-121 | | | | | Polyimide | | 91 |
| Example 3-122 | | | | | Aramid (polyamide) | | 93 |
| Example 3-123 | | | | | Polyacrylonitrile | | 91 |
| Example 3-124 | | | | | Polyvinyl alcohol | | 91 |
| Example 3-125 | | | | | Polyether | | 91 |
| Example 3-126 | | | | | Acrylic acid resin | | 91 |
| Example 3-127 | | | | Magnesium oxide | Polyvinylidene fluoride | | 93 |
| Example 3-128 | | | | | Polyimide | | 91 |
| Example 3-129 | | | | | Aramid (polyamide) | | 93 |
| Example 3-130 | | | | | Polyacrylonitrile | | 91 |
| Example 3-131 | | | | | Polyvinyl alcohol | | 91 |
| Example 3-132 | | | | | Polyether | | 91 |
| Example 3-133 | | | | | Acrylic acid resin | | 91 |
| Example 3-134 | | | | Graphite | Polyvinylidene fluoride | | 91 |
| Example 3-135 | | | | | Polyimide | | 89 |
| Example 3-136 | | | | | Aramid (polyamide) | | 91 |
| Example 3-137 | | | | | Polyacrylonitrile | | 89 |
| Example 3-138 | | | | | Polyvinyl alcohol | | 89 |
| Example 3-139 | | | | | Polyether | | 89 |
| Example 3-140 | | | | | Acrylic acid resin | | 89 |
| Example 3-141 | | | | Carbon nanotube | Polyvinylidene fluoride | | 91 |
| Example 3-142 | | | | | Polyimide | | 89 |
| Example 3-143 | | | | | Aramid (polyamide) | | 91 |
| Example 3-144 | | | | | Polyacrylonitrile | | 89 |
| Example 3-145 | | | | | Polyvinyl alcohol | | 89 |
| Example 3-146 | | | | | Polyether | | 89 |
| Example 3-147 | | | | | Acrylic acid resin | | 89 |
| Example 3-148 | Graphite | PE | 9 | Aluminum hydroxide | Polyvinylidene fluoride | Low-porosity layer 60% | 91 |
| Example 3-149 | | | | | Polyimide | | 89 |
| Example 3-150 | | | | | Aramid (polyamide) | High-porosity layer 90% | 91 |
| Example 3-151 | | | | | Polyacrylonitrile | | 89 |
| Example 3-152 | | | | | Polyvinyl alcohol | | 89 |
| Example 3-153 | | | | | Polyether | | 89 |
| Example 3-154 | | | | | Acrylic acid resin | | 89 |
| Example 3-155 | | | | Boron carbide | Polyvinylidene fluoride | | 91 |
| Example 3-156 | | | | | Polyimide | | 89 |
| Example 3-157 | | | | | Aramid (polyamide) | | 91 |
| Example 3-158 | | | | | Polyacrylonitrile | | 89 |
| Example 3-159 | | | | | Polyvinyl alcohol | | 89 |
| Example 3-160 | | | | | Polyether | | 89 |

TABLE 3-continued

| | Negative electrode active material | Substrate Material | Thickness [μm] | Surface layer Inorganic particles | Resin material | Porosity | 500-cycle capacity retention ratio [%] |
|---|---|---|---|---|---|---|---|
| Example 3-161 | | | | | Acrylic acid resin | | 89 |
| Example 3-162 | | | | Silicon nitride | Polyvinylidene fluoride | | 91 |
| Example 3-163 | | | | | Polyimide | | 89 |
| Example 3-164 | | | | | Aramid (polyamide) | | 91 |
| Example 3-165 | | | | | Polyacrylonitrile | | 89 |
| Example 3-166 | | | | | Polyvinyl alcohol | | 89 |
| Example 3-167 | | | | | Polyether | | 89 |
| Example 3-168 | | | | | Acrylic acid resin | | 89 |
| Example 3-169 | | | | Titanium nitride | Polyvinylidene fluoride | | 91 |
| Example 3-170 | | | | | Polyimide | | 89 |
| Example 3-171 | | | | | Aramid (polyamide) | | 91 |
| Example 3-172 | | | | | Polyacrylonitrile | | 89 |
| Example 3-173 | | | | | Polyvinyl alcohol | | 89 |
| Example 3-174 | | | | | Polyether | | 89 |
| Example 3-175 | | | | | Acrylic acid resin | | 89 |
| Example 3-176 | | | | Zinc oxide | Polyvinylidene fluoride | | 91 |
| Example 3-177 | | | | | Polyimide | | 89 |
| Example 3-178 | | | | | Aramid (polyamide) | | 91 |
| Example 3-179 | | | | | Polyacrylonitrile | | 89 |
| Example 3-180 | | | | | Polyvinyl alcohol | | 89 |
| Example 3-181 | | | | | Polyether | | 89 |
| Example 3-182 | | | | | Acrylic acid resin | | 89 |
| Comparative Example 3-1 | Graphite | PE | 23 | — | — | — | 52 |

As can be seen from Table 3, in the cylindrical batteries of the various Examples, each of which used a separator composed of a substrate; a low-porosity layer having a porosity higher than that of the substrate; and a high-porosity layer having a porosity higher than that of the low-porosity layer, even if the inorganic particles and the resin material were replaced, the capacity retention ratio after 500 cycles was 80% or higher in all cases, and high cycle characteristics were obtained. On the other hand, in separators which did not have the surface layer composed of a low-porosity layer and a high-porosity layer of the present technology, the capacity retention ratios in the cycle test were low.

<Example 4-1> to <Example 4-182> and <Comparative Example 4-1>

Cylindrical batteries of Example 4-1 to Example 4-182 and Comparative Example 4-1 were produced in a similar manner as in Example 3-1 to Example 3-182 and Comparative Example 3-1, respectively, except that silicon similar to that used in Example 1-1 was used as the negative electrode active material instead of graphite. Moreover, the negative electrode mix slurry used to form the negative electrode active material layer was prepared to have a composition similar to that of Example 1-1.

[Evaluation of Batteries]

(a) Cycle Test

For the cylindrical batteries of the various Examples and Comparative Example 4-1 thus produced, a cycle test was carried out in a similar manner as in Example 1-1.

The evaluation results are presented in the following Table 4.

TABLE 4

| | Negative electrode active material | Substrate Material | Thickness [μm] | Surface layer Inorganic particles | Resin material | Porosity | 500-cycle capacity retention ratio [%] |
|---|---|---|---|---|---|---|---|
| Example 4-1 | Silicon | PE | 9 | Alumina | Polyvinylidene fluoride | Low-porosity layer 60% | 88 |
| Example 4-2 | | | | | Polyimide | | 86 |
| Example 4-3 | | | | | Aramid (polyamide) | High-porosity layer 90% | 88 |
| Example 4-4 | | | | | Polyacrylonitrile | | 86 |
| Example 4-5 | | | | | Polyvinyl alcohol | | 86 |
| Example 4-6 | | | | | Polyether | | 86 |
| Example 4-7 | | | | | Acrylic acid resin | | 86 |
| Example 4-8 | | | | Boehmite | Polyvinylidene fluoride | | 90 |
| Example 4-9 | | | | | Polyimide | | 88 |
| Example 4-10 | | | | | Aramid (polyamide) | | 90 |
| Example 4-11 | | | | | Polyacrylonitrile | | 88 |
| Example 4-12 | | | | | Polyvinyl alcohol | | 88 |
| Example 4-13 | | | | | Polyether | | 88 |

TABLE 4-continued

| | Negative electrode active material | Substrate Material | Thickness [μm] | Inorganic particles | Surface layer Resin material | Porosity | 500-cycle capacity retention ratio [%] |
|---|---|---|---|---|---|---|---|
| Example 4-14 | | | | | Acrylic acid resin | | 88 |
| Example 4-15 | | | | Aluminum | Polyvinylidene fluoride | | 83 |
| Example 4-16 | | | | nitride | Polyimide | | 81 |
| Example 4-17 | | | | | Aramid (polyamide) | | 83 |
| Example 4-18 | | | | | Polyacrylonitrile | | 81 |
| Example 4-19 | | | | | Polyvinyl alcohol | | 81 |
| Example 4-20 | | | | | Polyether | | 81 |
| Example 4-21 | | | | | Acrylic acid resin | | 81 |
| Example 4-22 | | | | Boron | Polyvinylidene fluoride | | 87 |
| Example 4-23 | | | | nitride | Polyimide | | 85 |
| Example 4-24 | | | | | Aramid (polyamide) | | 87 |
| Example 4-25 | | | | | Polyacrylonitrile | | 85 |
| Example 4-26 | | | | | Polyvinyl alcohol | | 85 |
| Example 4-27 | | | | | Polyether | | 85 |
| Example 4-28 | | | | | Acrylic acid resin | | 85 |
| Example 4-29 | | | | Silicon | Polyvinylidene fluoride | | 87 |
| Example 4-30 | | | | carbide | Polyimide | | 85 |
| Example 4-31 | | | | | Aramid (polyamide) | | 87 |
| Example 4-32 | | | | | Polyacrylonitrile | | 85 |
| Example 4-33 | | | | | Polyvinyl alcohol | | 85 |
| Example 4-34 | | | | | Polyether | | 85 |
| Example 4-35 | | | | | Acrylic acid resin | | 85 |
| Example 4-36 | | | | Talc | Polyvinylidene fluoride | | 87 |
| Example 4-37 | | | | | Polyimide | | 85 |
| Example 4-38 | | | | | Aramid (polyamide) | | 87 |
| Example 4-39 | | | | | Polyacrylonitrile | | 85 |
| Example 4-40 | | | | | Polyvinyl alcohol | | 85 |
| Example 4-41 | | | | | Polyether | | 85 |
| Example 4-42 | | | | | Acrylic acid resin | | 85 |
| Example 4-43 | | | | $Li_2O_4$ | Polyvinylidene fluoride | | 83 |
| Example 4-44 | | | | | Polyimide | | 81 |
| Example 4-45 | | | | | Aramid (polyamide) | | 83 |
| Example 4-46 | | | | | Polyacrylonitrile | | 81 |
| Example 4-47 | | | | | Polyvinyl alcohol | | 81 |
| Example 4-48 | | | | | Polyether | | 81 |
| Example 4-49 | | | | | Acrylic acid resin | | 81 |
| Example 4-50 | Silicon | PE | 9 | $Li_3PO_4$ | Polyvinylidene fluoride | Low-porosity layer 60% | 83 |
| Example 4-51 | | | | | Polyimide | | 81 |
| Example 4-52 | | | | | Aramid (polyamide) | High-porosity layer 90% | 83 |
| Example 4-53 | | | | | Polyacrylonitrile | | 81 |
| Example 4-54 | | | | | Polyvinyl alcohol | | 81 |
| Example 4-55 | | | | | Polyether | | 81 |
| Example 4-56 | | | | | Acrylic acid resin | | 81 |
| Example 4-57 | | | | LiF | Polyvinylidene fluoride | | 83 |
| Example 4-58 | | | | | Polyimide | | 81 |
| Example 4-59 | | | | | Aramid (polyamide) | | 83 |
| Example 4-60 | | | | | Polyacrylonitrile | | 81 |
| Example 4-61 | | | | | Polyvinyl alcohol | | 81 |
| Example 4-62 | | | | | Polyether | | 81 |
| Example 4-63 | | | | | Acrylic acid resin | | 81 |
| Example 4-64 | | | | Diamond | Polyvinylidene fluoride | | 83 |
| Example 4-65 | | | | | Polyimide | | 81 |
| Example 4-66 | | | | | Aramid (polyamide) | | 83 |
| Example 4-67 | | | | | Polyacrylonitrile | | 81 |
| Example 4-68 | | | | | Polyvinyl alcohol | | 81 |
| Example 4-69 | | | | | Polyether | | 81 |
| Example 4-70 | | | | | Acrylic acid resin | | 81 |
| Example 4-71 | | | | Zirconium | Polyvinylidene fluoride | | 89 |
| Example 4-72 | | | | oxide | Polyimide | | 87 |
| Example 4-73 | | | | | Aramid (polyamide) | | 89 |
| Example 4-74 | | | | | Polyacrylonitrile | | 87 |
| Example 4-75 | | | | | Polyvinyl alcohol | | 87 |
| Example 4-76 | | | | | Polyether | | 87 |
| Example 4-77 | | | | | Acrylic acid resin | | 87 |
| Example 4-78 | | | | Yttrium | Polyvinylidene fluoride | | 85 |
| Example 4-79 | | | | oxide | Polyimide | | 83 |
| Example 4-80 | | | | | Aramid (polyamide) | | 85 |
| Example 4-81 | | | | | Polyacrylonitrile | | 83 |
| Example 4-82 | | | | | Polyvinyl alcohol | | 83 |
| Example 4-83 | | | | | Polyether | | 83 |
| Example 4-84 | | | | | Acrylic acid resin | | 83 |
| Example 4-85 | | | | Barium | Polyvinylidene fluoride | | 88 |
| Example 4-86 | | | | titanate | Polyimide | | 86 |

TABLE 4-continued

| | Negative electrode active material | Substrate Material | Thickness [μm] | Surface layer Inorganic particles | Resin material | Porosity | 500-cycle capacity retention ratio [%] |
|---|---|---|---|---|---|---|---|
| Example 4-87 | | | | | Aramid (polyamide) | | 88 |
| Example 4-88 | | | | | Polyacrylonitrile | | 86 |
| Example 4-89 | | | | | Polyvinyl alcohol | | 86 |
| Example 4-90 | | | | | Polyether | | 86 |
| Example 4-91 | | | | | Acrylic acid resin | | 86 |
| Example 4-92 | | | | Strontium titanate | Polyvinylidene fluoride | | 85 |
| Example 4-93 | | | | | Polyimide | | 83 |
| Example 4-94 | | | | | Aramid (polyamide) | | 85 |
| Example 4-95 | | | | | Polyacrylonitrile | | 83 |
| Example 4-96 | | | | | Polyvinyl alcohol | | 83 |
| Example 4-97 | | | | | Polyether | | 83 |
| Example 4-98 | | | | | Acrylic acid resin | | 83 |
| Example 4-99 | Silicon | PE | 9 | Silicon oxide | Polyvinylidene fluoride | Low-porosity layer 60% | 88 |
| Example 4-100 | | | | | Polyimide | | 86 |
| Example 4-101 | | | | | Aramid (polyamide) | High-porosity layer 90% | 88 |
| Example 4-102 | | | | | Polyacrylonitrile | | 86 |
| Example 4-103 | | | | | Polyvinyl alcohol | | 86 |
| Example 4-104 | | | | | Polyether | | 86 |
| Example 4-105 | | | | | Acrylic acid resin | | 86 |
| Example 4-106 | | | | Zeolite | Polyvinylidene fluoride | | 85 |
| Example 4-107 | | | | | Polyimide | | 83 |
| Example 4-108 | | | | | Aramid (polyamide) | | 85 |
| Example 4-109 | | | | | Polyacrylonitrile | | 83 |
| Example 4-110 | | | | | Polyvinyl alcohol | | 83 |
| Example 4-111 | | | | | Polyether | | 83 |
| Example 4-112 | | | | | Acrylic acid resin | | 83 |
| Example 4-113 | | | | Barium sulfate | Polyvinylidene fluoride | | 85 |
| Example 4-114 | | | | | Polyimide | | 83 |
| Example 4-115 | | | | | Aramid (polyamide) | | 85 |
| Example 4-116 | | | | | Polyacrylonitrile | | 83 |
| Example 4-117 | | | | | Polyvinyl alcohol | | 83 |
| Example 4-118 | | | | | Polyether | | 83 |
| Example 4-119 | | | | | Acrylic acid resin | | 83 |
| Example 4-120 | | | | Titanium oxide | Polyvinylidene fluoride | | 85 |
| Example 4-121 | | | | | Polyimide | | 83 |
| Example 4-122 | | | | | Aramid (polyamide) | | 85 |
| Example 4-123 | | | | | Polyacrylonitrile | | 83 |
| Example 4-124 | | | | | Polyvinyl alcohol | | 83 |
| Example 4-125 | | | | | Polyether | | 83 |
| Example 4-126 | | | | | Acrylic acid resin | | 83 |
| Example 4-127 | | | | Magnesium oxide | Polyvinylidene fluoride | | 85 |
| Example 4-128 | | | | | Polyimide | | 83 |
| Example 4-129 | | | | | Aramid (polyamide) | | 85 |
| Example 4-130 | | | | | Polyacrylonitrile | | 83 |
| Example 4-131 | | | | | Polyvinyl alcohol | | 83 |
| Example 4-132 | | | | | Polyether | | 83 |
| Example 4-133 | | | | | Acrylic acid resin | | 83 |
| Example 4-134 | | | | Graphite | Polyvinylidene fluoride | | 83 |
| Example 4-135 | | | | | Polyimide | | 81 |
| Example 4-136 | | | | | Aramid (polyamide) | | 83 |
| Example 4-137 | | | | | Polyacrylonitrile | | 81 |
| Example 4-138 | | | | | Polyvinyl alcohol | | 81 |
| Example 4-139 | | | | | Polyether | | 81 |
| Example 4-140 | | | | | Acrylic acid resin | | 81 |
| Example 4-141 | | | | Carbon nanotube | Polyvinylidene fluoride | | 83 |
| Example 4-142 | | | | | Polyimide | | 81 |
| Example 4-143 | | | | | Aramid (polyamide) | | 83 |
| Example 4-144 | | | | | Polyacrylonitrile | | 81 |
| Example 4-145 | | | | | Polyvinyl alcohol | | 81 |
| Example 4-146 | | | | | Polyether | | 81 |
| Example 4-147 | | | | | Acrylic acid resin | | 81 |
| Example 4-148 | Silicon | PE | 9 | Aluminum hydroxide | Polyvinylidene fluoride | Low-porosity layer 60% | 83 |
| Example 4-149 | | | | | Polyimide | | 81 |
| Example 4-150 | | | | | Aramid (polyamide) | High-porosity layer 90% | 83 |
| Example 4-151 | | | | | Polyacrylonitrile | | 81 |
| Example 4-152 | | | | | Polyvinyl alcohol | | 81 |
| Example 4-153 | | | | | Polyether | | 81 |
| Example 4-154 | | | | | Acrylic acid resin | | 81 |
| Example 4-155 | | | | Boron carbide | Polyvinylidene fluoride | | 83 |
| Example 4-156 | | | | | Polyimide | | 81 |
| Example 4-157 | | | | | Aramid (polyamide) | | 83 |
| Example 4-158 | | | | | Polyacrylonitrile | | 81 |
| Example 4-159 | | | | | Polyvinyl alcohol | | 81 |

TABLE 4-continued

| | Negative electrode active material | Substrate Material | Thickness [μm] | Surface layer Inorganic particles | Resin material | Porosity | 500-cycle capacity retention ratio [%] |
|---|---|---|---|---|---|---|---|
| Example 4-160 | | | | | Polyether | | 81 |
| Example 4-161 | | | | | Acrylic acid resin | | 81 |
| Example 4-162 | | | | Silicon nitride | Polyvinylidene fluoride | | 83 |
| Example 4-163 | | | | | Polyimide | | 81 |
| Example 4-164 | | | | | Aramid (polyamide) | | 83 |
| Example 4-165 | | | | | Polyacrylonitrile | | 81 |
| Example 4-166 | | | | | Polyvinyl alcohol | | 81 |
| Example 4-167 | | | | | Polyether | | 81 |
| Example 4-168 | | | | | Acrylic acid resin | | 81 |
| Example 4-169 | | | | Titanium nitride | Polyvinylidene fluoride | | 83 |
| Example 4-170 | | | | | Polyimide | | 81 |
| Example 4-171 | | | | | Aramid (polyamide) | | 83 |
| Example 4-172 | | | | | Polyacrylonitrile | | 81 |
| Example 4-173 | | | | | Polyvinyl alcohol | | 81 |
| Example 4-174 | | | | | Polyether | | 81 |
| Example 4-175 | | | | | Acrylic acid resin | | 81 |
| Example 4-176 | | | | Zinc oxide | Polyvinylidene fluoride | | 83 |
| Example 4-177 | | | | | Polyimide | | 81 |
| Example 4-178 | | | | | Aramid (polyamide) | | 83 |
| Example 4-179 | | | | | Polyacrylonitrile | | 81 |
| Example 4-180 | | | | | Polyvinyl alcohol | | 81 |
| Example 4-181 | | | | | Polyether | | 81 |
| Example 4-182 | | | | | Acrylic acid resin | | 81 |
| Comparative Example 4-1 | Silicon | PE | 23 | — | — | — | 42 |

As can be seen from Table 4, in the cylindrical batteries of the various Examples that used the separator of the present technology, even if silicon was used as the negative electrode active material, the capacity retention ratio after 500 cycles was 80% or higher in all cases, and high cycle characteristics were obtained. On the other hand, in Comparative Example 4-1 that used a carbon-tin composite material as the negative electrode active material and used a separator which did not have the surface layer composed of a low-porosity layer and a high-porosity layer of the present technology, the capacity retention ratio was markedly decreased.

<Example 5-1> to <Example 5-182> and <Comparative Example 5-1>

Cylindrical batteries of Example 5-1 to Example 5-182 and Comparative Example 5-1 were produced in a similar manner as in Example 3-1 to Example 3-182 and Comparative Example 3-1, respectively, except that a carbon-tin composite material similar to that used in Example 1-19 was used as the negative electrode active material, instead of graphite. Moreover, the negative electrode mix slurry that formed the negative electrode active material layer was prepared to have a composition similar to that of Example 1-19.

[Evaluation of Batteries]

(a) Cycle Test

A cycle test was carried out in a similar manner as in Example 1-1 for the cylindrical batteries of the various Examples and Comparative Example 5-1 thus produced.

The evaluation results are presented in the following Table 5.

TABLE 5

| | Negative electrode active material | Substrate Material | Thickness [μm] | Surface layer Inorganic particles | Resin material | Porosity | 500-cycle capacity retention ratio [%] |
|---|---|---|---|---|---|---|---|
| Example 5-1 | Carbon-tin composite material | PE | 9 | Alumina | Polyvinylidene fluoride | Low-porosity layer 60% High-porosity layer 90% | 94 |
| Example 5-2 | | | | | Polyimide | | 92 |
| Example 5-3 | | | | | Aramid (polyamide) | | 94 |
| Example 5-4 | | | | | Polyacrylonitrile | | 92 |
| Example 5-5 | | | | | Polyvinyl alcohol | | 92 |
| Example 5-6 | | | | | Polyether | | 92 |
| Example 5-7 | | | | | Acrylic acid resin | | 92 |
| Example 5-8 | | | | Boehmite | Polyvinylidene fluoride | | 96 |
| Example 5-9 | | | | | Polyimide | | 94 |
| Example 5-10 | | | | | Aramid (polyamide) | | 96 |
| Example 5-11 | | | | | Polyacrylonitrile | | 94 |
| Example 5-12 | | | | | Polyvinyl alcohol | | 96 |
| Example 5-13 | | | | | Polyether | | 96 |
| Example 5-14 | | | | | Acrylic acid resin | | 94 |

TABLE 5-continued

| | Negative electrode active material | Substrate Material | Thickness [μm] | Surface layer Inorganic particles | Resin material | Porosity | 500-cycle capacity retention ratio [%] |
|---|---|---|---|---|---|---|---|
| Example 5-15 | | | | Aluminum nitride | Polyvinylidene fluoride | | 89 |
| Example 5-16 | | | | | Polyimide | | 87 |
| Example 5-17 | | | | | Aramid (polyamide) | | 89 |
| Example 5-18 | | | | | Polyacrylonitrile | | 87 |
| Example 5-19 | | | | | Polyvinyl alcohol | | 87 |
| Example 5-20 | | | | | Polyether | | 87 |
| Example 5-21 | | | | | Acrylic acid resin | | 87 |
| Example 5-22 | | | | Boron nitride | Polyvinylidene fluoride | | 93 |
| Example 5-23 | | | | | Polyimide | | 91 |
| Example 5-24 | | | | | Aramid (polyamide) | | 93 |
| Example 5-25 | | | | | Polyacrylonitrile | | 91 |
| Example 5-26 | | | | | Polyvinyl alcohol | | 91 |
| Example 5-27 | | | | | Polyether | | 91 |
| Example 5-28 | | | | | Acrylic acid resin | | 91 |
| Example 5-29 | | | | Silicon carbide | Polyvinylidene fluoride | | 93 |
| Example 5-30 | | | | | Polyimide | | 91 |
| Example 5-31 | | | | | Aramid (polyamide) | | 93 |
| Example 5-32 | | | | | Polyacrylonitrile | | 91 |
| Example 5-33 | | | | | Polyvinyl alcohol | | 91 |
| Example 5-34 | | | | | Polyether | | 91 |
| Example 5-35 | | | | | Acrylic acid resin | | 91 |
| Example 5-36 | | | | Talc | Polyvinylidene fluoride | | 93 |
| Example 5-37 | | | | | Polyimide | | 91 |
| Example 5-38 | | | | | Aramid (polyamide) | | 93 |
| Example 5-39 | | | | | Polyacrylonitrile | | 91 |
| Example 5-40 | | | | | Polyvinyl alcohol | | 91 |
| Example 5-41 | | | | | Polyether | | 91 |
| Example 5-42 | | | | | Acrylic acid resin | | 91 |
| Example 5-43 | | | | $Li_2O_4$ | Polyvinylidene fluoride | | 89 |
| Example 5-44 | | | | | Polyimide | | 87 |
| Example 5-45 | | | | | Aramid (polyamide) | | 89 |
| Example 5-46 | | | | | Polyacrylonitrile | | 87 |
| Example 5-47 | | | | | Polyvinyl alcohol | | 87 |
| Example 5-48 | | | | | Polyether | | 87 |
| Example 5-49 | | | | | Acrylic acid resin | | 87 |
| Example 5-50 | Carbon-tin composite material | PE | 9 | $Li_3PO_4$ | Polyvinylidene fluoride | Low-porosity layer 60% | 89 |
| Example 5-51 | | | | | Polyimide | | 87 |
| Example 5-52 | | | | | Aramid (polyamide) | High-porosity layer 90% | 89 |
| Example 5-53 | | | | | Polyacrylonitrile | | 87 |
| Example 5-54 | | | | | Polyvinyl alcohol | | 87 |
| Example 5-55 | | | | | Polyether | | 87 |
| Example 5-56 | | | | | Acrylic acid resin | | 87 |
| Example 5-57 | | | | LiF | Polyvinylidene fluoride | | 89 |
| Example 5-58 | | | | | Polyimide | | 87 |
| Example 5-59 | | | | | Aramid (polyamide) | | 89 |
| Example 5-60 | | | | | Polyacrylonitrile | | 87 |
| Example 5-61 | | | | | Polyvinyl alcohol | | 87 |
| Example 5-62 | | | | | Polyether | | 87 |
| Example 5-63 | | | | | Acrylic acid resin | | 87 |
| Example 5-64 | | | | Diamond | Polyvinylidene fluoride | | 89 |
| Example 5-65 | | | | | Polyimide | | 87 |
| Example 5-66 | | | | | Aramid (polyamide) | | 89 |
| Example 5-67 | | | | | Polyacrylonitrile | | 87 |
| Example 5-68 | | | | | Polyvinyl alcohol | | 87 |
| Example 5-69 | | | | | Polyether | | 87 |
| Example 5-70 | | | | | Acrylic acid resin | | 87 |
| Example 5-71 | | | | Zirconium oxide | Polyvinylidene fluoride | | 95 |
| Example 5-72 | | | | | Polyimide | | 93 |
| Example 5-73 | | | | | Aramid (polyamide) | | 95 |
| Example 5-74 | | | | | Polyacrylonitrile | | 93 |
| Example 5-75 | | | | | Polyvinyl alcohol | | 93 |
| Example 5-76 | | | | | Polyether | | 93 |
| Example 5-77 | | | | | Acrylic acid resin | | 93 |
| Example 5-78 | | | | Yttrium oxide | Polyvinylidene fluoride | | 91 |
| Example 5-79 | | | | | Polyimide | | 89 |
| Example 5-80 | | | | | Aramid (polyamide) | | 91 |
| Example 5-81 | | | | | Polyacrylonitrile | | 89 |
| Example 5-82 | | | | | Polyvinyl alcohol | | 89 |
| Example 5-83 | | | | | Polyether | | 89 |
| Example 5-84 | | | | | Acrylic acid resin | | 89 |
| Example 5-85 | | | | Barium titanate | Polyvinylidene fluoride | | 94 |
| Example 5-86 | | | | | Polyimide | | 92 |
| Example 5-87 | | | | | Aramid (polyamide) | | 94 |

TABLE 5-continued

| | Negative electrode active material | Substrate Material | Thickness [μm] | Surface layer Inorganic particles | Resin material | Porosity | 500-cycle capacity retention ratio [%] |
|---|---|---|---|---|---|---|---|
| Example 5-88 | | | | | Polyacrylonitrile | | 92 |
| Example 5-89 | | | | | Polyvinyl alcohol | | 92 |
| Example 5-90 | | | | | Polyether | | 92 |
| Example 5-91 | | | | | Acrylic acid resin | | 92 |
| Example 5-92 | | | | Strontium titanate | Polyvinylidene fluoride | | 91 |
| Example 5-93 | | | | | Polyimide | | 89 |
| Example 5-94 | | | | | Aramid (polyamide) | | 91 |
| Example 5-95 | | | | | Polyacrylonitrile | | 89 |
| Example 5-96 | | | | | Polyvinyl alcohol | | 89 |
| Example 5-97 | | | | | Polyether | | 89 |
| Example 5-98 | | | | | Acrylic acid resin | | 89 |
| Example 5-99 | Carbon-tin composite material | PE | 9 | Silicon oxide | Polyvinylidene fluoride | Low-porosity layer 60% | 94 |
| Example 5-100 | | | | | Polyimide | | 92 |
| Example 5-101 | | | | | Aramid (polyamide) | High-porosity layer 90% | 94 |
| Example 5-102 | | | | | Polyacrylonitrile | | 92 |
| Example 5-103 | | | | | Polyvinyl alcohol | | 92 |
| Example 5-104 | | | | | Polyether | | 92 |
| Example 5-105 | | | | | Acrylic acid resin | | 92 |
| Example 5-106 | | | | Zeolite | Polyvinylidene fluoride | | 91 |
| Example 5-107 | | | | | Polyimide | | 89 |
| Example 5-108 | | | | | Aramid (polyamide) | | 91 |
| Example 5-109 | | | | | Polyacrylonitrile | | 89 |
| Example 5-110 | | | | | Polyvinyl alcohol | | 89 |
| Example 5-111 | | | | | Polyether | | 89 |
| Example 5-112 | | | | | Acrylic acid resin | | 89 |
| Example 5-113 | | | | Barium sulfate | Polyvinylidene fluoride | | 91 |
| Example 5-114 | | | | | Polyimide | | 89 |
| Example 5-115 | | | | | Aramid (polyamide) | | 91 |
| Example 5-116 | | | | | Polyacrylonitrile | | 89 |
| Example 5-117 | | | | | Polyvinyl alcohol | | 89 |
| Example 5-118 | | | | | Polyether | | 89 |
| Example 5-119 | | | | | Acrylic acid resin | | 89 |
| Example 5-120 | | | | Titanium oxide | Polyvinylidene fluoride | | 91 |
| Example 5-121 | | | | | Polyimide | | 89 |
| Example 5-122 | | | | | Aramid (polyamide) | | 91 |
| Example 5-123 | | | | | Polyacrylonitrile | | 89 |
| Example 5-124 | | | | | Polyvinyl alcohol | | 89 |
| Example 5-125 | | | | | Polyether | | 89 |
| Example 5-126 | | | | | Acrylic acid resin | | 89 |
| Example 5-127 | | | | Magnesium oxide | Polyvinylidene fluoride | | 91 |
| Example 5-128 | | | | | Polyimide | | 89 |
| Example 5-129 | | | | | Aramid (polyamide) | | 91 |
| Example 5-130 | | | | | Polyacrylonitrile | | 89 |
| Example 5-131 | | | | | Polyvinyl alcohol | | 89 |
| Example 5-132 | | | | | Polyether | | 89 |
| Example 5-133 | | | | | Acrylic acid resin | | 89 |
| Example 5-134 | | | | Graphite | Polyvinylidene fluoride | | 89 |
| Example 5-135 | | | | | Polyimide | | 87 |
| Example 5-136 | | | | | Aramid (polyamide) | | 89 |
| Example 5-137 | | | | | Polyacrylonitrile | | 87 |
| Example 5-138 | | | | | Polyvinyl alcohol | | 87 |
| Example 5-139 | | | | | Polyether | | 87 |
| Example 5-140 | | | | | Acrylic acid resin | | 87 |
| Example 5-141 | | | | Carbon nanotube | Polyvinylidene fluoride | | 89 |
| Example 5-142 | | | | | Polyimide | | 87 |
| Example 5-143 | | | | | Aramid (polyamide) | | 89 |
| Example 5-144 | | | | | Polyacrylonitrile | | 87 |
| Example 5-145 | | | | | Polyvinyl alcohol | | 87 |
| Example 5-146 | | | | | Polyether | | 87 |
| Example 5-147 | | | | | Acrylic acid resin | | 87 |
| Example 5-148 | Carbon-tin composite material | PE | 9 | Aluminum hydroxide | Polyvinylidene fluoride | Low-porosity layer 60% | 89 |
| Example 5-149 | | | | | Polyimide | | 87 |
| Example 5-150 | | | | | Aramid (polyamide) | High-porosity layer 90% | 89 |
| Example 5-151 | | | | | Polyacrylonitrile | | 87 |
| Example 5-152 | | | | | Polyvinyl alcohol | | 87 |
| Example 5-153 | | | | | Polyether | | 87 |
| Example 5-154 | | | | | Acrylic acid resin | | 87 |
| Example 5-155 | | | | Boron carbide | Polyvinylidene fluoride | | 89 |
| Example 5-156 | | | | | Polyimide | | 87 |
| Example 5-157 | | | | | Aramid (polyamide) | | 89 |
| Example 5-158 | | | | | Polyacrylonitrile | | 87 |
| Example 5-159 | | | | | Polyvinyl alcohol | | 87 |
| Example 5-160 | | | | | Polyether | | 87 |

TABLE 5-continued

| | Negative electrode active material | Substrate Material | Thickness [μm] | Inorganic particles | Surface layer Resin material | Porosity | 500-cycle capacity retention ratio [%] |
|---|---|---|---|---|---|---|---|
| Example 5-161 | | | | | Acrylic acid resin | | 87 |
| Example 5-162 | | | | Silicon nitride | Polyvinylidene fluoride | | 89 |
| Example 5-163 | | | | | Polyimide | | 87 |
| Example 5-164 | | | | | Aramid (polyamide) | | 89 |
| Example 5-165 | | | | | Polyacrylonitrile | | 87 |
| Example 5-166 | | | | | Polyvinyl alcohol | | 87 |
| Example 5-167 | | | | | Polyether | | 87 |
| Example 5-168 | | | | | Acrylic acid resin | | 87 |
| Example 5-169 | | | | Titanium nitride | Polyvinylidene fluoride | | 89 |
| Example 5-170 | | | | | Polyimide | | 87 |
| Example 5-171 | | | | | Aramid (polyamide) | | 89 |
| Example 5-172 | | | | | Polyacrylonitrile | | 87 |
| Example 5-173 | | | | | Polyvinyl alcohol | | 87 |
| Example 5-174 | | | | | Polyether | | 87 |
| Example 5-175 | | | | | Acrylic acid resin | | 87 |
| Example 5-176 | | | | Zinc oxide | Polyvinylidene fluoride | | 89 |
| Example 5-177 | | | | | Polyimide | | 87 |
| Example 5-178 | | | | | Aramid (polyamide) | | 89 |
| Example 5-179 | | | | | Polyacrylonitrile | | 87 |
| Example 5-180 | | | | | Polyvinyl alcohol | | 87 |
| Example 5-181 | | | | | Polyether | | 87 |
| Example 5-182 | | | | | Acrylic acid resin | | 87 |
| Comparative Example 5-1 | Carbon-tin composite material | PE | 23 | — | — | — | 42 |

As can be seen from Table 5, in the cylindrical batteries of the various Examples that used the separator of the present technology, even if a carbon-tin composite material was used as the negative electrode active material, the capacity retention ratio after 500 cycles was 80% or higher in all cases, and high cycle characteristics were obtained. On the other hand, in Comparative Example 5-1 that used lithium titanate as the negative electrode active material and used a separator which did not have the surface layer composed of a low-porosity layer and a high-porosity layer of the present technology, the capacity retention ratio was markedly decreased.

<Example 6-1> to <Example 6-182> and <Comparative Example 6-1>

Cylindrical batteries of Example 6-1 to Example 6-182 and Comparative Example 6-1 were produced in a similar manner as in Example 3-1 to Example 3-182 and Comparative Example 3-1, respectively, except that lithium titanate similar to that used in Example 1-37 was used as the negative electrode active material, instead of graphite. Moreover, the negative electrode mix slurry that formed the negative electrode active material layer was prepared to have a composition similar to that of Example 1-37.

[Evaluation of Batteries]

(a) Cycle Test

A cycle test was carried out in a similar manner as in Example 1-1 for the cylindrical batteries of the various Examples and Comparative Example 6-1 thus produced.

The evaluation results are presented in the following Table 6.

TABLE 6

| | Negative electrode active material | Substrate Material | Thickness [μm] | Inorganic particles | Surface layer Resin material | Porosity | 500-cycle capacity retention ratio [%] |
|---|---|---|---|---|---|---|---|
| Example 6-1 | Lithium titanate | PE | 9 | Alumina | Polyvinylidene fluoride | Low-porosity layer 60% | 96 |
| Example 6-2 | | | | | Polyimide | | 94 |
| Example 6-3 | | | | | Aramid (polyamide) | High-porosity layer 90% | 96 |
| Example 6-4 | | | | | Polyacrylonitrile | | 94 |
| Example 6-5 | | | | | Polyvinyl alcohol | | 94 |
| Example 6-6 | | | | | Polyether | | 94 |
| Example 6-7 | | | | | Acrylic acid resin | | 94 |
| Example 6-8 | | | | Boehmite | Polyvinylidene fluoride | | 98 |
| Example 6-9 | | | | | Polyimide | | 96 |
| Example 6-10 | | | | | Aramid (polyamide) | | 98 |
| Example 6-11 | | | | | Polyacrylonitrile | | 96 |
| Example 6-12 | | | | | Polyvinyl alcohol | | 96 |
| Example 6-13 | | | | | Polyether | | 96 |

TABLE 6-continued

| | Negative electrode active material | Substrate Material | Thickness [μm] | Surface layer Inorganic particles | Resin material | Porosity | 500-cycle capacity retention ratio [%] |
|---|---|---|---|---|---|---|---|
| Example 6-14 | | | | | Acrylic acid resin | | 96 |
| Example 6-15 | | | | Aluminum nitride | Polyvinylidene fluoride | | 91 |
| Example 6-16 | | | | | Polyimide | | 89 |
| Example 6-17 | | | | | Aramid (polyamide) | | 91 |
| Example 6-18 | | | | | Polyacrylonitrile | | 89 |
| Example 6-19 | | | | | Polyvinyl alcohol | | 89 |
| Example 6-20 | | | | | Polyether | | 89 |
| Example 6-21 | | | | | Acrylic acid resin | | 89 |
| Example 6-22 | | | | Boron nitride | Polyvinylidene fluoride | | 95 |
| Example 6-23 | | | | | Polyimide | | 93 |
| Example 6-24 | | | | | Aramid (polyamide) | | 95 |
| Example 6-25 | | | | | Polyacrylonitrile | | 93 |
| Example 6-26 | | | | | Polyvinyl alcohol | | 93 |
| Example 6-27 | | | | | Polyether | | 93 |
| Example 6-28 | | | | | Acrylic acid resin | | 93 |
| Example 6-29 | | | | Silicon carbide | Polyvinylidene fluoride | | 95 |
| Example 6-30 | | | | | Polyimide | | 93 |
| Example 6-31 | | | | | Aramid (polyamide) | | 95 |
| Example 6-32 | | | | | Polyacrylonitrile | | 93 |
| Example 6-33 | | | | | Polyvinyl alcohol | | 93 |
| Example 6-34 | | | | | Polyether | | 93 |
| Example 6-35 | | | | | Acrylic acid resin | | 93 |
| Example 6-36 | | | | Talc | Polyvinylidene fluoride | | 95 |
| Example 6-37 | | | | | Polyimide | | 93 |
| Example 6-38 | | | | | Aramid (polyamide) | | 95 |
| Example 6-39 | | | | | Polyacrylonitrile | | 93 |
| Example 6-40 | | | | | Polyvinyl alcohol | | 93 |
| Example 6-41 | | | | | Polyether | | 93 |
| Example 6-42 | | | | | Acrylic acid resin | | 93 |
| Example 6-43 | | | | $Li_2O_4$ | Polyvinylidene fluoride | | 91 |
| Example 6-44 | | | | | Polyimide | | 89 |
| Example 6-45 | | | | | Aramid (polyamide) | | 91 |
| Example 6-46 | | | | | Polyacrylonitrile | | 89 |
| Example 6-47 | | | | | Polyvinyl alcohol | | 89 |
| Example 6-48 | | | | | Polyether | | 89 |
| Example 6-49 | | | | | Acrylic acid resin | | 89 |
| Example 6-50 | Lithium titanate | PE | 9 | $Li_3PO_4$ | Polyvinylidene fluoride | Low-porosity layer 60% | 91 |
| Example 6-51 | | | | | Polyimide | | 89 |
| Example 6-52 | | | | | Aramid (polyamide) | High-porosity layer 90% | 91 |
| Example 6-53 | | | | | Polyacrylonitrile | | 89 |
| Example 6-54 | | | | | Polyvinyl alcohol | | 89 |
| Example 6-55 | | | | | Polyether | | 89 |
| Example 6-56 | | | | | Acrylic acid resin | | 89 |
| Example 6-57 | | | | LiF | Polyvinylidene fluoride | | 91 |
| Example 6-58 | | | | | Polyimide | | 89 |
| Example 6-59 | | | | | Aramid (polyamide) | | 91 |
| Example 6-60 | | | | | Polyacrylonitrile | | 89 |
| Example 6-61 | | | | | Polyvinyl alcohol | | 89 |
| Example 6-62 | | | | | Polyether | | 89 |
| Example 6-63 | | | | | Acrylic acid resin | | 89 |
| Example 6-64 | | | | Diamond | Polyvinylidene fluoride | | 91 |
| Example 6-65 | | | | | Polyimide | | 89 |
| Example 6-66 | | | | | Aramid (polyamide) | | 91 |
| Example 6-67 | | | | | Polyacrylonitrile | | 89 |
| Example 6-68 | | | | | Polyvinyl alcohol | | 89 |
| Example 6-69 | | | | | Polyether | | 89 |
| Example 6-70 | | | | | Acrylic acid resin | | 89 |
| Example 6-71 | | | | Zirconium oxide | Polyvinylidene fluoride | | 97 |
| Example 6-72 | | | | | Polyimide | | 95 |
| Example 6-73 | | | | | Aramid (polyamide) | | 97 |
| Example 6-74 | | | | | Polyacrylonitrile | | 95 |
| Example 6-75 | | | | | Polyvinyl alcohol | | 96 |
| Example 6-76 | | | | | Polyether | | 96 |
| Example 6-77 | | | | | Acrylic acid resin | | 95 |
| Example 6-78 | | | | Yttrium oxide | Polyvinylidene fluoride | | 93 |
| Example 6-79 | | | | | Polyimide | | 91 |
| Example 6-80 | | | | | Aramid (polyamide) | | 93 |
| Example 6-81 | | | | | Polyacrylonitrile | | 91 |
| Example 6-82 | | | | | Polyvinyl alcohol | | 91 |
| Example 6-83 | | | | | Polyether | | 91 |
| Example 6-84 | | | | | Acrylic acid resin | | 91 |
| Example 6-85 | | | | Barium titanate | Polyvinylidene fluoride | | 96 |
| Example 6-86 | | | | | Polyimide | | 94 |

TABLE 6-continued

| | Negative electrode active material | Substrate Material | Thickness [μm] | Surface layer Inorganic particles | Resin material | Porosity | 500-cycle capacity retention ratio [%] |
|---|---|---|---|---|---|---|---|
| Example 6-87 | | | | | Aramid (polyamide) | | 96 |
| Example 6-88 | | | | | Polyacrylonitrile | | 94 |
| Example 6-89 | | | | | Polyvinyl alcohol | | 94 |
| Example 6-90 | | | | | Polyether | | 94 |
| Example 6-91 | | | | | Acrylic acid resin | | 94 |
| Example 6-92 | | | | Strontium titanate | Polyvinylidene fluoride | | 93 |
| Example 6-93 | | | | | Polyimide | | 91 |
| Example 6-94 | | | | | Aramid (polyamide) | | 93 |
| Example 6-95 | | | | | Polyacrylonitrile | | 91 |
| Example 6-96 | | | | | Polyvinyl alcohol | | 91 |
| Example 6-97 | | | | | Polyether | | 91 |
| Example 6-98 | | | | | Acrylic acid resin | | 91 |
| Example 6-99 | Lithium titanate | PE | 9 | Silicon oxide | Polyvinylidene fluoride | Low-porosity layer 60% | 96 |
| Example 6-100 | | | | | Polyimide | | 94 |
| Example 6-101 | | | | | Aramid (polyamide) | High-porosity layer 90% | 96 |
| Example 6-102 | | | | | Polyacrylonitrile | | 94 |
| Example 6-103 | | | | | Polyvinyl alcohol | | 94 |
| Example 6-104 | | | | | Polyether | | 94 |
| Example 6-105 | | | | | Acrylic acid resin | | 94 |
| Example 6-106 | | | | Zeolite | Polyvinylidene fluoride | | 93 |
| Example 6-107 | | | | | Polyimide | | 91 |
| Example 6-108 | | | | | Aramid (polyamide) | | 93 |
| Example 6-109 | | | | | Polyacrylonitrile | | 91 |
| Example 6-110 | | | | | Polyvinyl alcohol | | 91 |
| Example 6-111 | | | | | Polyether | | 91 |
| Example 6-112 | | | | | Acrylic acid resin | | 91 |
| Example 6-113 | | | | Barium sulfate | Polyvinylidene fluoride | | 93 |
| Example 6-114 | | | | | Polyimide | | 91 |
| Example 6-115 | | | | | Aramid (polyamide) | | 93 |
| Example 6-116 | | | | | Polyacrylonitrile | | 91 |
| Example 6-117 | | | | | Polyvinyl alcohol | | 91 |
| Example 6-118 | | | | | Polyether | | 91 |
| Example 6-119 | | | | | Acrylic acid resin | | 91 |
| Example 6-120 | | | | Titanium oxide | Polyvinylidene fluoride | | 93 |
| Example 6-121 | | | | | Polyimide | | 91 |
| Example 6-122 | | | | | Aramid (polyamide) | | 93 |
| Example 6-123 | | | | | Polyacrylonitrile | | 91 |
| Example 6-124 | | | | | Polyvinyl alcohol | | 91 |
| Example 6-125 | | | | | Polyether | | 91 |
| Example 6-126 | | | | | Acrylic acid resin | | 91 |
| Example 6-127 | | | | Magnesium oxide | Polyvinylidene fluoride | | 93 |
| Example 6-128 | | | | | Polyimide | | 91 |
| Example 6-129 | | | | | Aramid (polyamide) | | 93 |
| Example 6-130 | | | | | Polyacrylonitrile | | 91 |
| Example 6-131 | | | | | Polyvinyl alcohol | | 91 |
| Example 6-132 | | | | | Polyether | | 91 |
| Example 6-133 | | | | | Acrylic acid resin | | 91 |
| Example 6-134 | | | | Graphite | Polyvinylidene fluoride | | 91 |
| Example 6-135 | | | | | Polyimide | | 89 |
| Example 6-136 | | | | | Aramid (polyamide) | | 91 |
| Example 6-137 | | | | | Polyacrylonitrile | | 89 |
| Example 6-138 | | | | | Polyvinyl alcohol | | 89 |
| Example 6-139 | | | | | Polyether | | 89 |
| Example 6-140 | | | | | Acrylic acid resin | | 89 |
| Example 6-141 | | | | Carbon nanotube | Polyvinylidene fluoride | | 91 |
| Example 6-142 | | | | | Polyimide | | 89 |
| Example 6-143 | | | | | Aramid (polyamide) | | 91 |
| Example 6-144 | | | | | Polyacrylonitrile | | 89 |
| Example 6-145 | | | | | Polyvinyl alcohol | | 89 |
| Example 6-146 | | | | | Polyether | | 89 |
| Example 6-147 | | | | | Acrylic acid resin | | 89 |
| Example 6-148 | Lithium titanate | PE | 9 | Aluminum hydroxide | Polyvinylidene fluoride | Low-porosity layer 60% | 91 |
| Example 6-149 | | | | | Polyimide | | 89 |
| Example 6-150 | | | | | Aramid (polyamide) | High-porosity layer 90% | 91 |
| Example 6-151 | | | | | Polyacrylonitrile | | 89 |
| Example 6-152 | | | | | Polyvinyl alcohol | | 89 |
| Example 6-153 | | | | | Polyether | | 89 |
| Example 6-154 | | | | | Acrylic acid resin | | 89 |
| Example 6-155 | | | | Boron carbide | Polyvinylidene fluoride | | 91 |
| Example 6-156 | | | | | Polyimide | | 89 |
| Example 6-157 | | | | | Aramid (polyamide) | | 91 |
| Example 6-158 | | | | | Polyacrylonitrile | | 89 |
| Example 6-159 | | | | | Polyvinyl alcohol | | 89 |

TABLE 6-continued

| | Negative electrode active material | Substrate Material | Thickness [μm] | Surface layer Inorganic particles | Resin material | Porosity | 500-cycle capacity retention ratio [%] |
|---|---|---|---|---|---|---|---|
| Example 6-160 | | | | | Polyether | | 89 |
| Example 6-161 | | | | | Acrylic acid resin | | 89 |
| Example 6-162 | | | | Silicon nitride | Polyvinylidene fluoride | | 91 |
| Example 6-163 | | | | | Polyimide | | 89 |
| Example 6-164 | | | | | Aramid (polyamide) | | 91 |
| Example 6-165 | | | | | Polyacrylonitrile | | 89 |
| Example 6-166 | | | | | Polyvinyl alcohol | | 89 |
| Example 6-167 | | | | | Polyether | | 89 |
| Example 6-168 | | | | | Acrylic acid resin | | 89 |
| Example 6-169 | | | | Titanium nitride | Polyvinylidene fluoride | | 91 |
| Example 6-170 | | | | | Polyimide | | 89 |
| Example 6-171 | | | | | Aramid (polyamide) | | 91 |
| Example 6-172 | | | | | Polyacrylonitrile | | 89 |
| Example 6-173 | | | | | Polyvinyl alcohol | | 89 |
| Example 6-174 | | | | | Polyether | | 89 |
| Example 6-175 | | | | | Acrylic acid resin | | 89 |
| Example 6-176 | | | | Zinc oxide | Polyvinylidene fluoride | | 91 |
| Example 6-177 | | | | | Polyimide | | 89 |
| Example 6-178 | | | | | Aramid (polyamide) | | 91 |
| Example 6-179 | | | | | Polyacrylonitrile | | 89 |
| Example 6-180 | | | | | Polyvinyl alcohol | | 89 |
| Example 6-181 | | | | | Polyether | | 89 |
| Example 6-182 | | | | | Acrylic acid resin | | 89 |
| Comparative Example 6-1 | Lithium titanate | PE | 23 | — | — | — | 58 |

As can be seen from Table 6, in the cylindrical batteries of the various Examples that used the separator of the present technology, when graphite was used as the negative electrode active material, the capacity retention ratio after 500 cycles was 90% or higher in all cases, and superior cycle characteristics were obtained. On the other hand, in Comparative Example 6-1 in which even though graphite was used as the negative electrode active material, a separator which did not have the surface layer composed of a low-porosity layer and a high-porosity layer of the present technology was used, the capacity retention ratio was markedly decreased.

<Example 7-1> to <Example 7-60>

In Example 7-1 to Example 7-60, batteries were produced by changing the battery configuration, the negative electrode active material, and the position of the surface layer of the separator, and the effect of the present technology were checked.

Example 7-1

A cylindrical battery similar to that of Example 1-1 was produced, and this was designated as a cylindrical battery of Example 7-1. That is, the battery was configured to include a cylindrical external can as the battery exterior material, and silicon as the negative electrode active material. Furthermore, the separator was configured to include a heat absorbing layer having a one-surface thickness of 7 μm (total thickness of both surfaces: 14 μm), which was formed from alumina as the inorganic particles and polyvinylidene fluoride as the resin material on both surfaces of a polyethylene microporous film having a thickness of 9 μm.

Example 7-2

A cylindrical battery was produced in a similar manner as in Example 7-1, except that a separator in which a surface layer having a one-surface thickness of 14 μm was provided only on the positive electrode side surface of a polyethylene microporous film having a thickness of 9 μm (surface facing the positive electrode at the time of battery production), was used.

Example 7-3

A cylindrical battery was produced in a similar manner as in Example 7-1, except that a separator in which a surface layer having a one-surface thickness of 14 μm was provided only on the negative electrode side surface of a polyethylene microporous film having a thickness of 9 μm (surface facing the negative electrode at the time of battery production), was used.

<Example 7-4> to <Example 7-6>

Cylindrical batteries of Example 7-4 to Example 7-6 were produced in a similar manner as in Example 7-1 to Example 7-3, respectively, except that a carbon-tin composite material was used as the negative electrode active material, and the negative electrode mix slurry was produced to have a composition similar to that used in Example 1-19.

<Example 7-7> to <Example 7-9>

Cylindrical batteries of Example 7-7 to Example 7-9 were produced in a similar manner as in Example 7-1 to Example 7-3, respectively, except that lithium titanate was used as the negative electrode active material, and the negative electrode mix slurry was produced to have a composition similar to that used in Example 1-37.

<Example 7-10> to <Example 7-12>

Cylindrical batteries of Example 7-10 to Example 7-12 were produced in a similar manner as in Example 7-1 to Example 7-3, respectively, except that graphite was used as the negative electrode active material, and the negative electrode mix slurry was prepared to have a composition similar to that used in Example 1-55.

Example 7-13

A square battery was produced, in which the respective configurations of the positive electrode, the negative electrode, the separator, and the non-aqueous liquid electrolyte were similar to those of Example 7-1. That is, the battery was configured such that the battery exterior material was a rectangular exterior can, and the negative electrode active material was silicon. Furthermore, the separator was configured to include a surface layer which was formed from alumina as inorganic particles and polyvinylidene fluoride as a resin material and had a one-surface thickness of 7 μm (total thickness of both surfaces: 14 μm), provided on both surfaces of a polyethylene microporous film having a thickness of 9 μm. The method for assembling the square battery will be explained below.

[Assembling of Square Battery]

A positive electrode, a negative electrode, and a separator having a surface layer formed on both surfaces, were laminated in the order of the positive electrode, the separator, the negative electrode, and the separator, and the assembly was wound several times in the longitudinal direction in a flat shape. Subsequently, the winding end portion was fixed with an adhesive tape, and thereby a wound electrode assembly was formed. Next, as illustrated in FIG. 8, the wound electrode assembly was accommodated in a rectangular battery can. Subsequently, an electrode pin provided on a battery lid and a positive electrode terminal led out from the wound electrode assembly were connected, and then the battery can was sealed with the battery lid. A non-aqueous liquid electrolyte was injected through a liquid electrolyte injection port, and the battery can was tightly sealed by sealing with a sealing member. Thereby, a rectangular battery having a battery shape that measured 5.2 mm in thickness, 34 mm in width, and 36 mm in height (523436 size), and a battery capacity of 1000 mAh, was produced.

<Example 7-14> to <Example 7-24>

Square batteries of Example 7-14 to Example 7-24 were produced in a similar manner as in Example 7-2 to Example 7-12, respectively, except that the square batteries were produced to have a battery configuration similar to that of Example 7-13.

Example 7-25

A laminate film type battery was produced, in which the respective configurations of the positive electrode, the negative electrode, the separator, and the non-aqueous liquid electrolyte were similar to those of Example 7-1, and the laminated electrode assembly was sheathed with a soft laminate film. That is, the battery was configured such that the battery exterior material was a laminate film, the electrode assembly was a laminate type assembly, and the negative electrode active material was silicon. Furthermore, the separator was configured to include a surface layer which was formed from alumina as inorganic particles and polyvinylidene fluoride as a resin material and had a one-surface thickness of 7 μm (total thickness of both surfaces: 14 μm), provided on both surfaces of a polyethylene microporous film having a thickness of 9 μm. The method for assembling the laminate film type battery will be explained below.

[Assembling of Laminate Film Type Battery]

A positive electrode, a negative electrode, and a separator having a surface layer formed on both surfaces, all of which were rectangular-shaped, were laminated in the order of the positive electrode, the separator, the negative electrode, and the separator, and thus a laminated electrode assembly was formed. Next, as illustrated in FIG. 11B, the laminated electrode assembly was sheathed with a laminate film having a soft aluminum layer, and the edge from which the positive electrode terminal and the negative electrode terminal were led out, and other two edges around the laminated electrode assembly were thermally fused to make the laminate film into a bag shape. Subsequently, a non-aqueous liquid electrolyte was injected through the opening that had not been thermally fused, and then the one edge that had not been thermally fused was tightly sealed by sealing by thermal fusion under reduced pressure. Thereby, a laminate film type battery having a battery shape that measured 5.2 mm in thickness, 34 mm in width, and 36 mm in height (523436 size), and a battery capacity of 1000 mAh, was produced.

<Example 7-26> to <Example 7-36>

Laminate film type batteries of Example 7-26 to Example 7-36 were produced in a similar manner as in Example 7-2 to Example 7-12, respectively, except that the batteries were configured to be a laminate film type battery similar to that of Example 7-25.

Example 7-37

A laminate film type battery was produced, in which the respective configurations of the positive electrode, the negative electrode, and the separator were similar to those of Example 7-1, and a gel electrolyte and a wound electrode assembly such as described below were sheathed with a soft laminate film. That is, the battery was configured such that the battery exterior material was a laminate film, the electrode assembly was a wound electrode assembly, and the negative electrode active material was silicon. Furthermore, the separator was configured to include a surface layer which was formed from alumina as inorganic particles and polyvinylidene fluoride as a resin material and had a one-surface thickness of 7 μm (total thickness of both surfaces: 14 μm), provided on both surfaces of a polyethylene microporous film having a thickness of 9 μm. The method for assembling the laminate film type battery will be explained below.

[Formation of Gel Electrolyte Layer]

A non-aqueous liquid electrolyte was prepared by dissolving lithium hexafluorophosphate ($LiPF_6$) as an electrolyte salt at a concentration of 1 mol/dm$^3$ in a non-aqueous solvent obtained by mixing ethylene carbonate (EC), propylene carbonate (PC) and vinylene carbonate (VC) at a mass ratio of 49:49:2. Subsequently, a sol-like precursor solution was prepared by using polyvinylidene fluoride (PVdF) as a polymer compound for retaining the non-aqueous liquid electrolyte, so that the polymer compound was same as the resin material that constituted the heat absorbing layer of the separator, and mixing the non-aqueous liquid electrolyte, polyvinylidene fluoride, and dimethyl carbonate (DMC) as a plasticizer. Subsequently, the precursor solution was applied on both surfaces of the positive electrode and both surfaces of the negative electrode, and the precursor solution was dried to remove the plasticizer. Thereby, gel electrolyte layers were formed on the surfaces of the positive electrode and the negative electrode.

[Assembling of Laminate Film Type Battery]

The Positive electrode and the negative electrode on which a gel electrolyte layer was formed on both surfaces, and the separator having a surface layer formed on both surfaces, were laminated in the order of the positive electrode, the separator, the negative electrode, and the separator, and the laminate was wound several times in the longitudinal direction in a flat shape. Subsequently, the winding end portion was fixed with an adhesive tape, and thereby a wound electrode assembly was formed.

Next, as illustrated in FIG. 9, the wound electrode assembly was sheathed with a laminate film having a soft aluminum layer, and the edge from which the positive electrode terminal and the negative electrode terminal were led out, and other three edges around the wound electrode assembly were tightly sealed by sealing by thermal fusion under reduced pressure. Thereby, a laminate film type battery having a battery shape that measured 5.2 mm in thickness, 34 mm in width, and 36 mm in height (523436 size), and a battery capacity of 1000 mAh, was produced.

<Example 7-38> to <Example 7-48>

Laminate film type batteries of Example 7-38 to Example 7-48 were produced in a similar manner as in Example 7-2 to Example 7-12, respectively, except that the batteries were configured to be laminate film type batteries similar to that of Example 7-37.

Example 7-49

A laminate film type battery was produced, in which the respective configurations of the positive electrode, the negative electrode, and the separator were similar to those of Example 7-1, and a gel electrolyte and a wound electrode assembly similar to those used in Example 7-37 were sheathed with a soft laminate film and a hard laminate film. That is, the battery was configured such that the battery exterior material was laminate films, the electrode assembly was of flat wound type, and the negative electrode active material was silicon. Furthermore, the separator was configured to include a surface layer which was formed from alumina as inorganic particles and polyvinylidene fluoride as a resin material and had a one-surface thickness of 7 μm (total thickness of both surfaces: 14 μm), provided on both surfaces of a polyethylene microporous film having a thickness of 9 μm. The method for assembling the laminate film type battery will be explained below.

[Assembling of Laminate Film Type Battery]

A positive electrode, a negative electrode, and a separator having a surface layer formed on both surfaces were laminated in the order of the positive electrode, the separator, the negative electrode, and the separator. The laminate was wound several times in the longitudinal direction in a flat shape, and then the winding end portion was fixed with an adhesive tape. Thereby, a wound electrode assembly was formed. At this time, a positive electrode and a negative electrode, both of which were coated with a non-aqueous electrolyte that had been produced into a gel form by retaining a non-aqueous liquid electrolyte in a polymer material, on both surfaces, were used.

Next, as illustrated in FIG. 13, the wound electrode assembly was sheathed with a soft laminate film having a soft aluminum layer and a hard laminate film having a hard aluminum layer, and the edge from which the positive electrode terminal and the negative electrode terminal were led out, and the other three edges around the wound electrode assembly were tightly sealed by sealing by thermal fusion under reduced pressure. Thereafter, two edges of the hard laminate film were formed into an elliptic cross-sectional shape by bringing the shorter edges of the hard laminate film into contact, the portions of the hard laminate film and the soft laminate film facing each other were pasted. Thereby, a laminate film type battery as illustrated in FIG. 12, having a battery shape that measured 5.2 mm in thickness, 34 mm in width, and 36 mm in height (523436 size) and a battery capacity of 1000 mAh, was produced.

<Example 7-50> to <Example 7-60>

Laminate film type batteries of Example 7-50 to Example 7-60 were produced in a similar manner as in Example 7-2 to Example 7-12, respectively, except that the batteries were configured to be laminate film type batteries similar to that of Example 7-49.

<Example 8-1> to <Example 8-60>

Cylindrical batteries were produced in a similar manner as in Example 7-1 to Example 7-60, respectively, except that boehmite was used as the inorganic particles used in the surface layer of the separator, instead of alumina. At this time, the volume ratio between the inorganic particles and the resin material (nearly 0.8:0.2) was not changed, the feed amount of the resin material was kept constant, and the feed amount of boehmite was adjusted to be proportional to the specific gravity.

[Evaluation of Batteries]
(a) Cycle Test

A cycle test was carried out in a similar manner as in Example 1-1 for the batteries of the various Examples thus produced.

The evaluation results are presented in the following Table 7 and Table 8.

TABLE 7

| | Battery form | | | Negative electrode | Surface layer | | | | | Capacity retention |
|---|---|---|---|---|---|---|---|---|---|---|
| | Shape | Electrode assembly | Electrolyte | active material | Inorganic particles | Resin material | Porosity | Position | Thickness | ratio after 500 cycles |
| Example 7-1 | Cylindrical battery | Wound type | Liquid | Silicon | Alumina | Polyvinylidene fluoride | Low-porosity layer 60% High-porosity layer 90% | Both surfaces of substrate | 14 μm, with 7 μm each for single surface | 88 |
| Example 7-2 | | | | | | | | Positive electrode side surface of substrate | 14 μm | 84 |

TABLE 7-continued

| | Battery form | | | Negative electrode | Surface layer | | | | | Capacity retention |
|---|---|---|---|---|---|---|---|---|---|---|
| | Shape | Electrode assembly | Electro-lyte | active material | Inorganic particles | Resin material | Porosity | Position | Thickness | ratio after 500 cycles |
| Example 7-3 | | | | | | | | Negative electrode side surface of substrate | 14 μm | 86 |
| Example 7-4 | | | | Carbon-tin composite material | | | | Both surfaces of substrate | 14 μm, with 7 μm each for single surface | 94 |
| Example 7-5 | | | | | | | | Positive electrode side surface of substrate | 14 μm | 90 |
| Example 7-6 | | | | | | | | Negative electrode side surface of substrate | 14 μm | 92 |
| Example 7-7 | | | | Lithium titanate | | | | Both surfaces of substrate | 14 μm, with 7 μm each for single surface | 96 |
| Example 7-8 | | | | | | | | Positive electrode side surface of substrate | 14 μm | 92 |
| Example 7-9 | | | | | | | | Negative electrode side surface of substrate | 14 μm | 94 |
| Example 7-10 | | | | Graphite | | | | Both surfaces of substrate | 14 μm, with 7 μm each for single surface | 96 |
| Example 7-11 | | | | | | | | Positive electrode side surface of substrate | 14 μm | 92 |
| Example 7-12 | | | | | | | | Negative electrode side surface of substrate | 14 μm | 94 |
| Example 7-13 | Square battery | Flat wound type | Liquid | Silicon | Alumina | Polyvinyl-idene fluoride | Low-porosity layer 60% High-porosity layer 90% | Both surfaces of substrate | 14 μm, with 7 μm each for single surface | 88 |
| Example 7-14 | | | | | | | | Positive electrode side surface of substrate | 14 μm | 84 |
| Example 7-15 | | | | | | | | Negative electrode side surface of substrate | 14 μm | 86 |
| Example 7-16 | | | | Carbon-tin composite material | | | | Both surfaces of substrate | 14 μm, with 7 μm each for single surface | 94 |
| Example 7-17 | | | | | | | | Positive electrode side surface of substrate | 14 μm | 90 |
| Example 7-18 | | | | | | | | Negative electrode side surface of substrate | 14 μm | 92 |
| Example 7-19 | | | | Lithium titanate | | | | Both surfaces of substrate | 14 μm, with 7 μm each for single surface | 96 |
| Example 7-20 | | | | | | | | Positive electrode side surface of substrate | 14 μm | 92 |
| Example 7-21 | | | | | | | | Negative electrode side surface of substrate | 14 μm | 94 |
| Example 7-22 | | | | Graphite | | | | Both surfaces of substrate | 14 μm, with 7 μm each for single surface | 96 |

TABLE 7-continued

| | Battery form | | | Negative electrode | Surface layer | | | | | Capacity retention |
|---|---|---|---|---|---|---|---|---|---|---|
| | Shape | Electrode assembly | Electrolyte | active material | Inorganic particles | Resin material | Porosity | Position | Thickness | ratio after 500 cycles |
| Example 7-23 | | | | | | | | Positive electrode side surface of substrate | 14 μm | 92 |
| Example 7-24 | | | | | | | | Negative electrode side surface of substrate | 14 μm | 94 |
| Example 7-25 | Laminate type battery (soft exterior material) | Laminate type | Liquid | Silicon | Alumina | Polyvinylidene fluoride | Low-porosity layer 60% High-porosity layer 90% | Both surfaces of substrate | 14 μm, with 7 μm each for single surface | 88 |
| Example 7-26 | | | | | | | | Positive electrode side surface of substrate | 14 μm | 84 |
| Example 7-27 | | | | | | | | Negative electrode side surface of substrate | 14 μm | 86 |
| Example 7-28 | | | | Carbon-tin composite material | | | | Both surfaces of substrate | 14 μm, with 7 μm each for single surface | 94 |
| Example 7-29 | | | | | | | | Positive electrode side surface of substrate | 14 μm | 90 |
| Example 7-30 | | | | | | | | Negative electrode side surface of substrate | 14 μm | 92 |
| Example 7-31 | | | | Lithium titanate | | | | Both surfaces of substrate | 14 μm, with 7 μm each for single surface | 96 |
| Example 7-32 | | | | | | | | Positive electrode side surface of substrate | 14 μm | 92 |
| Example 7-33 | | | | | | | | Negative electrode side surface of substrate | 14 μm | 94 |
| Example 7-34 | | | | Graphite | | | | Both surfaces of substrate | 14 μm, with 7 μm each for single surface | 96 |
| Example 7-35 | | | | | | | | Positive electrode side surface of substrate | 14 μm | 92 |
| Example 7-36 | | | | | | | | Negative electrode side surface of substrate | 14 μm | 94 |
| Example 7-37 | Laminate type battery (soft exterior material) | Flat wound type | Gel | Silicon | Alumina | Polyvinylidene fluoride | Low-porosity layer 60% High-porosity layer 90% | Both surfaces of substrate | 14 μm, with 7 μm each for single surface | 90 |
| Example 7-38 | | | | | | | | Positive electrode side surface of substrate | 14 μm | 86 |
| Example 7-39 | | | | | | | | Negative electrode side surface of substrate | 14 μm | 88 |
| Example 7-40 | | | | Carbon-tin composite material | | | | Both surfaces of substrate | 14 μm, with 7 μm each for single surface | 96 |
| Example 7-41 | | | | | | | | Positive electrode side surface of substrate | 14 μm | 92 |
| Example 7-42 | | | | | | | | Negative electrode side surface of substrate | 14 μm | 94 |

TABLE 7-continued

| | Battery form | | Negative electrode | Surface layer | | | | | Capacity retention |
|---|---|---|---|---|---|---|---|---|---|
| | Shape | Electrode assembly | Electrolyte | active material | Inorganic particles | Resin material | Porosity | Position | Thickness | ratio after 500 cycles |
| Example 7-43 | | | | Lithium titanate | | | | Both surfaces of substrate | 14 μm, with 7 μm each for single surface | 98 |
| Example 7-44 | | | | | | | | Positive electrode side surface of substrate | 14 μm | 94 |
| Example 7-45 | | | | | | | | Negative electrode side surface of substrate | 14 μm | 96 |
| Example 7-46 | Laminate type battery (soft exterior material) | Flat wound type | Gel | Graphite | Alumina | Polyvinylidene fluoride | Low-porosity layer 60% High-porosity layer 90% | Both surfaces of substrate | 14 μm, with 7 μm each for single surface | 98 |
| Example 7-47 | | | | | | | | Positive electrode side surface of substrate | 14 μm | 94 |
| Example 7-48 | | | | | | | | Negative electrode side surface of substrate | 14 μm | 96 |
| Example 7-49 | Laminate type battery (hard exterior material + soft exterior material) | Flat wound type | Gel | Silicon | Alumina | Polyvinylidene fluoride | Low-porosity layer 60% High-porosity layer 90% | Both surfaces of substrate | 14 μm, with 7 μm each for single surface | 90 |
| Example 7-50 | | | | | | | | Positive electrode side surface of substrate | 14 μm | 86 |
| Example 7-51 | | | | | | | | Negative electrode side surface of substrate | 14 μm | 88 |
| Example 7-52 | | | | Carbon-tin composite material | | | | Both surfaces of substrate | 14 μm, with 7 μm each for single surface | 96 |
| Example 7-53 | | | | | | | | Positive electrode side surface of substrate | 14 μm | 92 |
| Example 7-54 | | | | | | | | Negative electrode side surface of substrate | 14 μm | 94 |
| Example 7-55 | | | | Lithium titanate | | | | Both surfaces of substrate | 14 μm, with 7 μm each for single surface | 98 |
| Example 7-56 | | | | | | | | Positive electrode side surface of substrate | 14 μm | 94 |
| Example 7-57 | | | | | | | | Negative electrode side surface of substrate | 14 μm | 96 |
| Example 7-58 | | | | Graphite | | | | Both surfaces of substrate | 14 μm, with 7 μm each for single surface | 98 |
| Example 7-59 | | | | | | | | Positive electrode side surface of substrate | 14 μm | 94 |
| Example 7-60 | | | | | | | | Negative electrode side surface of substrate | 14 μm | 96 |

TABLE 8

| | Battery form | | Negative electrode | Surface layer | | | | | Capacity retention ratio after 500 cycles |
|---|---|---|---|---|---|---|---|---|---|
| | Shape | Electrode assembly | Electrolyte | active material | Inorganic particles | Resin material | Porosity | Position | Thickness | |
| Example 8-1 | Cylindrical battery | Wound type | Liquid | Graphite | Boehmite | Polyvinylidene fluoride | Low-porosity layer 60% High-porosity layer 90% | Both surfaces of substrate | 14 μm, with 7 μm each for single surface | 98 |
| Example 8-2 | | | | | | | | Positive electrode side surface of substrate | 14 μm | 94 |
| Example 8-3 | | | | | | | | Negative electrode side surface of substrate | 14 μm | 96 |
| Example 8-4 | | | | Silicon | | | | Both surfaces of substrate | 14 μm, with 7 μm each for single surface | 90 |
| Example 8-5 | | | | | | | | Positive electrode side surface of substrate | 14 μm | 86 |
| Example 8-6 | | | | | | | | Negative electrode side surface of substrate | 14 μm | 88 |
| Example 8-7 | | | | Carbon-tin composite material | | | | Both surfaces of substrate | 14 μm, with 7 μm each for single surface | 96 |
| Example 8-8 | | | | | | | | Positive electrode side surface of substrate | 14 μm | 92 |
| Example 8-9 | | | | | | | | Negative electrode side surface of substrate | 14 μm | 94 |
| Example 8-10 | | | | Lithium titanate | | | | Both surfaces of substrate | 14 μm, with 7 μm each for single surface | 98 |
| Example 8-11 | | | | | | | | Positive electrode side surface of substrate | 14 μm | 94 |
| Example 8-12 | | | | | | | | Negative electrode side surface of substrate | 14 μm | 96 |
| Example 8-13 | Square battery | Flat wound type | Liquid | Graphite | Boehmite | Polyvinylidene fluoride | Low-porosity layer 60% High-porosity layer 90% | Both surfaces of substrate | 14 μm, with 7 μm each for single surface | 96 |
| Example 8-14 | | | | | | | | Positive electrode side surface of substrate | 14 μm | 92 |
| Example 8-15 | | | | | | | | Negative electrode side surface of substrate | 14 μm | 94 |
| Example 8-16 | | | | Silicon | | | | Both surfaces of substrate | 14 μm, with 7 μm each for single surface | 88 |
| Example 8-17 | | | | | | | | Positive electrode side surface of substrate | 14 μm | 84 |
| Example 8-18 | | | | | | | | Negative electrode side surface of substrate | 14 μm | 86 |
| Example 8-19 | | | | Carbon-tin composite material | | | | Both surfaces of substrate | 14 μm, with 7 μm each for single surface | 94 |
| Example 8-20 | | | | | | | | Positive electrode side surface of substrate | 14 μm | 90 |

TABLE 8-continued

| | Battery form | | | Negative electrode | Surface layer | | | | | Capacity retention |
|---|---|---|---|---|---|---|---|---|---|---|
| | Shape | Electrode assembly | Electrolyte | active material | Inorganic particles | Resin material | Porosity | Position | Thickness | ratio after 500 cycles |
| Example 8-21 | | | | | | | | Negative electrode side surface of substrate | 14 μm | 92 |
| Example 8-22 | | | | Lithium titanate | | | | Both surfaces of substrate | 14 μm, with 7 μm each for single surface | 96 |
| Example 8-23 | | | | | | | | Positive electrode side surface of substrate | 14 μm | 92 |
| Example 8-24 | | | | | | | | Negative electrode side surface of substrate | 14 μm | 94 |
| Example 8-25 | Laminate type battery (soft exterior material) | Laminate type | Liquid | Graphite | Boehmite | Polyvinylidene fluoride | Low-porosity layer 60% High-porosity layer 90% | Both surfaces of substrate | 14 μm, with 7 μm each for single surface | 96 |
| Example 8-26 | | | | | | | | Positive electrode side surface of substrate | 14 μm | 92 |
| Example 8-27 | | | | | | | | Negative electrode side surface of substrate | 14 μm | 94 |
| Example 8-28 | | | | Silicon | | | | Both surfaces of substrate | 14 μm, with 7 μm each for single surface | 88 |
| Example 8-29 | | | | | | | | Positive electrode side surface of substrate | 14 μm | 84 |
| Example 8-30 | | | | | | | | Negative electrode side surface of substrate | 14 μm | 86 |
| Example 8-31 | | | | Carbon-tin composite material | | | | Both surfaces of substrate | 14 μm, with 7 μm each for single surface | 94 |
| Example 8-32 | | | | | | | | Positive electrode side surface of substrate | 14 μm | 90 |
| Example 8-33 | | | | | | | | Negative electrode side surface of substrate | 14 μm | 92 |
| Example 8-34 | | | | Lithium titanate | | | | Both surfaces of substrate | 14 μm, with 7 μm each for single surface | 96 |
| Example 8-35 | | | | | | | | Positive electrode side surface of substrate | 14 μm | 92 |
| Example 8-36 | | | | | | | | Negative electrode side surface of substrate | 14 μm | 94 |
| Example 8-37 | Laminate type battery (soft exterior material) | Flat wound type | Gel | Graphite | Boehmite | Polyvinylidene fluoride | Low-porosity layer 60% High-porosity layer 90% | Both surfaces of substrate | 14 μm, with 7 μm each for single surface | 98 |
| Example 8-38 | | | | | | | | Positive electrode side surface of substrate | 14 μm | 94 |
| Example 8-39 | | | | | | | | Negative electrode side surface of substrate | 14 μm | 96 |
| Example 8-40 | | | | Silicon | | | | Both surfaces of substrate | 14 μm, with 7 μm each for single surface | 90 |

TABLE 8-continued

| | Battery form | | | Negative electrode | Surface layer | | | | | Capacity retention ratio after 500 cycles |
|---|---|---|---|---|---|---|---|---|---|---|
| | Shape | Electrode assembly | Electrolyte | active material | Inorganic particles | Resin material | Porosity | Position | Thickness | |
| Example 8-41 | | | | | | | | Positive electrode side surface of substrate | 14 μm | 86 |
| Example 8-42 | | | | | | | | Negative electrode side surface of substrate | 14 μm | 88 |
| Example 8-43 | | | | Carbon-tin composite material | | | | Both surfaces of substrate | 14 μm, with 7 μm each for single surface | 96 |
| Example 8-44 | | | | | | | | Positive electrode side surface of substrate | 14 μm | 92 |
| Example 8-45 | | | | | | | | Negative electrode side surface of substrate | 14 μm | 94 |
| Example 8-46 | Laminate type battery (soft exterior material) | Flat wound type | Gel | Lithium titanate | Boehmite | Polyvinylidene fluoride | Low-porosity layer 60% High-porosity layer 90% | Both surfaces of substrate | 14 μm, with 7 μm each for single surface | 98 |
| Example 8-47 | | | | | | | | Positive electrode side surface of substrate | 14 μm | 94 |
| Example 8-48 | | | | | | | | Negative electrode side surface of substrate | 14 μm | 96 |
| Example 8-49 | Laminate type battery (hard exterior material + soft exterior material) | Flat wound type | Gel | Graphite | Boehmite | Polyvinylidene fluoride | Low-porosity layer 60% High-porosity layer 90% | Both surfaces of substrate | 14 μm, with 7 μm each for single surface | 98 |
| Example 8-50 | | | | | | | | Positive electrode side surface of substrate | 14 μm | 94 |
| Example 8-51 | | | | | | | | Negative electrode side surface of substrate | 14 μm | 96 |
| Example 8-52 | | | | Silicon | | | | Both surfaces of substrate | 14 μm, with 7 μm each for single surface | 90 |
| Example 8-53 | | | | | | | | Positive electrode side surface of substrate | 14 μm | 86 |
| Example 8-54 | | | | | | | | Negative electrode side surface of substrate | 14 μm | 88 |
| Example 8-55 | | | | Carbon-tin composite material | | | | Both surfaces of substrate | 14 μm, with 7 μm each for single surface | 96 |
| Example 8-56 | | | | | | | | Positive electrode side surface of substrate | 14 μm | 92 |
| Example 8-57 | | | | | | | | Negative electrode side surface of substrate | 14 μm | 94 |
| Example 8-58 | | | | Lithium titanate | | | | Both surfaces of substrate | 14 μm, with 7 μm each for single surface | 98 |
| Example 8-59 | | | | | | | | Positive electrode side surface of substrate | 14 μm | 94 |

TABLE 8-continued

| | Battery form | | Negative electrode | | Surface layer | | | | Capacity retention |
|---|---|---|---|---|---|---|---|---|---|
| | Shape | Electrode assembly | Electrolyte | active material | Inorganic particles | Resin material | Porosity | Position | Thickness | ratio after 500 cycles |
| Example 8-60 | | | | | | | | Negative electrode side surface of substrate | 14 μm | 96 |

As can be seen from Table 7 and Table 8, when a separator in which a surface layer composed of a low-porosity layer and a high-porosity layer was formed on at least one surface of the substrate was used, the capacity retention ratio after 500 cycles was 80% or higher in all cases, irrespective of the battery configuration, and high cycle characteristics were obtained.

Particularly, from Example 7-1 to Example 7-3, batteries that used a separator in which a surface layer was provided on both surfaces of the substrate, had the highest cycle characteristics, and in a case in which the surface layer was provided on one surface of the substrate, it was more effective to provide the surface layer on the negative electrode side surface of the substrate, rather than to provide the surface layer on the positive electrode side surface of the substrate.

<Example 9-1> to <Example 9-14> and <Comparative Example 9-1>

In Example 9-1 to Example 9-14 and Comparative Example 9-1, the effect of the present technology were checked by using separators in which the thickness ratio between the low-porosity layer and the high-porosity layer that constituted the surface layer was changed.

Example 9-1

A cylindrical battery was produced in a similar manner as in Example 1-1, except that a separator in which a low-porosity layer was not provided, and only a high-porosity layer having a one-surface thickness of 7 μm (total thickness of both surfaces: 14 μm) and a porosity of 90% was provided (proportion of the high-porosity layer in the surface layer: 100%) on a polyethylene microporous film having a thickness of 9 μm, was used.

Example 9-2

A cylindrical battery was produced in a similar manner as in Example 1-1, except that a separator in which a low-porosity layer having a one-surface thickness of 0.5 μm (total thickness of both surfaces: 1 μm) and a porosity of 60%, and a high-porosity layer having a one-surface thickness of 6.5 μm (total thickness of both surfaces: 13 μm) and a porosity of 90% were provided (proportion of the high-porosity layer in the surface layer: 93%) on a polyethylene microporous film having a thickness of 9 μm, was used.

Example 9-3

A cylindrical battery was produced in a similar manner as in Example 1-1, using a separator provided with a low-porosity layer having a one-surface thickness of 1 μm (total thickness of both surfaces: 2 μm) and a porosity of 60%, and a high-porosity layer having a one-surface thickness of 6 μm (total thickness of both surfaces: 12 μm) and a porosity of 90% (proportion of the high-porosity layer in the surface layer: 86%).

Example 9-4

A cylindrical battery was produced in a similar manner as in Example 1-1, except that a separator in which a low-porosity layer having a one-surface thickness of 1.5 μm (total thickness of both surfaces: 3 μm) and a porosity of 60%, and a high-porosity layer having a one-surface thickness of 5.5 μm (total thickness of both surfaces: 11 μm) and a porosity of 90% were provided (proportion of the high-porosity layer in the surface layer: 79%) on a polyethylene microporous film having a thickness of 9 μm, was used.

Example 9-5

A cylindrical battery was produced in a similar manner as in Example 1-1, except that a separator in which a low-porosity layer having a one-surface thickness of 2 μm (total thickness of both surfaces: 4 μm) and a porosity of 60%, and a high-porosity layer having a one-surface thickness of 6 μm (total thickness of both surfaces: 10 μm) and a porosity of 90% were provided (proportion of the high-porosity layer in the surface layer: 71%) on a polyethylene microporous film having a thickness of 9 μm, was used.

Example 9-6

A cylindrical battery was produced in a similar manner as in Example 1-1, except that a separator in which a low-porosity layer having a one-surface thickness of 2.5 μm (total thickness of both surfaces: 5 μm) and a porosity of 60%, and a high-porosity layer having a one-surface thickness of 4.5 μm (total thickness of both surfaces: 9 μm) and a porosity of 90% were provided (proportion of the high-porosity layer in the surface layer: 64%) on a polyethylene microporous film having a thickness of 9 μm, was used.

Example 9-7

A cylindrical battery was produced in a similar manner as in Example 1-1, except that a separator in which a low-porosity layer having a one-surface thickness of 3 μm (total thickness of both surfaces: 6 μm) and a porosity of 60%, and a high-porosity layer having a one-surface thickness of 4 μm (total thickness of both surfaces: 8 μm) and a porosity of 90% were provided (proportion of the high-porosity layer in the surface layer: 57%) on a polyethylene microporous film having a thickness of 9 μm, was used.

Example 9-8

A cylindrical battery was produced in a similar manner as in Example 1-1, except that a separator in which a low-porosity layer having a one-surface thickness of 3.5 μm (total thickness of both surfaces: 7 μm) and a porosity of 60%, and a high-porosity layer having a one-surface thickness of 3.5 μm (total thickness of both surfaces: 7 μm) and a porosity of 90% were provided (proportion of the high-porosity layer in the surface layer: 50%) on a polyethylene microporous film having a thickness of 9 μm, was used.

Example 9-9

A cylindrical battery was produced in a similar manner as in Example 1-1, except that a separator in which a low-porosity layer having a one-surface thickness of 4 μm (total thickness of both surfaces: 8 μm) and a porosity of 60%, and a high-porosity layer having a one-surface thickness of 3 μm (total thickness of both surfaces: 6 μm) and a porosity of 90% were provided (proportion of the high-porosity layer in the surface layer: 43%) on a polyethylene microporous film having a thickness of 9 μm, was used.

Example 9-10

A cylindrical battery was produced in a similar manner as in Example 1-1, except that a separator in which a low-porosity layer having a one-surface thickness of 4.5 μm (total thickness of both surfaces: 9 μm) and a porosity of 60%, and a high-porosity layer having a one-surface thickness of 2.5 μm (total thickness of both surfaces: 5 μm) and a porosity of 90% were provided (proportion of the high-porosity layer in the surface layer: 36%) on a polyethylene microporous film having a thickness of 9 μm, was used.

Example 9-11

A cylindrical battery was produced in a similar manner as in Example 1-1, except that a separator in which a low-porosity layer having a one-surface thickness of 5 μm (total thickness of both surfaces: 10 μm) and a porosity of 60%, and a high-porosity layer having a one-surface thickness of 2 μm (total thickness of both surfaces: 4 μm) and a porosity of 90% were provided (proportion of the high-porosity layer in the surface layer: 29%) on a polyethylene microporous film having a thickness of 9 μm, was used.

Example 9-12

A cylindrical battery was produced in a similar manner as in Example 1-1, except that a separator in which a low-porosity layer having a one-surface thickness of 5.5 μm (total thickness of both surfaces: 11 μm) and a porosity of 60%, and a high-porosity layer having a one-surface thickness of 1.5 μm (total thickness of both surfaces: 3 μm) and a porosity of 90% were provided (proportion of the high-porosity layer in the surface layer: 21%) on a polyethylene microporous film having a thickness of 9 μm, was used.

Example 9-13

A cylindrical battery was produced in a similar manner as in Example 1-1, except that a separator in which a low-porosity layer having a one-surface thickness of 6 μm (total thickness of both surfaces: 12 μm) and a porosity of 60%, and a high-porosity layer having a one-surface thickness of 1 μm (total thickness of both surfaces: 2 μm) and a porosity of 90% were provided (proportion of the high-porosity layer in the surface layer: 14%) on a polyethylene microporous film having a thickness of 9 μm, was used.

Example 9-14

A cylindrical battery was produced in a similar manner as in Example 1-1, except that a separator in which a low-porosity layer having a one-surface thickness of 6.5 μm (total thickness of both surfaces: 13 μm) and a porosity of 60%, and a high-porosity layer having a one-surface thickness of 0.5 μm (total thickness of both surfaces: 1 μm) and a porosity of 90% were provided (proportion of the high-porosity layer in the surface layer: 7%) on a polyethylene microporous film having a thickness of 9 μm, was used.

Comparative Example 9-1

A cylindrical battery was produced in a similar manner as in Comparative Example 1-1, using a polyethylene microporous film having a thickness of 23 μm, which was not provided with a surface layer, as the separator.

<Example 10-1> to <Example 10-14> and <Comparative Example 10-1>

Cylindrical batteries were produced in a similar manner as in Example 9-1 to Example 9-14 and Comparative Example 9-1, respectively, except that boehmite was used as the inorganic particles used in the surface layer of the separator, instead of alumina. At this time, the volume ratio between the inorganic particles and the resin material (nearly 0.8:0.2) was not changed, the feed amount of the resin material was kept constant, and the feed amount of boehmite was adjusted to be proportional to the specific gravity.

[Evaluation of Batteries]
(a) Cycle Test
(b) Checking of Separator Porosity and Thickness For the cylindrical batteries of the various samples thus produced, a cycle test and checking of the separator porosity and thickness were carried out in a similar manner as in Example 1-1.

The evaluation results are presented in the following Table 9 and Table 10.

TABLE 9

| | Separator | | | | | | Separator after initial charging | | | | |
|---|---|---|---|---|---|---|---|---|---|---|---|
| | Low-porosity layer | | High-porosity layer | | High-porosity layer | | Low-porosity layer | | High-porosity layer | | High-porosity layer |
| | Thickness [μm] | Porosity [%] | Thickness [μm] | Porosity [%] | Proportion [%] | | Thickness [μm] | Porosity [%] | Thickness [μm] | Porosity [%] | Proportion [%] |
| Example 9-1 | 0 | 60 | 14 | 90 | 100 | | 0 | — | 6 | 77 | 100 |
| Example 9-2 | 1 | | 13 | | 93 | | 1 | 60 | 5 | 74 | 83 |
| Example 9-3 | 2 | | 12 | | 86 | | 2 | 60 | 4 | 70 | 67 |

TABLE 9-continued

| | | | | | | | | |
|---|---|---|---|---|---|---|---|---|
| Example 9-4 | 3 | | 11 | | 79 | 2 | 40 | 3.5 | 69 | 64 |
| Example 9-5 | 4 | | 10 | | 71 | 3 | 47 | 3 | 67 | 50 |
| Example 9-6 | 5 | | 9 | | 64 | 3 | 33 | 2.4 | 63 | 44 |
| Example 9-7 | 6 | | 8 | | 57 | 4 | 40 | 2 | 60 | 33 |
| Example 9-8 | 7 | | 7 | | 50 | 4 | 30 | 1.6 | 56 | 29 |
| Example 9-9 | 8 | | 6 | | 43 | 5 | 36 | 1.2 | 50 | 19 |
| Example 9-10 | 9 | | 5 | | 36 | 5 | 28 | 0.9 | 44 | 15 |
| Example 9-11 | 10 | | 4 | | 29 | 5.5 | 27 | 0.7 | 33 | 11 |
| Example 9-12 | 11 | | 3 | | 21 | 6 | 27 | 0.4 | 25 | 6 |
| Example 9-13 | 12 | | 2 | | 14 | 6.6 | 27 | 0.2 | 0 | 3 |
| Example 9-14 | 13 | | 1 | | 7 | 7.1 | 27 | 0.1 | 0 | 1 |
| Comparative Example 9-1 | 0 | — | 0 | — | — | PE separator: 23 → 17 μm, porosity 12% | | | | |

| | Separator after 500 cycles | | | | | |
|---|---|---|---|---|---|---|
| | Low-porosity layer | | High-porosity layer | | High-porosity layer | Capacity retention |
| | Thickness [μm] | Porosity [%] | Thickness [μm] | Porosity [%] | Proportion [%] | ratio after 500 cycles |
| Example 9-1 | 0 | — | 4 | 65 | 100 | 94 |
| Example 9-2 | 1 | 60 | 3 | 57 | 75 | 92 |
| Example 9-3 | 2 | 60 | 2 | 40 | 50 | 88 |
| Example 9-4 | 2 | 40 | 1.9 | 42 | 49 | 86 |
| Example 9-5 | 3 | 47 | 1.7 | 41 | 36 | 86 |
| Example 9-6 | 3 | 33 | 1.4 | 36 | 32 | 84 |
| Example 9-7 | 4 | 40 | 1.2 | 33 | 23 | 83 |
| Example 9-8 | 4 | 30 | 1 | 30 | 20 | 82 |
| Example 9-9 | 5 | 36 | 0.8 | 25 | 14 | 80 |
| Example 9-10 | 5 | 28 | 0.6 | 17 | 11 | 57 |
| Example 9-11 | 5.5 | 27 | 0.5 | 20 | 8 | 60 |
| Example 9-12 | 6 | 27 | 0.4 | 18 | 6 | 58 |
| Example 9-13 | 6.6 | 27 | 0.2 | 0 | 3 | 50 |
| Example 9-14 | 7.1 | 27 | 0.1 | 0 | 1 | 50 |
| Comparative Example 9-1 | PE separator 23 → 15 μm porosity 0% | | | | | 5 |

TABLE 10

| | Capacity retention ratio after 500 cycles |
|---|---|
| Example 10-1 | 100 |
| Example 10-2 | 100 |
| Example 10-3 | 98 |
| Example 10-4 | 96 |
| Example 10-5 | 96 |
| Example 10-6 | 94 |
| Example 10-7 | 93 |
| Example 10-8 | 92 |
| Example 10-9 | 90 |
| Example 10-10 | 67 |
| Example 10-11 | 70 |
| Example 10-12 | 68 |
| Example 10-13 | 60 |
| Example 10-14 | 60 |

As can be seen from Table 9 and Table 10, in the various Examples that used a separator having a surface layer composed of a low-porosity layer and a high-porosity layer, or a surface layer composed of a high-porosity layer, the capacity retention ratio after 500 cycles was increased compared to Comparative Example 9-1 that used a separator formed from a polyethylene microporous film only, and was 50% or higher in all cases.

Particularly, in the various Examples that used a separator provided with a surface layer, the capacity retention ratio after 500 cycles was all higher than 50%. Further, in the various Examples in which a separator having a thickness proportion of the high-porosity layer with respect to the surface layer of 43% or higher was used, the capacity retention ratio after 500 cycles was higher than 80% in all cases, and high cycle characteristics were obtained. As the thickness proportion of the high-porosity layer with respect to the surface layer was higher, the porosity could be maintained at a high level even if charging and discharging proceeded.

Furthermore, when the porosities and thicknesses of the low-porosity layer and the high-porosity layer after 500 cycles were checked, the capacity retention ratio was 80% or higher in a case in which a separator that maintained a porosity of 25% or higher was used, and the separator could be suitably used. In Example 9-1 to Example 9-14 and Example 10-1 to Example 10-14, the high-porosity layer was adjusted to 90%. Thus, with regard to this porosity, it is particularly preferable to adjust the thickness proportion of the high-porosity layer with respect to the surface layer to 43% or higher.

Moreover, it is contemplated that a preferred thickness proportion of the high-porosity layer with respect to the surface layer may vary with the porosity of the high-porosity layer, the content of inorganic particles, and the like; however, it is speculated that high cycle characteristics can be maintained by adjusting the thickness proportion of the high-porosity layer with respect to the surface layer to 50% or higher.

Moreover, the present technology may also adopt the following configurations.

[1]

A separator including:

a substrate; and a surface layer formed on at least one surface of the substrate and having a higher porosity than that of the substrate.

[2]
The separator according to [1], wherein the surface layer includes a first layer having convexities and concavities existing as cavities; and a second layer formed between the first layer and the substrate, the second layer has a higher porosity than that of the substrate, and the first layer has a higher porosity than that of the second layer.

[3]
The separator according to [2], wherein the porosity of the first layer represents a proportion of a total of pores contained in the convexities and the cavities of the concavities with respect to entirety of the first layer.

[4]
The separator according to [2] or [3], wherein the porosity of the substrate is from 25% to 40%; the porosity of the first layer is from 60% to 90%; and the porosity of the second layer is from 40% to 65%.

[5]
The separator according to any of [2] to [4], wherein the first layer is formed to have a thickness equivalent to the thickness of the second layer, or to have a thickness thicker than the thickness of the second layer.

[6]
The separator according to any of [1] to [5], wherein the surface layer contains particles and a resin material, and the particles are in a state of being dispersed in the surface layer.

[7]
The separator according to [6], wherein the surface layer is formed such that the particles are dispersed and supported on the resin material formed in a three-dimensional network structure.

[8]
The separator according to [6] or [7], wherein the particles contain at least one selected from aluminum oxide, boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a layered silicate, $Li_2O_4$, $Li_3PO_4$, LiF, aluminum hydroxide, graphite, carbon nanotube, and diamond.

[9]
The separator according to any of [6] to [8], wherein the resin material includes polyvinylidene fluoride or aramid.

[10]
The separator according to any of [6] to [9], wherein the surface layer has a concavo-convex shape, and the concavo-convex shape is formed as a result of uneven distribution of the particles and the resin material.

[11]
A battery including:

an electrode assembly having a positive electrode and a negative electrode arranged to face each other with a separator being interposed therebetween; and an electrolyte, wherein the separator includes:

a substrate; and a surface layer formed on at least one surface of the substrate and has a higher porosity than that of the substrate.

[12]
The battery according to [11], wherein the surface layer includes a first layer having convexities and concavities existing as cavities; and a second layer formed between the first layer and the separator, the second layer has a higher porosity than that of the substrate, and the first layer has a higher porosity than that of the second layer.

[13]
The battery according to [11], wherein a negative electrode active material included in the negative electrode is formed from a material containing at least one of a metal element and a semimetal element as a constituent element.

[14]
A battery including:

an electrode assembly having a positive electrode and a negative electrode arranged to face each other with a separator being interposed therebetween;

an electrolyte; and a layer having a higher porosity than that of the separator, the layer being disposed between the separator and at least one of the positive electrode and the negative electrode that are arranged to face each other with the separator interposed therebetween.

[15]
A battery pack including:

the battery according to any of [11] to [14];

a control unit controlling the battery; and an exterior material enclosing the battery.

[16]
An electronic apparatus including the battery according to [11] to [14], and configured to receive supply of electric power from the battery.

[17]
An electric vehicle including:

the battery according to any of [11] to [14], a conversion device receiving supply of electric power from the battery and converting the electric power to the driving force for the vehicle; and a control device performing information processing in connection with vehicle control, based on information on the battery.

[18]
A power storage device including the battery according to any of [11] to [14], and configured to supply electric power to an electronic apparatus connected to the battery.

[19]
The power storage device according to [18], further including an electric power information control device configured to transmit and receive a signal to and from another apparatus through a network, and performing charge-discharge control of the battery based on information received by the electric power information control device.

[20]
An electric power system receiving supply of electric power from the battery according to any of [11] to [14], or supplying electric power from an electric power generation device or an electric power network to the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

1 Separator
2 Substrate

3 Surface layer
10 Non-aqueous electrolyte battery
11 Battery can
12a, 12b Insulating plates
13 Battery lid
14 Safety valve
14a Protrusion
15 Disc holder
16 Cut-off disc
16a Hole
17 Heat-sensitive resistance element
18 Gasket
19 Subdisc
20 Wound electrode assembly
21 Positive electrode
21A Positive electrode current collector
21B Positive electrode active material layer
22 Negative electrode
22A Negative electrode current collector
22B Negative electrode active material layer
24 Center pin
25 Positive electrode lead
26 Negative electrode lead
30 Non-aqueous electrolyte battery
31 External can
32 Battery lid
33 Electrode pin
34 Insulator
35 Through-hole
36 Internal pressure releasing mechanism
36a First opening groove
36b Second opening groove
37 Liquid electrolyte injection port
38 Sealing member
40 Wound electrode assembly
41 Positive electrode terminal
50 Wound electrode assembly
51 Positive electrode lead
52 Negative electrode lead
53 Positive electrode
53A Positive electrode current collector
53B Positive electrode active material layer
54 Negative electrode
54A Negative electrode current collector
54B Negative electrode active material layer
56 Non-aqueous electrolyte
57 Protective tape
60 Exterior member
61 Adhesive film
62 Non-aqueous electrolyte battery
70 Laminated electrode assembly
71 Positive electrode lead
72 Negative electrode lead
73 Positive electrode
74 Negative electrode
75 Separator
76 Fixing member
80 Cell
81 Circuit board
82a Top cover
82b Bottom cover
83 Hard laminate film
84 Notch part
85 Soft laminate film
86 Recess
87 Adhesive film
90 Battery pack
100 Power storage system
101 House
102a Thermal power station
102b Nuclear power station
102c Hydroelectric power station
102 Centralized electric power system
103 Power storage device
104 Domestic electric power generation device
105 Power consuming device
105a Refrigerator
105b Air conditioning device
105c Television receiver
105d Bathroom
106 Electric vehicle
106a Electric car
106b Hybrid car
106c Electric motorcycle
107 Smart meter
108 Power hub
109 Electric power network
110 Control device
111 Sensor
112 Information network
113 Server
200 Hybrid vehicle
201 Engine
202 Power generator
203 Electric power driving force transducer
204a, 204b Driving wheels
205a, 205b Car wheels
208 Battery
209 Vehicle control device
210 Various sensors
211 Charging slot
301 Assembled battery
301a Secondary battery
302a Charging control switch
302b Diode
303a Discharging control switch
303b Diode
304 Switch unit
307 Current detection resistance
308 Temperature detection element
310 Control unit
311 Voltage detection unit
313 Current measuring unit
314 Switch control unit
317 Memory
318 Temperature detection unit
321 Positive electrode terminal
322 Negative electrode terminal

The invention claimed is:
1. A battery comprising:
an electrode assembly having a positive electrode and a negative electrode arranged to face each other with a separator being interposed therebetween; and
an electrolyte,
wherein the separator includes:
a substrate; and
a surface layer formed on at least one surface of the substrate,
wherein the surface layer includes a first layer and a second layer formed between the first layer and the substrate,
the second layer has a higher porosity than that of the substrate, and the first layer has a higher porosity than that of the second layer, wherein the surface layer contains particles and a resin material, and the particles are in a state of being dispersed in the surface layer, and wherein the surface layer has a concavo-convex shape, and the concavo-convex shape is formed as a result of uneven distribution of the particles and the resin material, and wherein the porosity of the substrate is from 25% to 40%; the porosity of the first layer is from 60% to 90%; and the porosity of the second layer is from 40% to 65%.

2. The battery according to claim 1, wherein the first layer has convexities and concavities existing as cavities.

3. The battery according to claim 1, wherein the first layer is formed to have a thickness equivalent to the thickness of the second layer, or to have a thickness thicker than the thickness of the second layer.

4. The battery according to claim 1, wherein the surface layer is formed such that the particles are dispersed and supported on the resin material formed in a three-dimensional network structure.

5. The battery according to claim 1, wherein the particles contain at least one selected from aluminum oxide, boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a layered silicate, $Li_2O_4$, $Li_3PO_4$, LiF, aluminum hydroxide, graphite, carbon nanotube, and diamond.

6. The battery according to claim 1, wherein the resin material includes polyvinylidene fluoride or aramid.

7. The battery according to claim 2, wherein the porosity of the first layer represents a proportion of a total of pores contained in the convexities and the cavities of the concavities with respect to entirety of the first layer.

8. The battery according to claim 1, wherein a negative electrode active material included in the negative electrode is formed from a material containing at least one of a metal element and a semimetal element as a constituent element.

9. A battery pack comprising:
the battery according to claim 1;
a control unit controlling the battery; and
an exterior material enclosing the battery.

10. An electronic apparatus comprising the battery according to claim 1, and
configured to receive supply of electric power from the battery.

11. An electric vehicle comprising:
the battery according to claim 1,
a conversion device receiving supply of electric power from the battery and converting the electric power to the driving force for the vehicle; and
a control device performing information processing in connection with vehicle control, based on information on the battery.

12. A power storage device comprising the battery according to claim 1, and
configured to supply electric power to an electronic apparatus connected to the battery.

13. The power storage device according to claim 12,
further comprising an electric power information control device configured to transmit and receive a signal to and from another apparatus through a network, and
performing charge-discharge control of the battery based on information received by the electric power information control device.

14. An electric power system receiving supply of electric power from the battery according to claim 1, or supplying electric power from an electric power generation device or an electric power network to the battery.

15. The battery according to claim 1, wherein the surface layer is formed on both surfaces of the substrate.

16. The battery according to claim 1, wherein the porosity of the substrate is from 25% to 35%.

17. The battery according to claim 1, wherein the concavo-convex shape includes one or more of a mottled (crater) pattern, a lattice (waffle) pattern, a dotted (pillar) pattern, a pinhole pattern, and a hexagonal lattice (honeycomb) pattern.

18. The battery according to claim 2, wherein the convexities have different heights from one another.

* * * * *